United States Patent [19]

Ohgami et al.

[11] Patent Number: 5,592,362
[45] Date of Patent: Jan. 7, 1997

[54] ELECTRONIC SYSTEM HAVING PORTABLE ELECTRONIC APPARATUS AND EXTERNAL EXPANSION UNIT FOR EXPANDING FUNCTION OF ELECTRONIC APPARATUS

[75] Inventors: Keizo Ohgami; Kazuyuki Matsuda; Takaichi Kobayashi; Kazuya Shibasaki; Hiroshi Nakamura; Shigeru Sekine; Hironori Ito; Kenichi Ishikawa; Tadamichi Shimohira, all of Tokyo; Moriya Gibo, Ichikawa, all of Japan

[73] Assignee: Kabushiki Kaisha Toshiba, Kawasaki, Japan

[21] Appl. No.: 291,906

[22] Filed: Aug. 17, 1994

[30] Foreign Application Priority Data

Oct. 29, 1993 [JP] Japan .................................. 5-292488
Feb. 18, 1994 [JP] Japan .................................. 6-020981

[51] Int. Cl.⁶ .............................. H05K 7/10; G06F 1/16
[52] U.S. Cl. ...................... 361/686; 361/683; 364/708.1; 439/374
[58] Field of Search ........................ 361/679, 680–686, 361/724; 312/223.2; 439/374; 364/708.1; G06F 1/16

[56] References Cited

U.S. PATENT DOCUMENTS

| | | |
|---|---|---|
| 4,113,212 | 9/1978 | Coriden . |
| 4,527,149 | 7/1985 | Swensen . |
| 4,788,657 | 11/1988 | Hanebuth . |
| 4,978,949 | 12/1990 | Herron et al. . |
| 5,175,671 | 12/1992 | Sasaki . |
| 5,182,698 | 1/1993 | Kobayashi et al. . |
| 5,187,644 | 2/1993 | Crisan . |
| 5,283,714 | 2/1994 | Tsai et al. . |
| 5,290,178 | 3/1994 | Ma . |
| 5,301,132 | 4/1994 | Akahane . |
| 5,313,596 | 5/1994 | Swindler et al. ................... 395/325 |
| 5,347,425 | 9/1994 | Herron et al. ...................... 361/683 |
| 5,477,415 | 12/1995 | Mitcham et al. ................... 361/686 |
| 5,488,572 | 1/1996 | Belmont ........................... 364/514 R |

*Primary Examiner*—Leo P. Picard
*Assistant Examiner*—Lynn D. Feild
*Attorney, Agent, or Firm*—Cushman Darby & Cushman IP Group of Pillsbury Madison & Sutro LLP

[57] ABSTRACT

An electronic system includes an electronic apparatus body and an external expansion unit. The electronic apparatus body has a bottom surface and a rear surface. A first connector is arranged on the rear surface. The external expansion unit has a first surface opposing the bottom surface, and a second surface opposing the rear surface. The external expansion unit has a second connector which is detachably connected to the first connector. The external expansion unit has an engaging device. The engaging device is movable between the first position where the engaging device is separated from the bottom surface and the second position where the engaging device is engaged with the bottom surface to pull the electronic apparatus body toward the second surface. The external expansion unit has an operation mechanism for selectively moving the engaging device to the first and second positions.

33 Claims, 36 Drawing Sheets

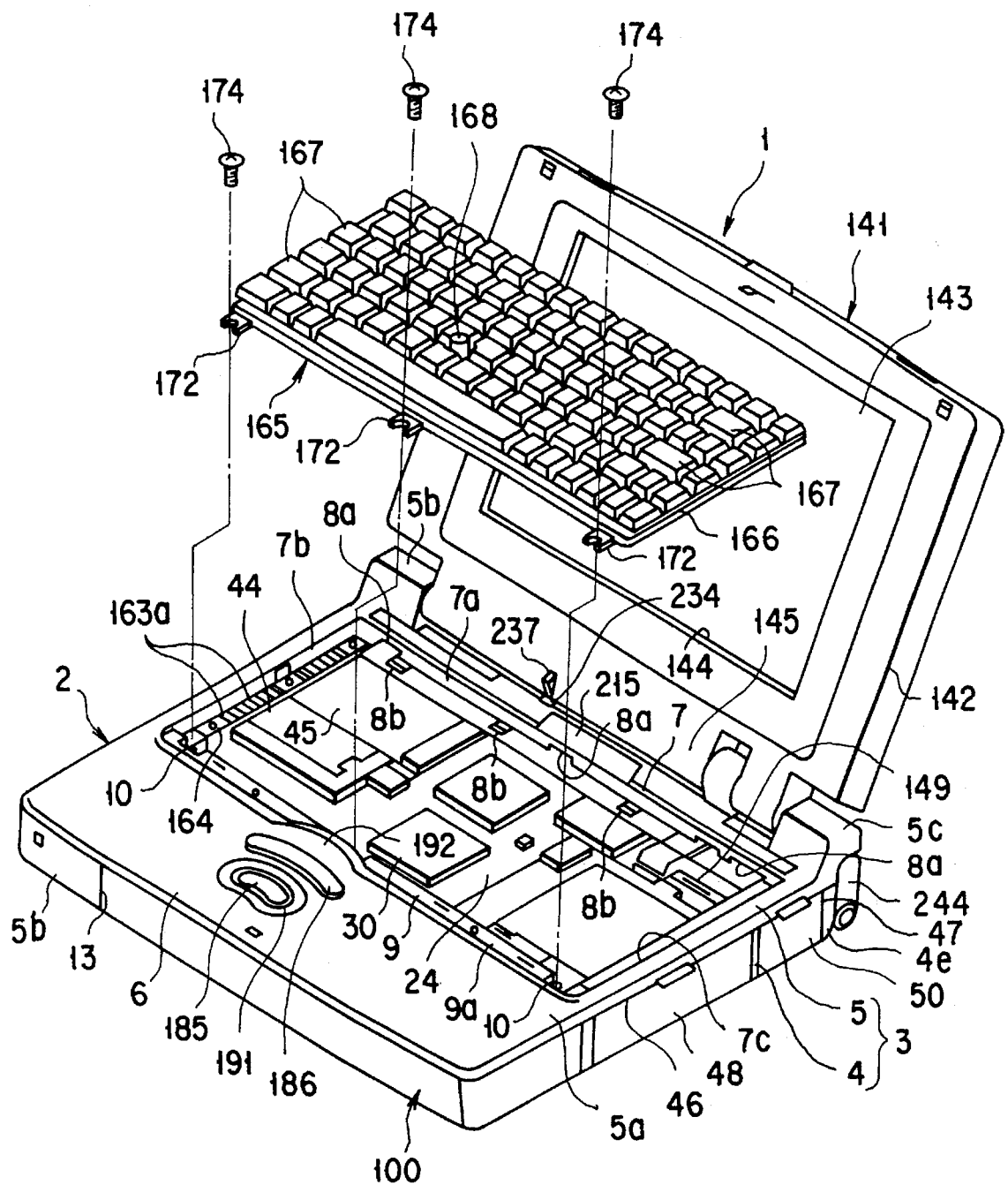
F I G. 2

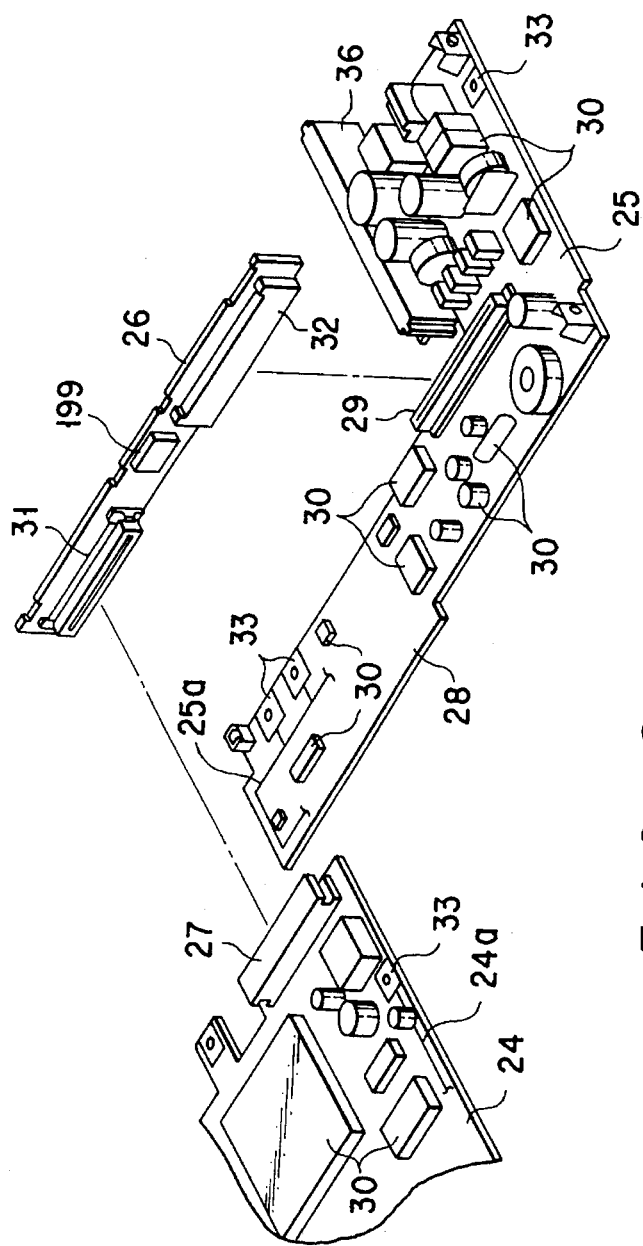
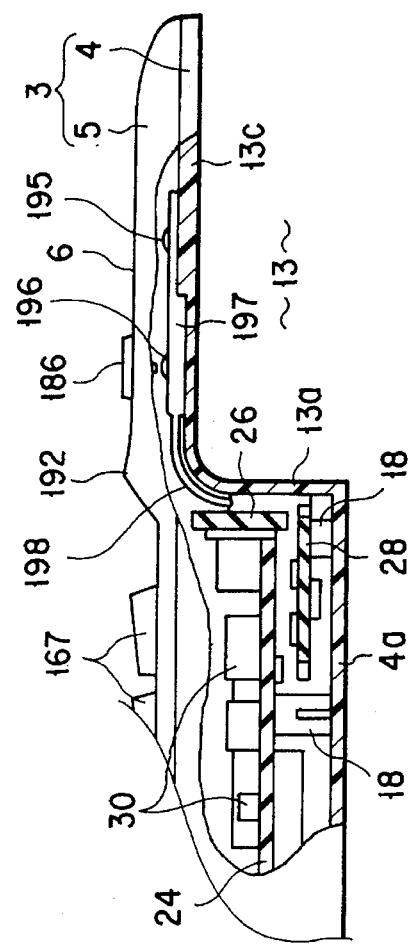
FIG. 8
FIG. 9

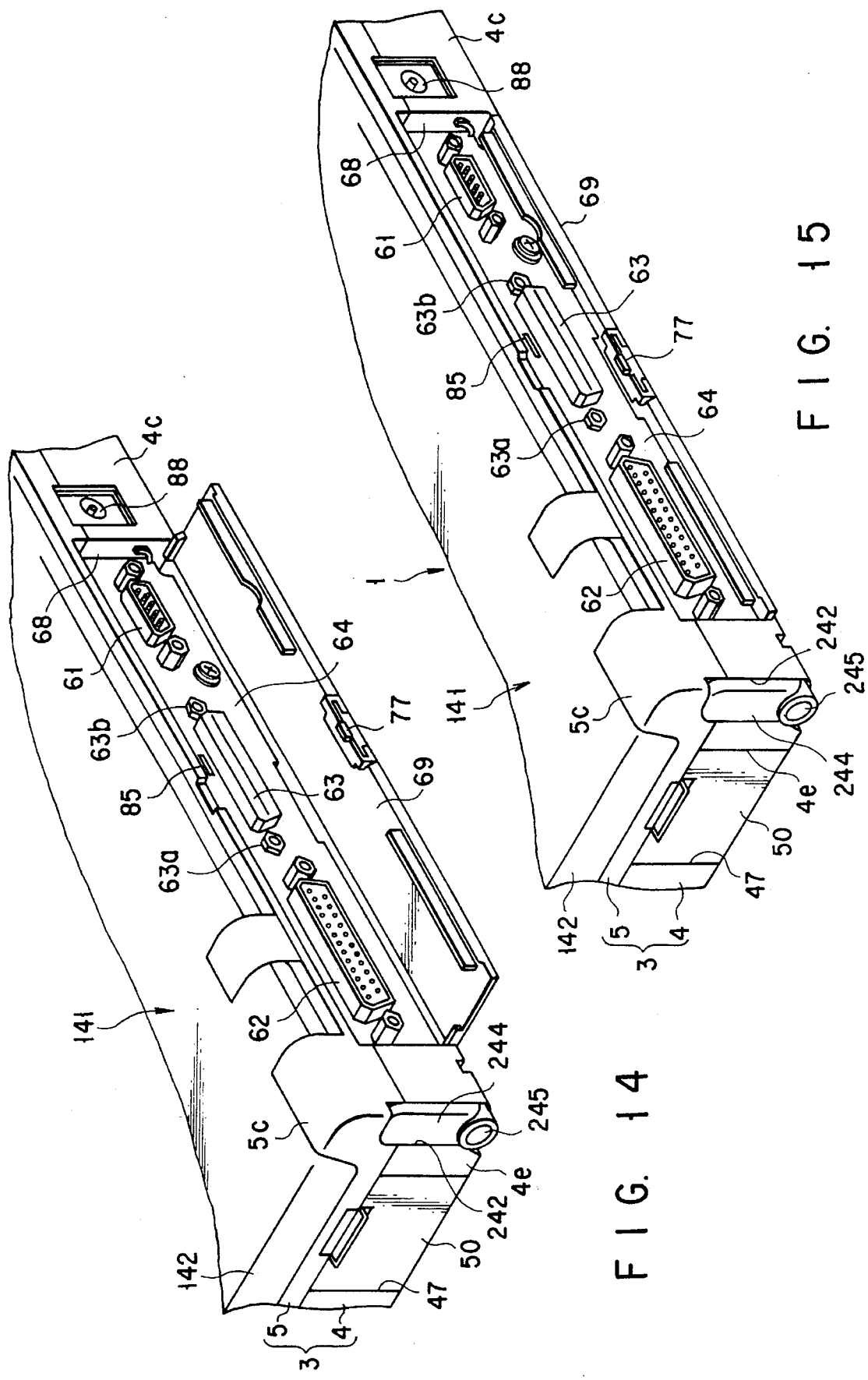

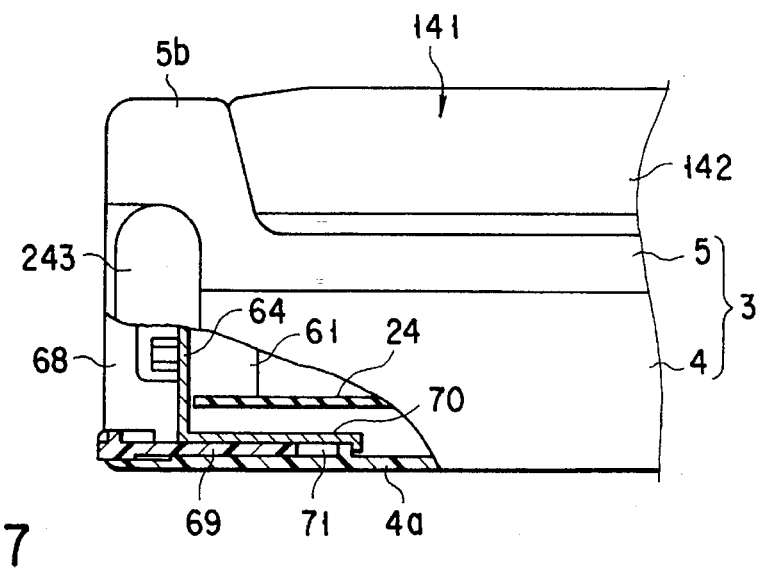
F I G. 17
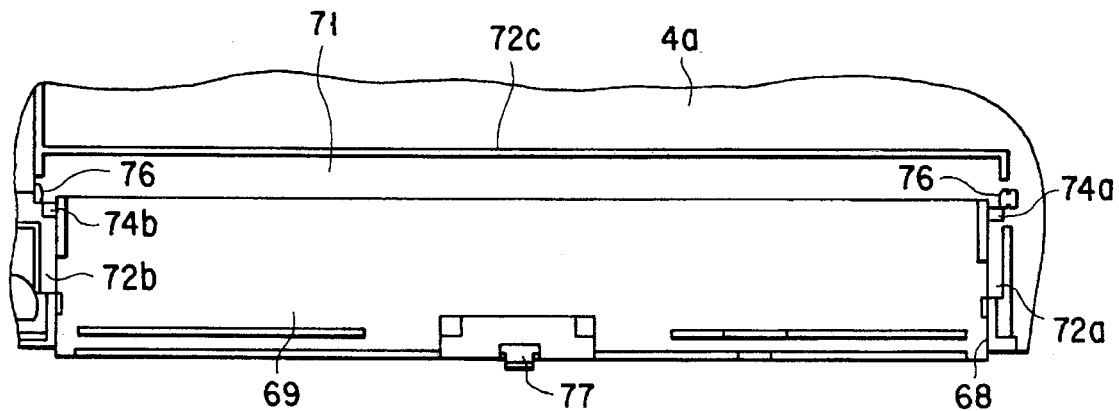
F I G. 18
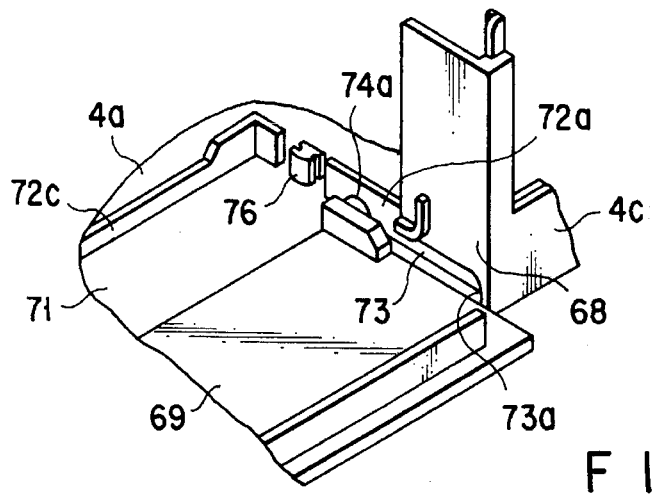
F I G. 19

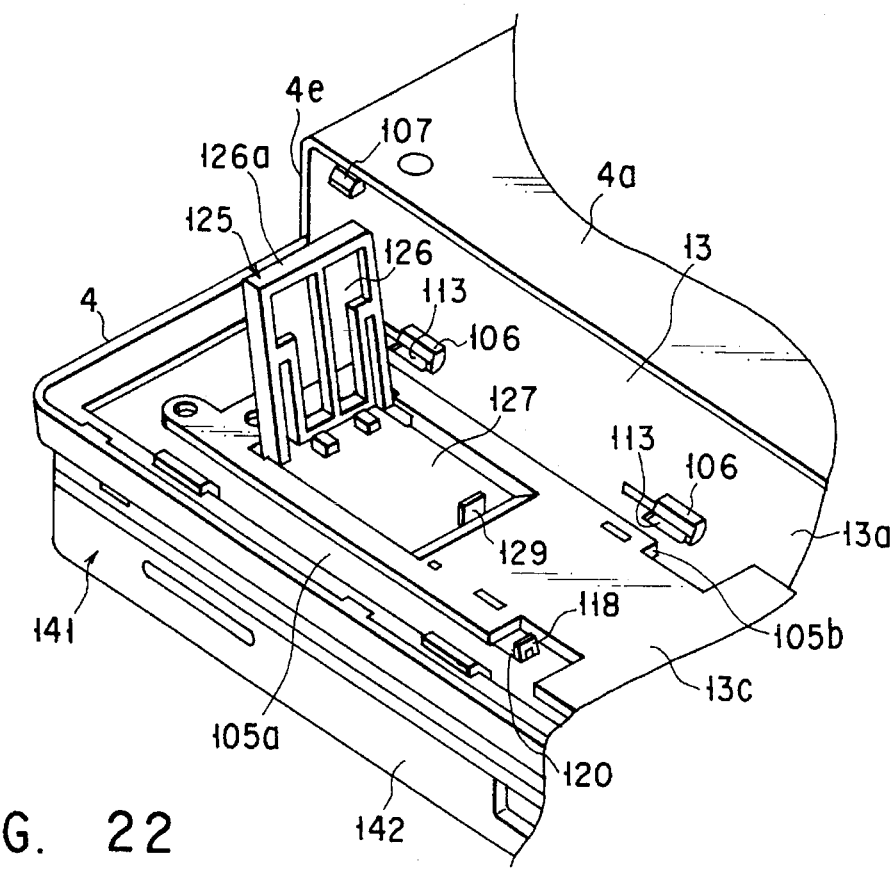
F I G. 22
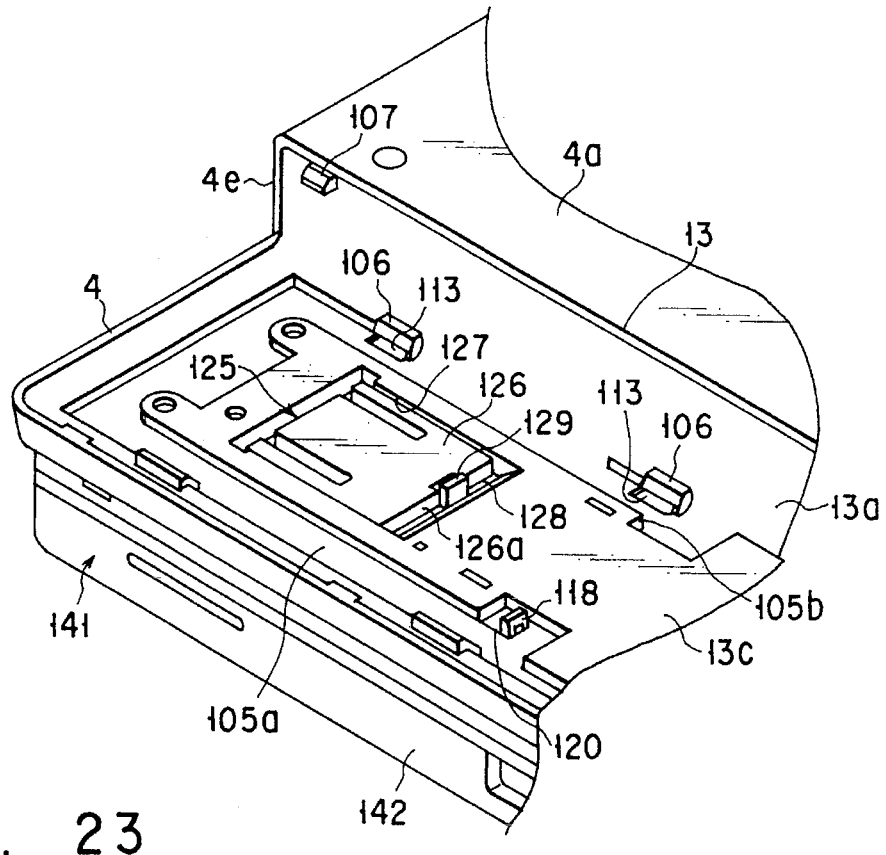
F I G. 23

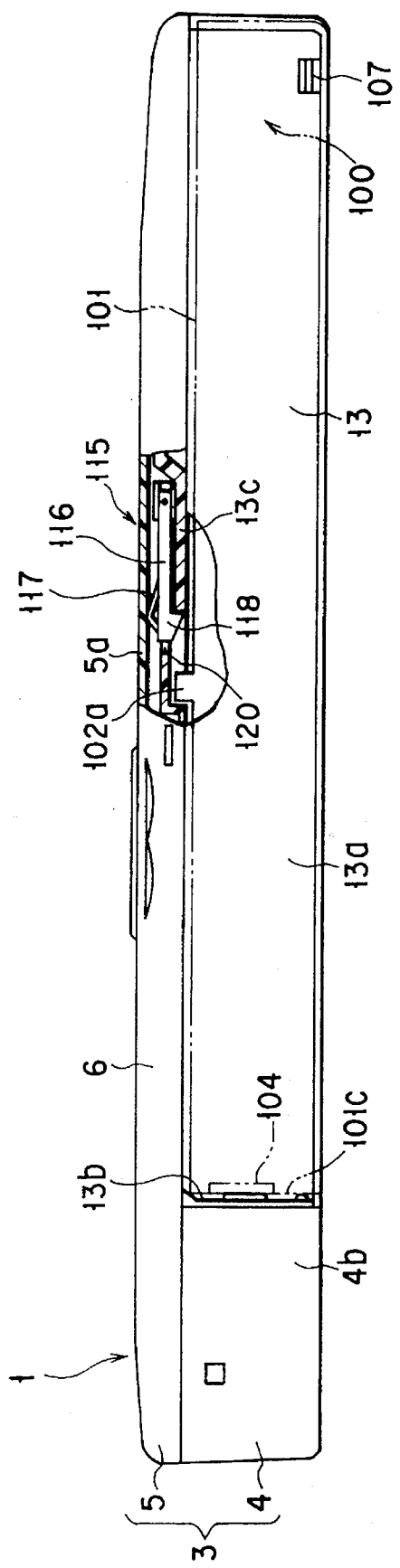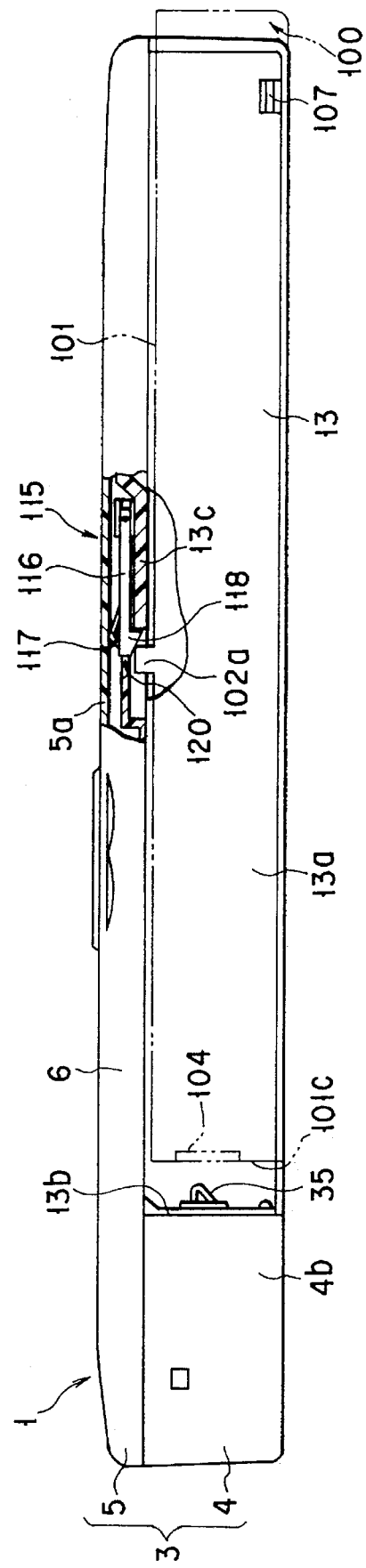
FIG. 24A
FIG. 24B

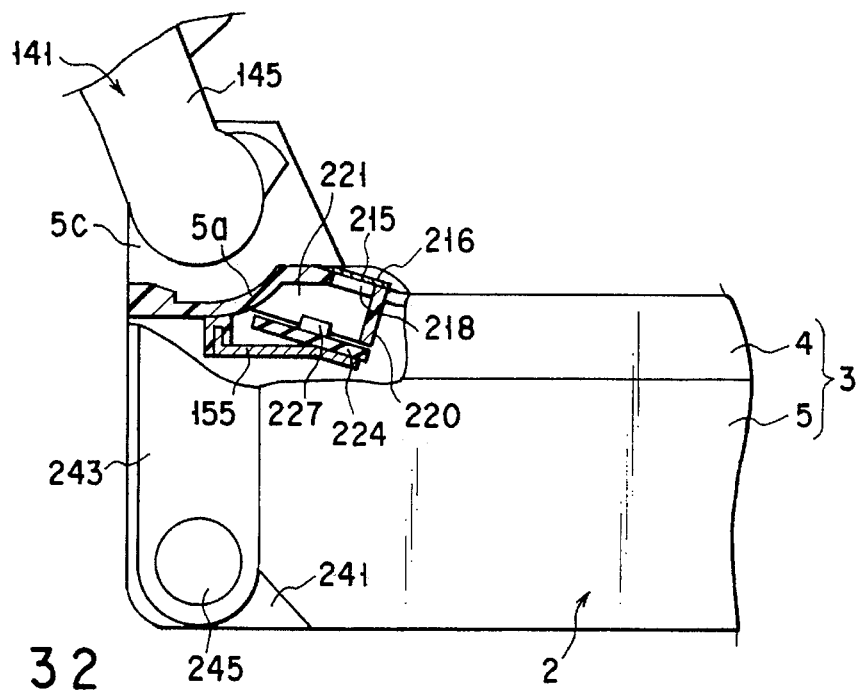
F I G. 32
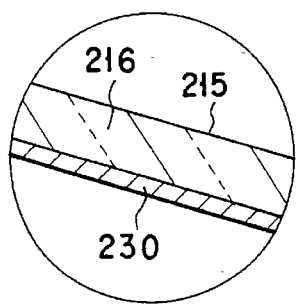
F I G. 33
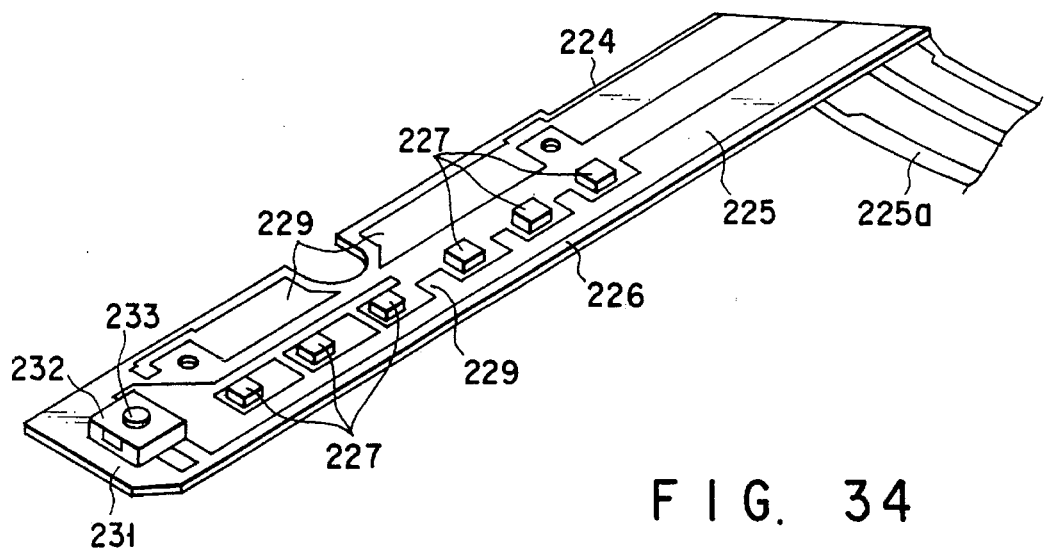
F I G. 34

5,592,362

ELECTRONIC SYSTEM HAVING PORTABLE ELECTRONIC APPARATUS AND EXTERNAL EXPANSION UNIT FOR EXPANDING FUNCTION OF ELECTRONIC APPARATUS

BACKGROUND OF THE INVENTION

1. Field of the Invention

The present invention relates to an electronic system having a portable electronic apparatus such as a book type portable computer and an external expansion unit used to expand the function of this electronic apparatus.

2. Description of the Related Art

A book or notebook type computer is easy to carry and can be freely used, even in places where no commercial power supply is available, by using a battery pack incorporated in the computer.

A computer of this type has a case designed compact to improve portability, and hence has limitations on the standard function as compared with a desktop computer. For this reason, a portable computer has a plurality of connectors and ports for function expansion on the rear surface of the case. When such a conventional computer requires a function which the computer does not have, a peripheral device such as a hard disk drive or a mouse is connected to a corresponding one of the connectors and ports, thereby adding a new function to the computer.

The function of a computer is expanded either by directly connecting a peripheral device to the computer or by indirectly connecting it to the computer via an external expansion unit having connectors and ports which can be connected to a plurality of peripheral devices. The computer to which the external expansion unit can be connected has a first interface connector for relaying signals. The external expansion unit serves to relay signals exchanged between the computer and peripheral devices, and has a mount portion to which the computer is detachably coupled. This mount portion has a first surface on which the case of the computer is mounted, and a second surface opposing the rear surface of the case. A second interface connector electrically connected to the connectors and ports is arranged on the second surface. The second interface connector is fitted to the first interface connector when the computer is coupled to the external expansion unit. With this fitting operation, the computer is electrically connected to the external expansion unit.

The external expansion unit includes a hook for maintaining the connection between the first and second interface connectors. The hook is supported on the external expansion unit to be movable between a lock position where the hook is hooked on the rear surface of the computer to pull the computer toward the second surface and a lock release position where the hook is released from the rear surface. When the hook is moved to the lock position after the computer is placed on the first surface, the computer is pulled toward the second surface, and the first and second interface connectors are fitted to each other.

In the conventional external expansion unit, the hook for maintaining the fitted state of the first and second interface connectors is arranged on the second surface, and the hook is hooked on the rear surface off the computer. For this reason, if the front end portion of the computer is raised while the computer is coupled to the external expansion unit, an excessive bending force may be applied to the engaging portion between the hook and the computer, and the load on the hook greatly increases.

In such a case, the hook may be deformed. If the hook is deformed, an excessive force is applied to the fitting portion between the first and second interface connectors. As a result, the first and second interface connectors may be damaged, or these interface connectors may be disengaged from each other to cancel the electrical connection between the computer and the peripheral device. Especially when the connection between the external expansion unit and the computer is canceled while the external expansion unit is in use, important data may be erased, or an operation error may occur in the computer.

A portable computer has a keyboard for inputting information and commands. The keyboard is arranged on the upper surface of the case of the computer. The keyboard includes a flat keyboard panel and a large number of keys supported on the upper surface of the keyboard panel. A keyboard mount port in which the keyboard panel is fitted is formed in the upper surface of the case. The keyboard mount port has a seat portion for receiving the peripheral portion of the keyboard panel. The seat portion has a rectangular, frame-like shape. A plurality of portions of the peripheral portion of the keyboard panel are screwed to the seat portion.

According to this arrangement, however, when the keyboard is to be fixed to or removed from the case, a large number of screws must be turned. For this reason, it takes much labor and time to mount/remove the keyboard. In addition, since a large number of boss portions for receiving the screws must be arranged in the keyboard mount port, the structure of the keyboard mount port is complicated. Consequently, the need for a large number of boss portions as well as a large number of screws leads to an increase in the manufacturing cost and weight of the computer.

Some known portable computer has an icon arranged on the upper surface of the case. This icon has a plurality of display portions for displaying the contents of the operation state and function of the computer in graphic patterns. These display portions are arranged in a row on the upper surface of the case. A plurality of light-emitting diodes for lighting the display portions of the icon are housed in the case. The light-emitting diodes are arranged in a row to be adjacent to each other in the case and oppose the respective display portions.

According to the icon having such an arrangement, while the computer is in operation, only display portions corresponding to the contents of the current operation state and function are turned on upon reception of light from the corresponding light-emitting diodes. Therefore, the operator can know the contents of the operation state and function of the computer by watching the display portions in the ON state.

According to this conventional icon, however, since the plurality of display portions are arranged to be adjacent to each other, light from a light-emitting diode for a given display portion is sometimes guided to an adjacent display portion. Consequently, it is difficult to discriminate the display portion in the ON state from the display portion in the OFF state. As a result, visibility of the icon deteriorates.

In the portable computer, the connectors and ports for function expansion are covered with a connector cover while corresponding peripheral devices are not used. This connector cover is mounted on the case to be pivotal between a closing position where the connector cover becomes continuous with the case on substantially the same plane and an opening position where the connector cover is tilted outward from the case to a near-horizontal position. The connector cover has an engaging pawl. When the connector cover is pivoted to the closing position, the engaging pawl is hooked on the case to hold the connector cover at the closing position.

According to this conventional arrangement, however, in order to close the connector cover, the operator must completely push the connector cover to the closing position with his/her finger tip, and hook the engaging pawl to the case. That is, in order to close the connector cover, a reliable pivoting operation is required. This is one of the factors which cause a deterioration in the operability of the connector cover.

In addition, the conventional connector cover held at the closing position by hooking the engaging pawl to the case. Especially since the engaging pawl is integrally formed with the connector cover by using a synthetic resin material, the engaging pawl may be broken if the connector cover is repeatedly opened/closed. If the engaging pawl is broken, the connector cover cannot be held at the closing position, and dust tends to adhere to the connectors and the ports. This adhesion of dust is a cause for interference with electrical connection between a peripheral device and the computer.

SUMMARY OF THE INVENTION

The present invention has been made in consideration of the above situation, and has as its first object to obtain a structure which can prevent an excessive bending or twisting force from acting on the connecting portion between the first and second connectors and improve the reliability of the connection therebetween in an electronic system having an external expansion unit which can be connected to the electronic apparatus body.

It is the second object of the present invention to obtain a portable electronic apparatus which allows a keyboard to be easily mounted/removed.

It is the third object of the present invention to obtain a portable electronic apparatus which can confine noise from a circuit board within the case of the apparatus by using a keyboard, thereby preventing electromagnetic interference.

It is the fourth object of the present invention to provide a portable electronic apparatus capable of improving visibility of an icon for displaying the contents of the operation state and function of the apparatus.

It is the fifth object of the present invention to obtain a portable electronic apparatus in which a connector cover can be easily closed, and the connector cover can be held at the closing position by using a spring, and a pawl which is easily broken can be omitted from the connector cover.

In order to achieve the first object, according to the present invention, there is provided an electronic system comprising: an electronic apparatus body having a bottom surface and a rear surface continuous with the bottom surface, and having a first connector arranged on the rear surface; an external expansion unit having a first surface opposing the bottom surface of the electronic apparatus body, and a second surface opposing the rear surface of the electronic apparatus body, the electronic apparatus body being detachably coupled to the external expansion unit, the external expansion unit having a second connector on the second surface, and the second connector being detachably connected to the first connector; engaging means arranged on the first surface of the external expansion unit, the engaging means being movable between a first position where the engaging means is separated from the bottom surface of the electronic apparatus body and a second position where the engaging means is engaged with the bottom surface of the electronic apparatus body to pull the electronic apparatus body toward the second surface; and an operation mechanism for selectively moving the engaging means to the first and second positions, the operation mechanism connecting the first connector to the second connector upon moving the engaging means to the second position.

In this arrangement, when the electronic apparatus body is to be connected to the external expansion unit, the engaging means of the external expansion unit is moved to the first position via the operation mechanism. In this state, the bottom surface of the electronic apparatus body is then placed on the first surface of the external expansion unit. The engaging means is moved to the second position via the operation mechanism. With this movement, the engaging means is hooked on the bottom surface of the electronic apparatus body to pull it toward the second surface. As a result, the rear surface of the electronic apparatus body is brought close to the second surface. With this operation, the first and second connectors are connected to each other.

In this case, the engaging means is hooked on the bottom surface of the electronic apparatus body to hold the bottom surface on the first surface. For this reason, even if the front portion of the electronic apparatus body is raised while the first and second connectors are kept connected to each other, the bottom surface of the electronic apparatus body is not separated from the first surface. Therefore, the electronic apparatus body can be firmly fixed to the first surface, and no excessive force is applied to the connecting portion between the first and second connectors.

In order to achieve the second object, according to the present invention, there is provided a portable electronic apparatus comprising: a keyboard having a keyboard panel supporting a plurality of keys; and a case having a keyboard mount port in which the keyboard panel of the keyboard is fitted. The keyboard panel includes a first edge portion having a first engaging portion, and a second edge portion located on a side opposite to the first edge portion, the second edge portion having a first mount portion. The keyboard mount port includes a second engaging portion detachably engaged with the first engaging portion, and a second mount portion on which the first mount portion is stacked from above. The keyboard is obliquely inserted downward in the keyboard mount port above the case with the first engaging portion being a leading end, the first engaging portion is engaged with the second engaging portion, the keyboard is then pivoted downward about the first and second engaging portions to stack the first mount portion on the second mount portion, and the first and second mount portions are coupled to each other via a screw, thereby fixing the keyboard to the case.

According to this arrangement, since the first and second edge portions, of the keyboard, located on the two sides of the key are positioned to the keyboard mount port, the keyboard can be positioned to the case with high precision. In addition, since only the second edge portion is screwed to the keyboard mount port, the number of portions of the keyboard which are screwed to the case can be decreased.

In order to achieve the third object, according to the present invention, there is provided a portable electronic apparatus comprising: a case having an upper surface having a keyboard mount port formed therein; a circuit board housed in the case, the circuit board having a ground wiring pattern and facing the keyboard mount port; a keyboard mounted in the keyboard mount port, the keyboard having a rear surface facing the circuit board, the rear surface being covered with a first conductive shield plate; and a second conductive shield plate arranged in the keyboard mount port, the second shield plate being electrically connected to the wiring pattern on the circuit board and being brought into contact with the first shield plate when the keyboard is mounted in the keyboard mount port. The keyboard includes a first edge portion having a plurality of first engaging portions, and a second edge portion located on a side opposite to the first edge portion, the second edge portion having a plurality of first mount portions. The keyboard mount port has a second engaging portion with which the first engaging portion is detachably engaged, and a second mount portion on which the first mount portion is stacked from above. The keyboard is obliquely inserted downward in the keyboard mount port above the case with the first engaging portion being a leading end, the first engaging portion is engaged with the second engaging portion, the keyboard is then pivoted downward about the first and second engaging portions to stack the first mount portion on the second mount portion, and the first and second mount portions are coupled to each other via a screw, thereby fixing the keyboard to the case.

According to this arrangement, when the keyboard is fixed to the case via screws, the first shield plate of the keyboard is brought into contact with the second shield plate of the keyboard mount port. As a result, the first and second shield plates are electrically connected to each other. Therefore, a portion above the circuit board can be covered with the first and second shield plates, which are electrically connected to each other, and high-frequency noise from the circuit board can be confined within the case.

In order to achieve the fourth object, according to the present invention, there is provided a portable electronic apparatus comprising: a case having a display opening portion in an upper surface; an icon attached to the display opening portion, the icon having a light-transmitting icon panel, and the icon panel having a plurality of display portions, arranged in a row, for displaying an operation state and function of the apparatus in graphic patterns; a board housed in the case and opposing the icon panel; and a plurality of light sources arranged on the board to oppose the display portions. The case has a plurality of partition walls interposed between the adjacent display portions inside the display opening portion.

According to this arrangement, since the adjacent display portions are partitioned from each other via the partition walls, light beams from the light sources for the adjacent display portions are not mixed with each other. For this reason, a display portion in the ON state can be clearly discriminated from a display portion in the OFF state to improve the visibility of the display portions. In addition, the plurality of display portions are drawn on one icon panel. For this reason, the plurality display portions can be arranged on the case at once by only mounting the icon panel in the display opening portion of the case.

In order to achieve the fifth object, according to the present invention, there is provided a portable electronic apparatus comprising: a case having a peripheral surface having a connector extraction port formed therein; a connector arranged in the case to oppose the connector extraction port; a connector cover supported on the case to be pivotal between a closing position where the connector cover closes the connector extraction port and an opening position where the connector cover is tilted outward from the case to open the connector extraction port; and a return spring supported on the case, the return spring being engaged with the connector cover to forcibly pivot the connector cover toward the closing position when the connector cover is pivoted from the opening position to the closing position, and the return spring holding the connector cover at the closing position.

According to this arrangement, when the connector cover is pivoted through a certain angle from the opening position to the closing position, the connector cover is automatically pivoted by the spring to the closing position. For this reason, the connector cover need not be completely pushed to the closing position and hence can be easily closed. In addition, since the connector cover is held at the closing position by the return spring, a pawl to be hooked on the case can be omitted from the connector cover, thereby eliminating the inconvenience that the connector cover cannot be held at the closing position if the pawl is broken when the connector cover is repeatedly opened/closed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 50 show a computer according to the first embodiment of the present invention, and an external expansion unit used after being connected to the computer, in which FIG. 1 is a perspective view showing a portable computer while a display unit is open, FIG. 2 is an exploded view showing the portable computer while a keyboard is removed from a base unit, FIG. 3 is a partially cutaway side view showing a keyboard mount portion of the computer, FIG. 4 is a side view showing the computer in a state wherein the keyboard is mounted in the case of the computer, FIG. 5 is a front view showing the computer while a battery pack is removed from a battery receptacle, FIG. 6 is a perspective view showing the battery receptacle and the battery pack to be housed therein, FIG. 7 is a perspective view showing a state wherein the first to third circuit boards and a hard disk drive are incorporated in a bottom case, FIG. 8 is an exploded view showing the positional relationship between the first to third circuit boards, FIG. 9 is a sectional view showing a state wherein the first to third circuit boards are incorporated in the bottom case, FIG. 10 is a sectional view of the battery receptacle, FIG. 11 is a sectional view showing the coupling portion between the bottom case, a top cover, and the keyboard, FIG. 12 is a perspective view showing the computer in a state wherein a first connector cover is open, FIG. 13 is a sectional view showing the mount portion of the first connector cover, FIG. 14 is a perspective view showing the computer in a state wherein a second connector cover is open, FIG. 15 is a perspective view showing the computer in a state wherein the second connector cover is inserted in a cover receptacle, FIG. 16 is a perspective view showing the computer in a state wherein the second connector cover is closed, FIG. 17 is a sectional view showing a state wherein the second connector cover is inserted in the cover receptacle, FIG. 18 is a plan view showing the mount portion of the second connector cover, FIG. 19 is a perspective view of the mount portion of the second connector cover with respect to the bottom case, FIG. 20 is a perspective view showing a state wherein an RGB adaptor is connected to the computer, FIG. 21 is a perspective view of the RGB adaptor, FIG. 22 is a perspective view showing the battery receptacle in a state wherein support legs are pivoted to a use position, FIG. 23 is a perspective view showing the battery receptacle in a state wherein the support legs are pivoted to a nonuse position, FIG. 24A is a partially sectional front view showing a state wherein the battery pack is completely mounted in the battery receptacle, FIG. 24B is a partially sectional front view showing a state wherein the lock of the battery pack is released, FIG. 25 is a perspective view showing a stopper for preventing ejection of the battery pack, FIG. 26 is a plan view showing the rear half portion of the top cover when viewed from the inside of the case, FIG. 27 is a side view showing the computer with a sectional view taken along a line 27—27 in FIG. 26, FIG. 28 is a perspective view showing the computer in a state wherein the cover is removed from the case, FIG. 29 is an enlarged perspective view of a portion around operation buttons on a hand rest portion, FIG. 30 is a sectional view showing a portion around the operation buttons, FIG. 31 is an enlarged perspective view of a portion around an icon on the top cover, FIG. 32 is a side view showing the computer with a sectional view of an icon mount portion, FIG. 33 is sectional view of the icon, FIG. 34 is a perspective view of a diode board, FIG. 35 is a sectional view showing a state wherein a power switch is ON, FIG. 36 is a sectional view showing a state wherein the power switch is OFF, FIG. 37 is a perspective view showing a state wherein the computer is coupled to the external expansion unit, FIG. 38 is a side view showing a state wherein the computer is coupled to the external expansion unit, FIG. 39 is a perspective view of the external expansion unit, FIG. 40 is an exploded view of the external expansion unit, FIG. 41 is a sectional view of the external expansion unit, FIG. 42 a rear view of the external expansion unit, FIG. 43 is a perspective view showing the external expansion unit in a state wherein an upper housing is removed, FIG. 44 is a perspective view of a connector unit of the external expansion unit, FIG. 45 is a perspective view showing the connector unit when an operation lever is pivoted to a coupling position, FIG. 46 is a perspective view showing the connector unit when the operation lever is pivoted to a release position, FIG. 47 is a sectional view showing the external expansion unit when the operation lever is pivoted to the release position, FIG. 48 is a partially sectional side view showing the external expansion unit in a state wherein an engaging pawl is hooked on the computer, FIG. 49 is a side view showing the external expansion unit with a sectional view of the mount portion of a guide member, and FIG. 50 is a sectional view showing the external expansion unit in a state wherein the guide member is hooked on the computer;

FIGS. 51 and 52 show a computer according to the second embodiment of the present invention, in which FIG. 51 is a side view showing a state wherein the computer is caused to tilt up, and FIG. 52 is a rear view of the computer, showing the mount portion of an auxiliary leg; and FIGS. 53 to 56 show a computer according to the third embodiment of the present invention, in which FIG. 53 is a partially sectional front view showing the computer in a state wherein a battery pack is housed in a battery receptacle, FIG. 56 is a perspective view showing the stopper for restraining the sliding movement of the battery pack.

DETAILED DESCRIPTION OF THE PREFERRED EMBODIMENTS

The first embodiment of the present invention will be described below with reference to FIGS. 1 to 50.

Figure 1:
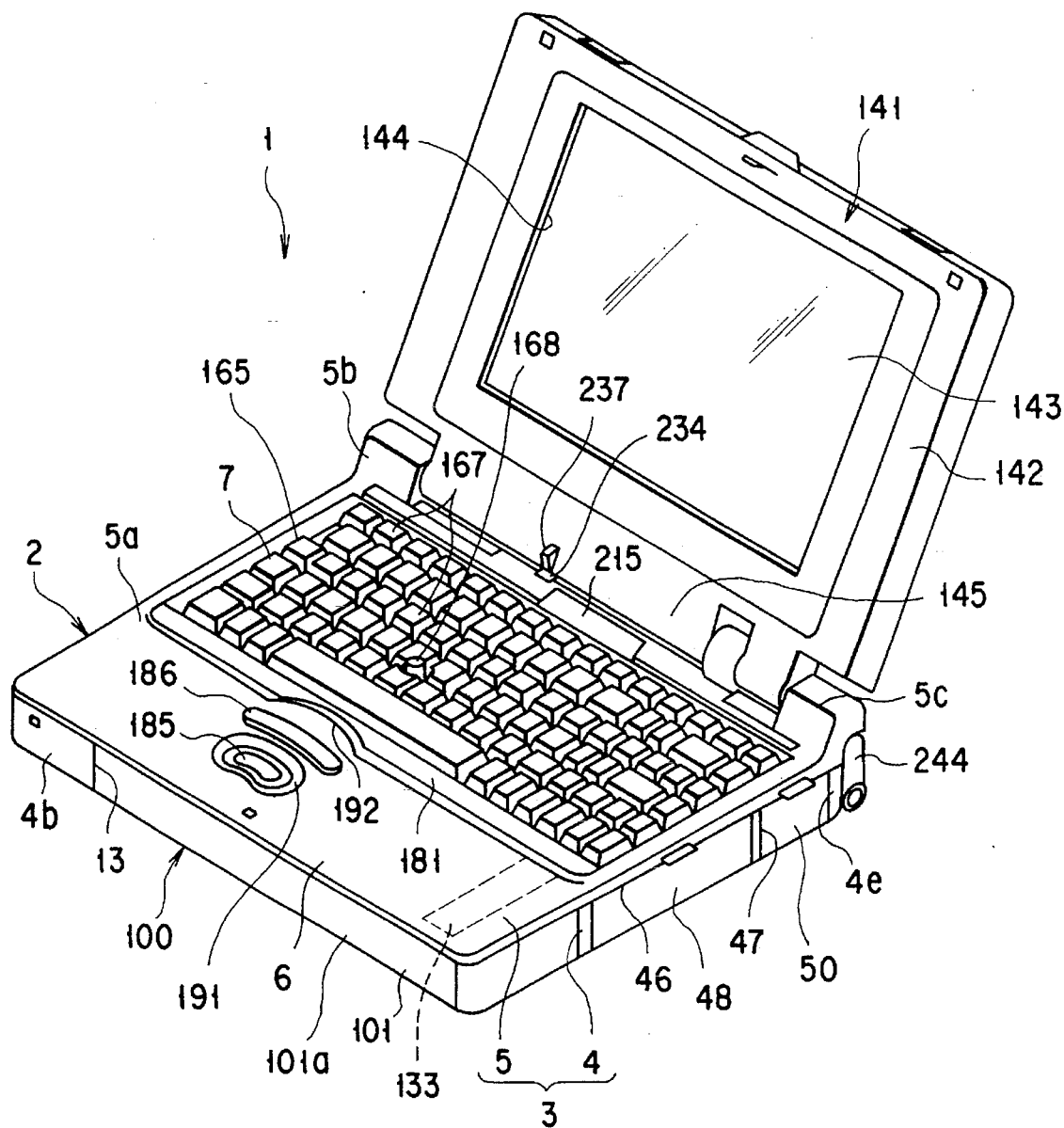

FIG. 1 shows a book type portable computer 1 of a B5 size. The portable computer 1 has a base unit 2 as an electronic equipment body. The base unit 2 has a flat, box-like case 3. The case 3 includes a bottom case 4 and a top cover 5 detachably fitted on the bottom case 4. The bottom case 4 and the top cover 5 are made of a synthetic resin material such as ABS resin. The inner surfaces of the bottom case 4 and the top cover 5 are plated with a conductive material to take a countermeasure against electromagnetic interference.

The bottom case 4 includes a rectangular, flat bottom wall 4a, and walls continuous with the bottom wall 4a, i.e., a front wall 4b, a rear wall 4c, and left and right side walls 4d and 4e. The top cover 5 is formed as a single, substantially flat member having an upper wall 5a opposing the bottom wall 4a. The front, rear, left and right side edge portions of the upper wall 5a are continuous with the front wall 4b, rear wall 4c, and left and right side walls 4d and 4e of the bottom case 4, respectively. A pair of display support portions 5b and 5c are arranged on the rear end portion of the upper wall 5a of the top cover 5. The display support portions 5b and 5c protrude upward from the upper wall 5a.

Figure 3:
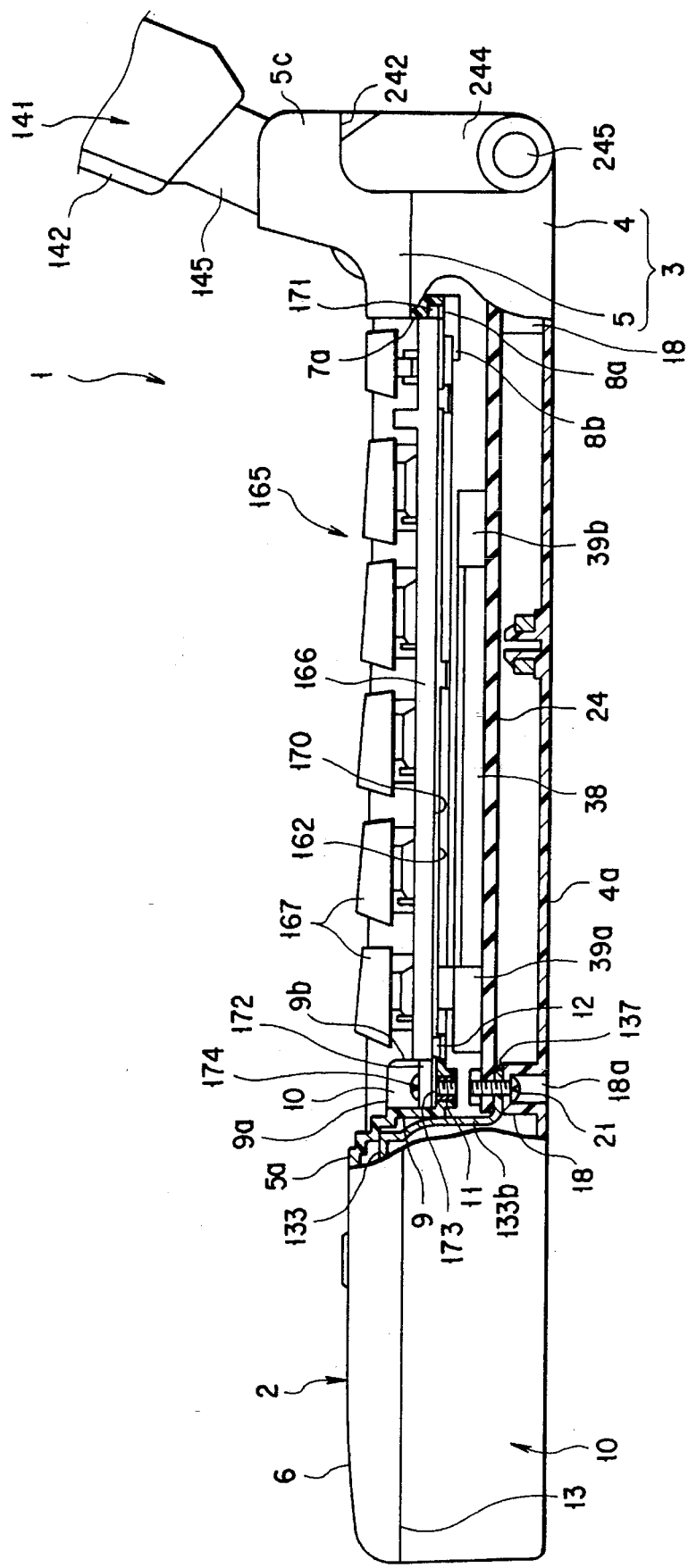

The upper wall 5a of the top cover 5 has front and rear half portions. The front half portion of the upper wall 5a serves as a flat hand rest portion 6. The hand rest portion 6 allows an operator to put his/her hands thereon in an input operation. A keyboard mount port 7 is formed in the rear half portion of the upper wall 5a. The keyboard mount port 7 has a size almost equal to the entire area of the rear half portion. As shown in FIGS. 2 and 3, flange portions 7a to 7c extending downward are integrally formed on the rear and side edges of the opening of the keyboard mount port 7. The flange portion 7a located at the rear edge of the opening of the keyboard mount port 7 includes a plurality of notches 8a as the second engaging portions and a plurality of support pieces 8b extending into the keyboard mount port 7. The notches 8a are formed in the lower edge of the flange portion 7a. These notches 8a are arranged at intervals in the lateral direction of the keyboard mount port 7. The support pieces 8b are arranged between the notches 8a.

Figure 4:
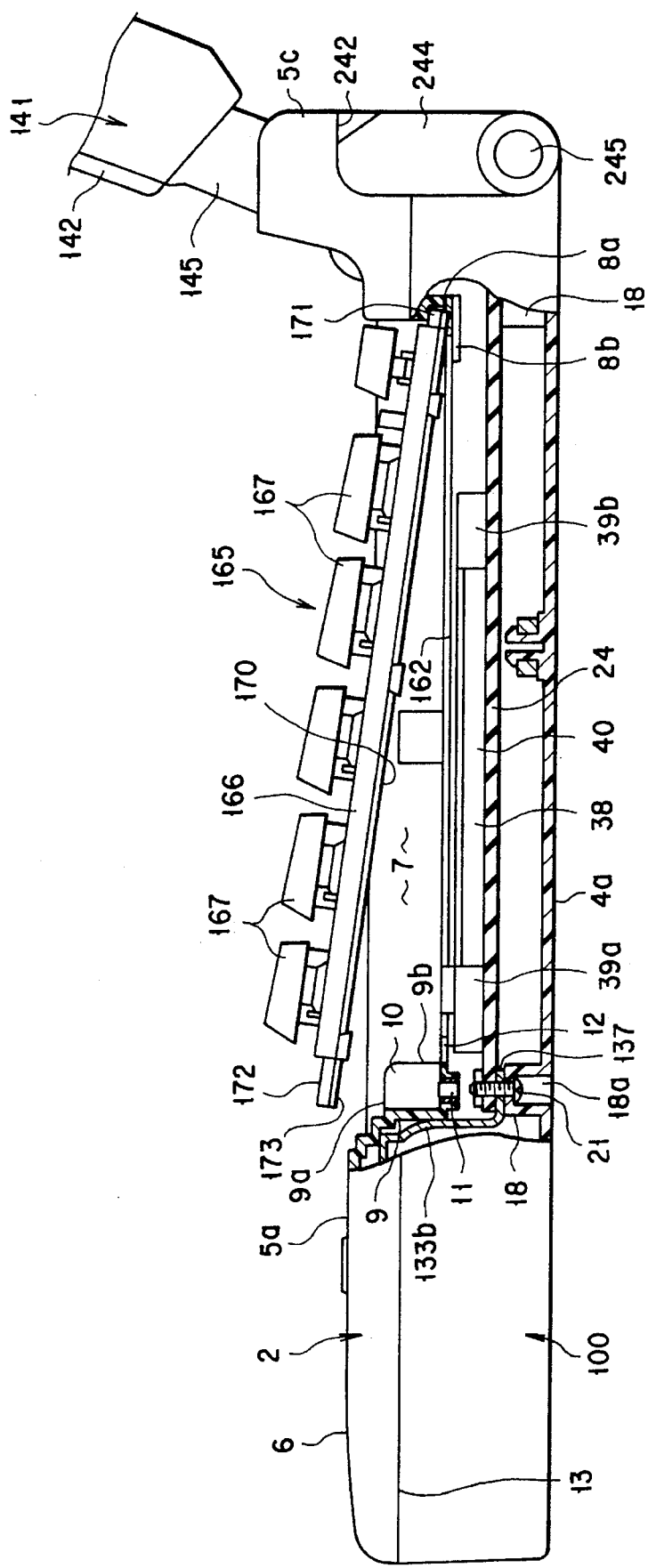

As shown in FIGS. 2 and 3, a keyboard support portion 9 is formed on the front edge of the opening of the keyboard mount port 7. The keyboard support portion 9 extends in the lateral direction of the case 3. The left and right end portions of the keyboard support portion 9 are continuous with the flange portions 7b and 7c. The keyboard support portion 9 has an upper surface 9a. The upper surface 9a is located closer to the bottom of the case 3 (at a lower level) than the upper wall 5a of the top cover 5. As shown in FIGS. 3 and 4, mount recess portions 10 are formed in three portions, i.e., the left and right end portions and central portion of the upper surface 9a. A metal nut 11 is embedded in each mount recess portion 10.

The keyboard support portion 9 has a support surface 9b continuous with the upper surface 9a. The support surface 9b faces the keyboard mount port 7. A plurality of support pieces 12 are arranged on the lower end of the support surface 9b at intervals in the lateral direction. These support pieces 12 protrude into the keyboard mount port 7.

Figure 5:
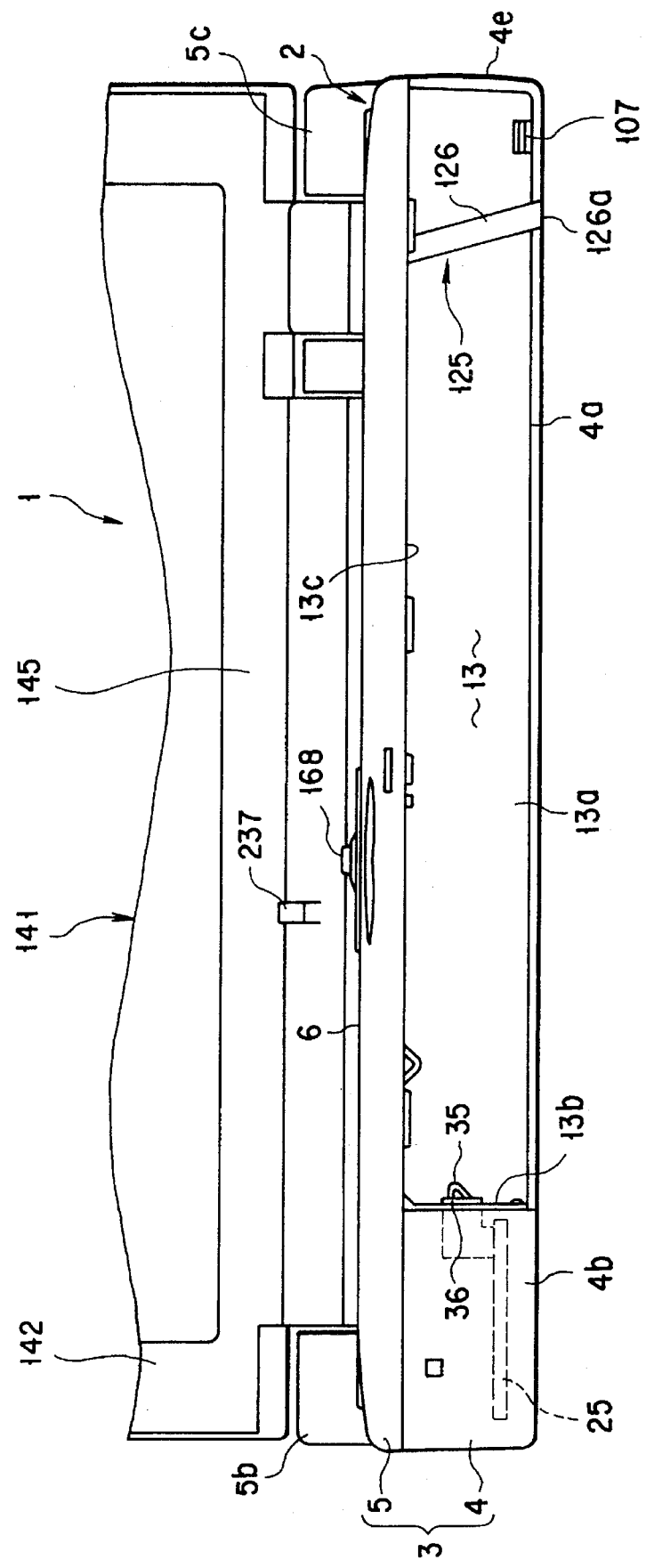
Figure 6:
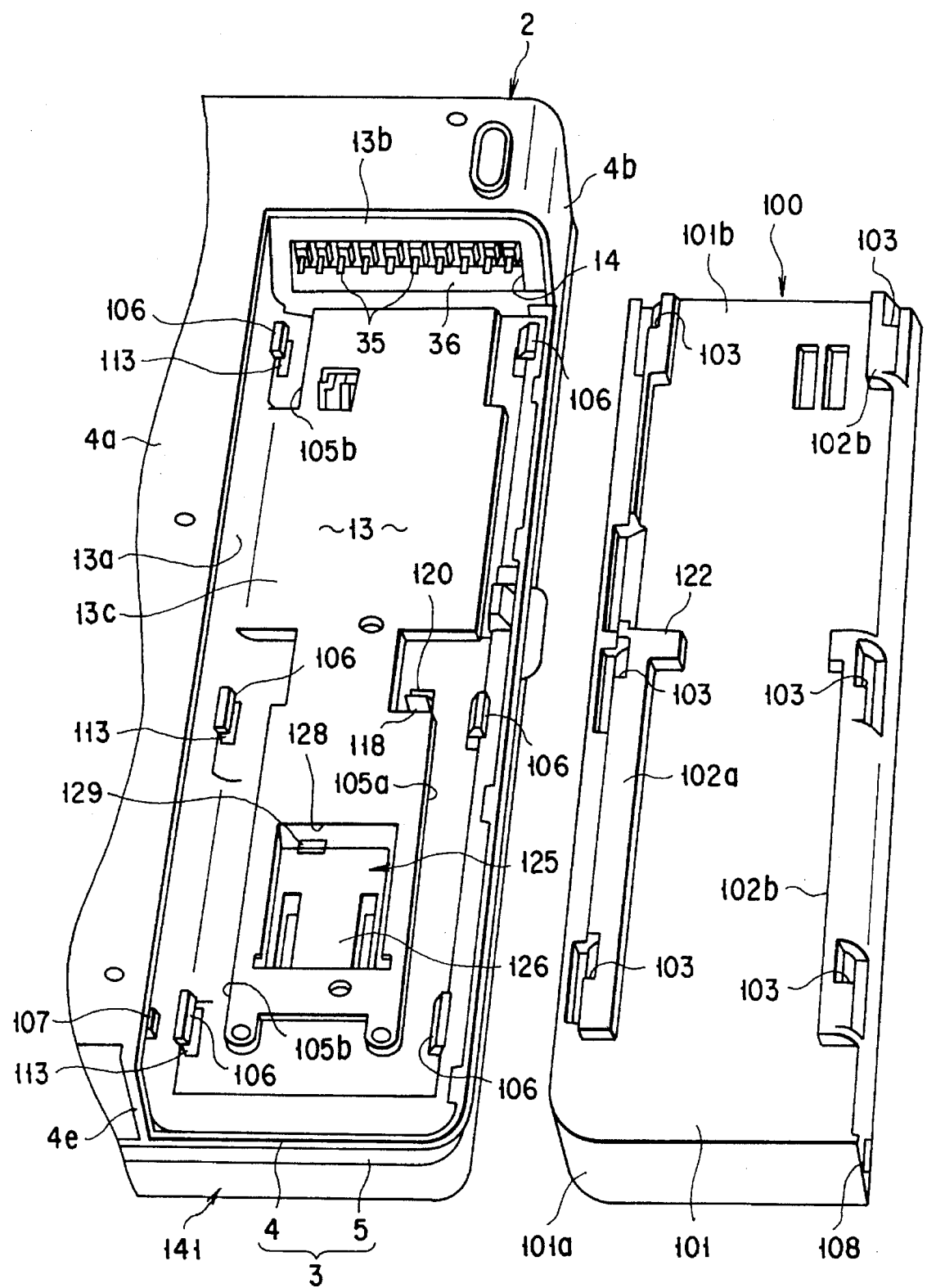

As shown in FIGS. 5 and 6, the case 3 includes a battery receptacle 13. The battery receptacle 13 laterally extends below the hand rest portion 6. The battery receptacle 13 is constituted by a recess portion which continuously open to the bottom wall 4a, front wall 4b, and right side wall 4e of the bottom case 4. The battery receptacle 13 is defined by an upright wall 13a laterally extending to be continuous with the bottom wall 4a, an end wall 13b located on the left end portion of the upright wall 13a, and a ceiling wall 13c continuous with the upright wall 13a and the end wall 13b. The end wall 13b has a connector extraction port 14. The ceiling wall 13c is arranged near the upper wall 5a of the top cover 5 to be almost parallel thereto.

Figure 16:
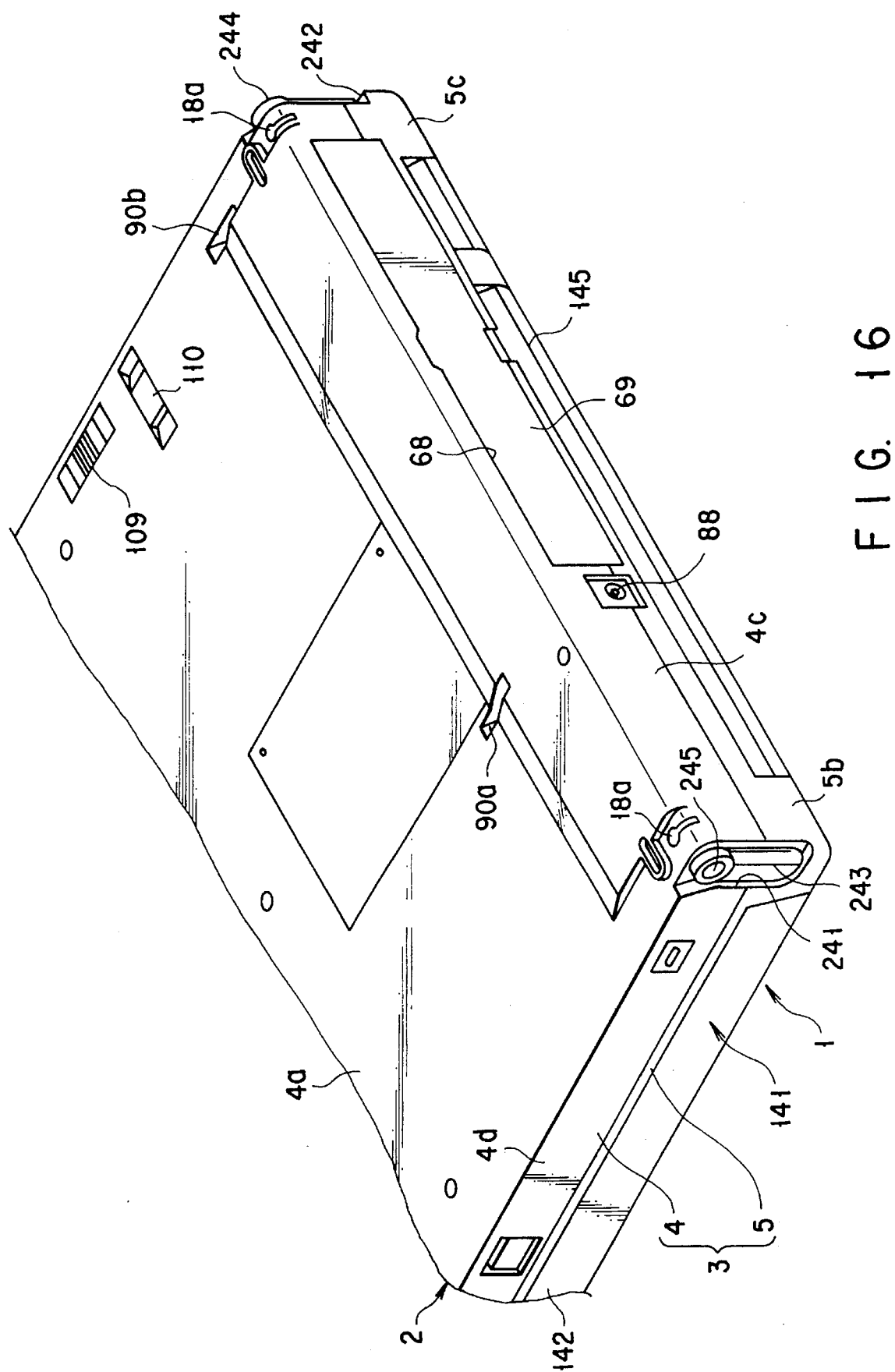

As shown in FIG. 3, the bottom wall 4a of the bottom case 4 has a plurality of boss portions 18. The boss portions 18 extend upward from the upper surface of the bottom wall 4a. Each boss portion 18 has an opening portion 18a opened in the lower surface of the bottom wall 4a. The opening portions 18a of the boss portions 18 also serve as screw reception holes. As shown in FIG. 16, two of the plurality of opening portions 18a are located at the left and right side portions of the rear end of the bottom wall 4a.

Figure 11:
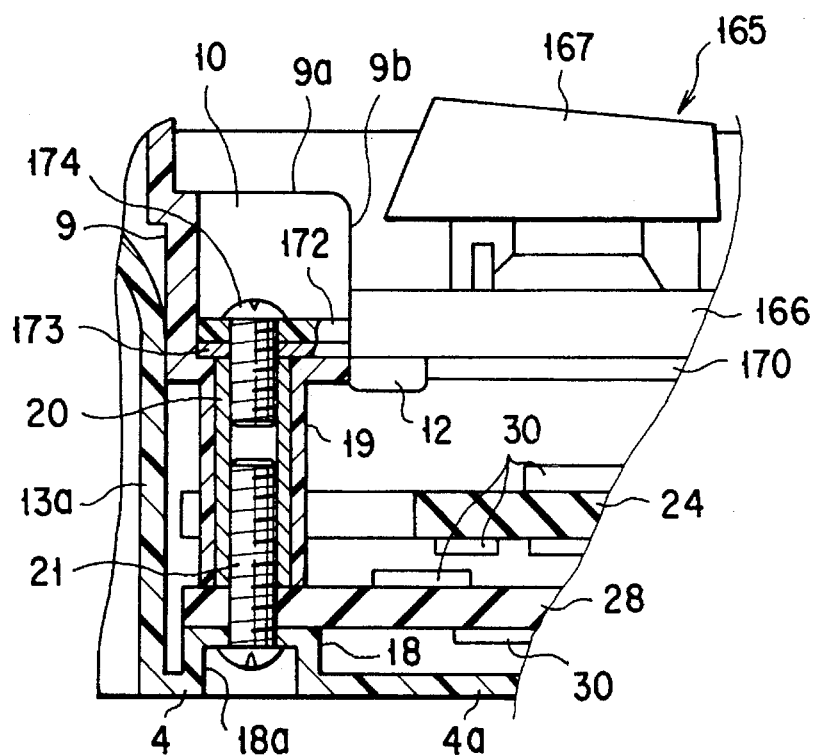

As representatively shown in FIG. 11, the top cover 5 has a plurality of screw receiving portions 19 extending downward. The screw receiving portions 19 oppose some of the boss portions 18 when the top cover 5 is fitted on the bottom case 4. Metal nuts 20 are embedded in these screw receiving portions 19. The nuts 20 are exposed on the lower end surfaces of the screw receiving portions 19. The top cover 5 is coupled to the bottom case 4 as follows. Screws 21 are caused to extend through some of the boss portions 18 while the peripheral portion of the upper wall 5a is hooked on the upper edge portions of the walls 4b to 4e of the bottom case 4. The screws 21 are then threadably engaged with the nuts 20.

Figure 7:
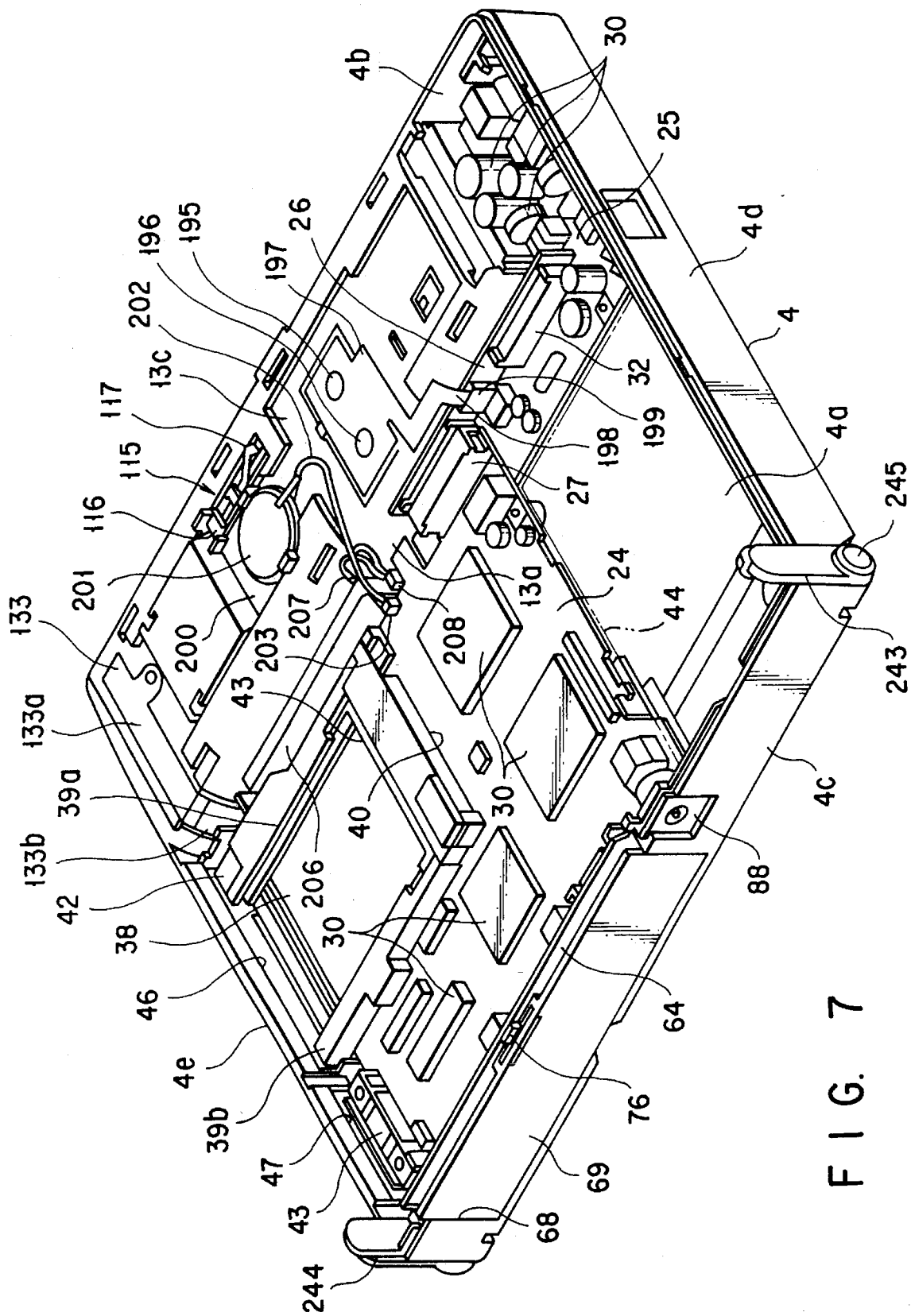

As shown in FIGS. 7 and 8, first to third circuit boards 24 to 26 are housed in the bottom case 4. The first circuit board 24 is a system board located behind the battery receptacle 13. A plurality of portions of the peripheral portion of the first circuit board 24 are fixed to the boss portions 18 through the screws 21. The first circuit board 24 is located below the keyboard mount port 7. The peripheral portion of the first circuit board 24 is adjacent to the upright wall 13a of the battery receptacle 13 and the right side wall 4e and rear wall 4c of the bottom case 4. A first relay connector 27 is arranged on the upper surface of the first circuit board 24. The first relay connector 27 is arranged along the upright wall 13a at a position adjacent thereto.

The second circuit board 25 is a power supply board, which is arranged in the bottom case 4 at a position between the left side wall 4d of the bottom case 4 and the end wall 13b of the battery receptacle 13. The second circuit board 25 has an extended portion 28 extending to the right along the upright wall 13a of the battery receptacle 13. A plurality of portions of the second circuit board 25, including the extended portion 28, are fixed to the boss portions 18 on the bottom wall 4a through the screws 21. A second relay connector 29 is arranged on the upper surface of the extended portion 28. The second relay connector 29 is arranged along the upright wall 13a at a position adjacent thereto. That is, the first and second relay connectors 27 and 29 are arranged side by side at the positions adjacent to the upright wall 13a.

As shown in FIG. 11, the extended portion 28 of the second circuit board 25 extends between the first circuit board 24 and the bottom wall 4a at the position adjacent to the upright wall 13a. With this arrangement, portions of the first and second circuit boards 24 and 25 are vertically stacked on each other. A large number of circuit parts 30, e.g., IC chips and capacitors, are mounted on the upper and lower surfaces of the first and second circuit boards 24 and 25. The two circuit boards 24 and 25 are stacked in this manner so that the circuit parts 30 mounted on the circuit boards 24 and 25 can be three-dimensionally arranged. Therefore, a large number of circuit parts 30 can be properly arranged in the bottom case 4 having a limited size.

As shown in FIG. 8, the third circuit board 26 is a relay board for electrically connecting the first and second circuit boards 24 and 25 to each other. The third circuit board 26 is arranged in a vertical posture along the upright wall 13a at a position adjacent thereto. The third circuit board 26 includes third and fourth relay connectors 31 and 32 and a connector 199. The third and fourth relay connectors 31 and 32 are fitted on the first and second relay connectors 27 and 29, respectively. With this fitting, the first and second circuit boards 24 and 25 are electrically connected to each other, and the vertical posture of the third circuit board 26 itself is held. In addition to the third circuit board 26, the connecting portion between the first and third relay connectors 27 and 31 and the connecting portion between the second and fourth relay connectors 29 and 32 are located below the keyboard support portion 9 at positions outside the keyboard mount port 7.

As shown in FIG. 8, the first and second circuit boards 24 and 25 have conductive portions 33 on portions abutting against the boss portions 18. The conductive portions 33 are connected to ground wiring patterns 24a and 25a printed on the first and second circuit boards 24 and 25, respectively. While the first and second circuit boards 24 and 25 are fixed to the bottom case 4 with screws, the conductive portions 33 are in contact with the plating layer of the bottom case 4. Therefore, with this contact between the conductive portions 33 and the plating layer, the bottom case 4 is electrically connected to the ground wiring patterns 24a and 25a.

As shown in FIG. 8, a power supply connector 36 is arranged on the upper surface of the second circuit board 25. The power supply connector 36 is located inside the connector extraction port 14 of the bottom case 4. The power supply connector 36 has a plurality of contact terminals 35 exposed to the battery receptacle 13. These contact terminals 35 can be elastically deformed in a direction to protrude toward the battery receptacle 13 and are always kept protruding toward the battery receptacle 13.

As shown in FIG. 7, a card storage portion 38 is formed on the upper surface of the first circuit board 24. The card storage portion 38 serves to store a memory card or an interface card. The card storage portion 38 is located behind the battery receptacle 13 and is also arranged at a position adjacent to the right side wall 4e of the bottom case 4. The card storage portion 38 has a pair of guide rails 39a and 39b. The guide rails 39a and 39b serve to hold the card and guide ejection/insertion of the card. The guide rails 39a and 39b extend parallel in the lateral direction of the bottom case 4. One end of each of the guide rails 39a and 39b is located to be adjacent to the right side wall 4e of the bottom case 4. A card connector 40 is arranged between the other end of the guide rail 39a and that of the guide rail 39b. The card is detachably connected to the card connector 40.

The card storage portion 38 has an ejector for ejecting the card. The ejector has the same arrangement as that of a known one. More specifically, the ejector includes an eject button 42 supported on one guide rail 39a, and an eject plate 43 having a lock pawl (not shown) to be locked to the leading end of the card. The eject button 42 and the eject plate 43 are interlocked with each other. The eject button 42 is arranged side by side with the guide rail 39a to be adjacent to the right side wall 4e of the bottom case 4. An FDD connector 43 for the connection of an external floppy disk drive is arranged on the upper surface of the first circuit board 24. The FDD connector 43 is arranged behind the card storage portion 38 to be adjacent to the right side wall 4e of the bottom case 4.

As shown in FIGS. 1 and 7, a 2.5-inch hard disk drive 44 is housed in the bottom case 4. The hard disk drive 44 is arranged at a corner portion defined by the rear wall 4c and left side wall 4d of the bottom case 4. The hard disk drive 44 is arranged in the bottom case 4 to be adjacent to the first and second circuit boards 24 and 25. As shown in FIG. 2, the hard disk drive 44 is connected to the first circuit board 24 via a flexible wiring board 45.

Figure 12:
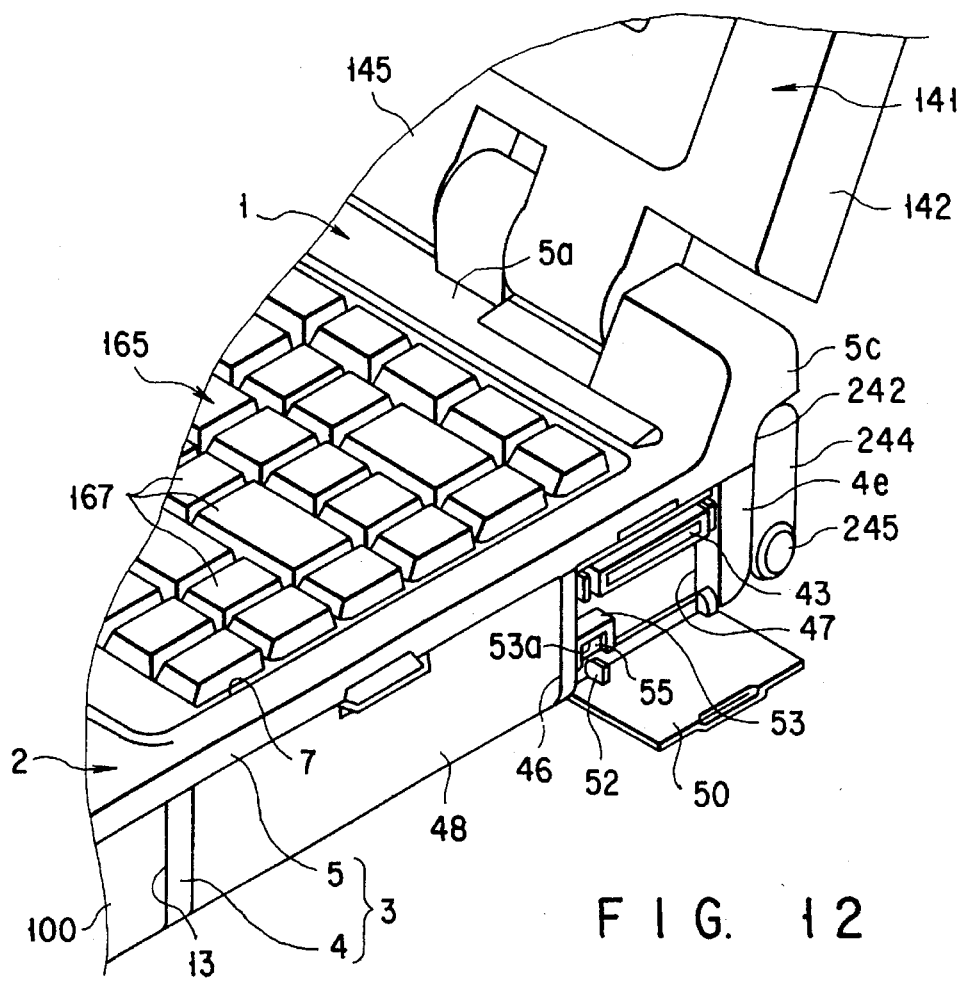

As shown in FIGS. 7 and 12, a card insertion port 46 and a connector extraction port 47 are formed in the right side wall 4e of the bottom case 4. The card insertion port 46 communicates with the card storage portion 38. The connector extraction port 47 serves to expose the FDD connector 43, and opposes the FDD connector 43. One end of each of the guide rails 39a and 39b and the eject button 42 face the card insertion port 46. The card insertion port 46 is opened/closed by a side cover 48. The side cover 48 is supported on the right side wall 4e of the bottom case 4 to be pivotal between a closing position where the cover closes the card insertion port 46 and an opening position where the cover tilts to the right side of the bottom case 4 to open the card insertion port 46. When the side cover 48 is pivoted to the closing position, the cover 48 becomes continuous with the right side wall 4e of the bottom case 4 on the same plane.

Figure 13:
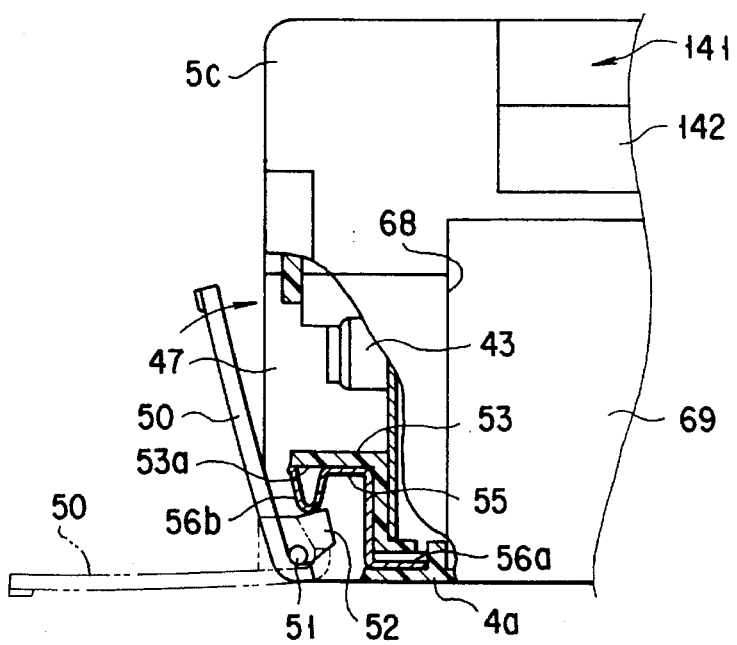

As shown in FIGS. 12 and 13, a first connector cover 50 for opening/closing the connector extraction port 47 is supported on the right side wall 4e of the bottom case 4. The first connector cover 50 has shaft portions 51 at two side portions of its lower end. The shaft portions 51 are pivotally supported on the opening edge portion of the connector extraction port 47. With this arrangement, the first connector cover 50 is pivotal between a closing position where the cover closes the connector extraction port 47 and an opening position where the cover tilts to the right side of the bottom case 4 to open the connector extraction port 47. When the first connector cover 50 is pivoted to the closing position, the cover 50 becomes continuous with the right side wall 4e of the bottom case 4 on the same plane.

A spring receiving portion 52 extends from the inner surface of the lower end portion of the first connector cover 50. When the first connector cover 50 is pivoted to the closing position, the spring receiving portion 52 is located inside the connector extraction port 47. A spring support portion 53 is arranged inside the connector extraction port 47. The spring support portion 53 is integrally formed on the bottom wall 4a of the bottom case 4. The spring support portion 53 has an opening 53a opposing the spring receiving portion 52. When the first connector cover 50 is pivoted through a certain angle toward the closing position, the spring receiving portion 52 is located inside the opening 53a.

A return spring 55 is arranged on the spring support portion 53. The return spring 55 serves to forcibly pivot the first connector cover 50 toward the closing position. The return spring 55 is formed by bending a metal plate. As shown in FIG. 13, the return spring 55 integrally has a support portion 56a and a bent portion 56b which can be elastically deformed. The support portion 56a is supported on the lower end of the spring support portion 53. The bent portion 56b protrudes downward from the upper end of the opening 53a. When the spring receiving portion 52 of the first connector cover 50 is inserted in the opening 53a, the bent portion 56b is brought into tight contact with the upper end of the spring receiving portion 52 from above. In this case, the position where the bent portion 56b is brought into tight contact with the spring receiving portion 52 is located inside the connector extraction port 47 at a level higher than that of the shaft portions 51. With this arrangement, when the bent portion 56b of the return spring 55 is brought into tight contact with the spring receiving portion 52, a pressing force is applied to the first connector cover 50 to pivot it upward about the shaft portions 51. With this pressing force, the first connector cover 50 is forcibly pivoted toward the closing position, as indicated by the arrow in FIG. 13, and is held at the closing position.

Assume that the first connector cover 50 is pivoted from the closing position toward to the opening position. In this case, when pivot angle of the first connector cover 50 reaches a certain value, the spring receiving portion 52 is separated from the bent portion 56b. When the spring receiving portion 52 is separated from the bent portion 56b, the pressing force for pivoting the first connector cover 50 in the closing direction is lost. For this reason, the first connector cover 50 can be pivoted to the opening position.

Since the first connector cover 50 is held at the closing position by the pressing force of the return spring 55, a pawl detachably engaged with the bottom case 4 can be omitted from the first connector cover 50. Therefore, the problem of the breakage of a pawl is not posed even if the first connector cover 50 is repeatedly opened/closed. This eliminates the inconvenience that the first connector cover 50 cannot be held at the same position because of the breakage of the pawl.

According to the above arrangement, when the spring receiving portion 52 is locked to the bent portion 56b of the return spring 55, the first connector cover 50 is automatically pivoted toward the closing position by the pressing force of the return spring 55. Therefore, the first connector cover 50 need not be pushed completely to the closing position. That is, in addition to the advantage that there is no possibility of breakage of a pawl, the operability of the first connector cover 50 in an opening/closing operation improves.

As shown in FIGS. 14 and 15, a metal connector panel 64 is attached to the rear end portion of the first circuit board 24. The connector panel 64 is arranged in a vertical posture with respect to the first circuit board 24. A connection port 61, a parallel port 62, and a first expansion connector 63 are arranged in a line on this connector panel 64. The connection port 61 allows connection of an external device having an interface connector complying with, e.g., the RS232C standard. The parallel port 62 allows connection of a printer. The first expansion connector 63 is used for expanding the function of the portable computer 1. The first expansion connector 63 has a pair of positioning holes 63a and 63b. These positioning holes 63a and 63b are located on both sides of the first expansion connector 63. The connection port 61, the parallel port 62, and the first expansion connector 63 are electrically connected to the first circuit board 24. The connecting portions between the ports 61 and 62, connector 63 and the first circuit board 24 are covered with the connector panel 64 from the back.

A second connector extraction port 68 is formed in the rear wall 4c of the bottom case 4. The second connector extraction port 68 serves to expose the connection port 61, the parallel port 62, and the first expansion connector 63 at once. The second connector extraction port 68 extends in the lateral direction of the bottom case 4. A second connector cover 69 for opening/closing the second connector extraction port 68 is supported on the bottom case 4. When the second connector extraction port 68 is opened, the second connector cover 69 is housed between the bottom wall 4a of the bottom case 4 and the first circuit board 24. This structure will be described below. As shown in FIG. 17, the connector panel 64 integrally has an extended portion 70 extending below the first circuit board 24. The extended portion 70 is parallel to the bottom wall 4a of the bottom case 4. A cover receptacle 71 in which the second connector cover 69 is inserted is formed between the extended portion 70 and the bottom wall 4a. The cover receptacle 71 is open to the second connector extraction port 68. While the second connector cover 69 is inserted in the cover receptacle 71, the second connector cover 69 is clamped between the bottom wall 4a and the extended portion 70 to prevent backlash of the second connector cover 69.

As shown in FIG. 18, a pair of side walls 72a and 72b and a front wall 72c are formed on the upper surface of the bottom wall 4a of the bottom case 4. The side walls 72a and 72b are located on the left and right side portions of the cover receptacle 71. The front wall 72c is located on the front end portion of the cover receptacle 71. The walls 72a to 72c partition the cover receptacle 71 inside the bottom case 4. As shown in FIG. 19, the rear end portions of the side walls 72a and 72b are continuous with the edge portion of the opening of the second connector extraction port 68. Guide grooves 73 extending in the back-and-forth direction are respectively formed in the end portions, of the side walls 72a and 72b, located on the second connector extraction port 68 side. The end portion, of the guide groove 73, which is continuous with the second connector extraction port 68 is not open to the rear wall 4c of the bottom case 4 but is closed. Each closed end of the guide groove 73 serves as a receiving portion 73a bent in the form of an arc.

The second connector cover 69 has a pair of shaft portions 74a and 74b. The shaft portions 74a and 74b slidably fitted in the guide grooves 73. When the second connector cover 69 is inserted in the cover receptacle 71, the shaft portions 74a and 74b are separated from the guide grooves 73 and slidably clamped between the side walls 72a and 72b. With this structure, when the second connector cover 69 is to be inserted in the cover receptacle 71, inclination and backlash of the second connector cover 69 are prevented.

As shown in FIG. 19, the side walls 72a and 72b respectively have stopper portions 76 for restricting the insertion amount of the second connector cover 69. The stopper portions 76 protrude into the cover receptacle 71 more than the opposing surfaces of the side walls 72a and 72b. These protruding ends of the stopper portions 76 are brought into contact with the shaft portions 74a and 74b, respectively. With this contact, the insertion of the second connector cover 69 into the cover receptacle 71 is restricted. Therefore, as shown in FIG. 15, the second connector cover 69 is held in the cover receptacle 71 while the rear edge portion of the cover 69 slightly protrudes from the second connector extraction port 68.

When the second connector cover 69 is pulled from the cover receptacle 71, the shaft portions 74a and 74b are guided into the receiving portions 73a to be brought into contact therewith. For this reason, the second connector cover 69 can be vertically pivoted about the contact portions between the shaft portions 74a and 74b and the receiving portions 73a. While the second connector cover 69 is pivoted upward to close the second connector extraction port 68, the second connector cover 69 becomes continuous with the rear wall 4c of the bottom case 4 on the same plane.

The second connector cover 69 includes a latch 77. When the second connector cover 69 is pivoted to the closing position, the latch 77 is hooked on the top cover 5 to hold the second connector cover 69 at the closing position.

When the second connector cover 69 held at the closing position is to be opened, the operator pulls the second connector cover 69 backward with his/her finger held on the upper edge of the cover 69. As a result, the second connector cover 69 is pivoted backward about the contact portions between the shaft portions 74a and 74b and the receiving portions 73a. As shown in FIG. 14, the second connector cover 69 then tilts behind the case 3 to a substantially horizontal posture. When the second connector cover 69 is pushed forward in this state, the cover 69 slides forward along the guide grooves 73 to be inserted into the cover receptacle 71. In this case, the second connector cover 69 is vertically clamped between the bottom wall 4a of the bottom case 4 and the extended portion 70 of the connector panel 64, and is also laterally clamped between the side walls 72a and 72b. Therefore, the second connector cover 69 can be smoothly inserted/removed into/from the cover receptacle 71 without being inclined and caught therein.

Since the extended portion 70, which clamps the second connector cover 69 in corporation with the bottom wall 4a, is integrally formed with the connector panel 64, no special guide member for the second connector cover 69 is required. Therefore, the number of components of the computer 1 can be decreased, and the weight and cost of the computer 1 can be reduced.

Figure 20:
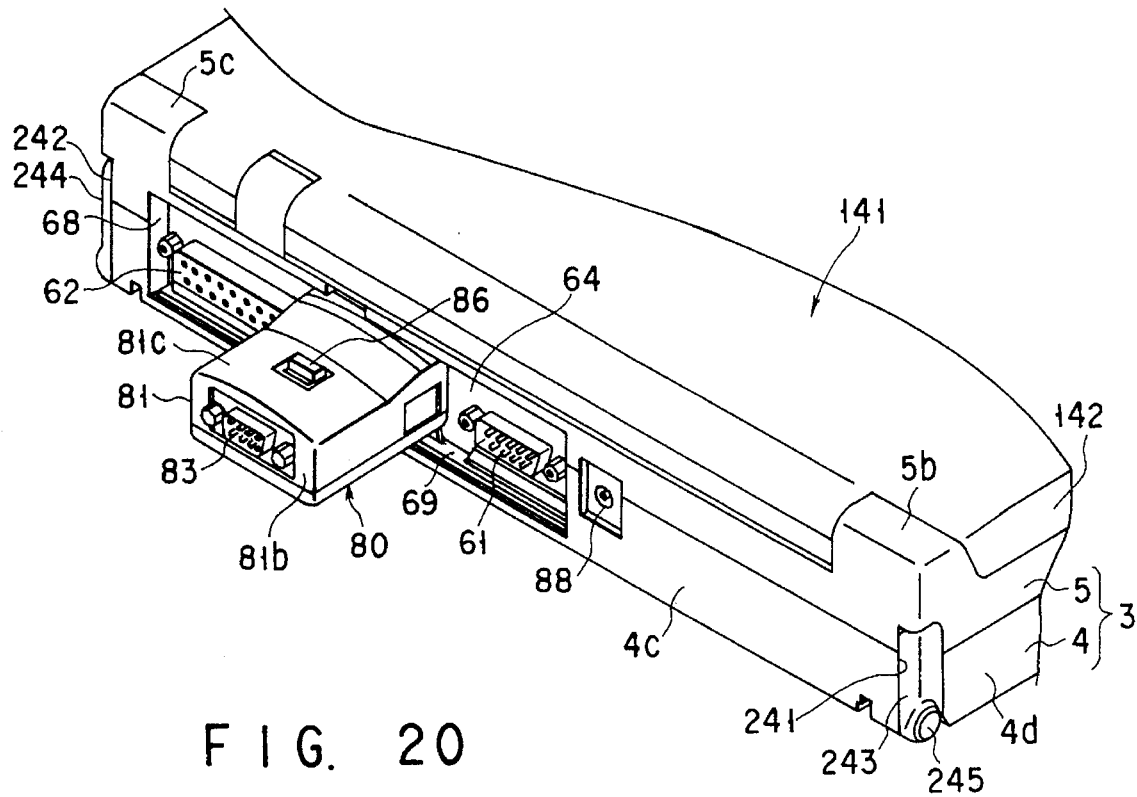
Figure 21:
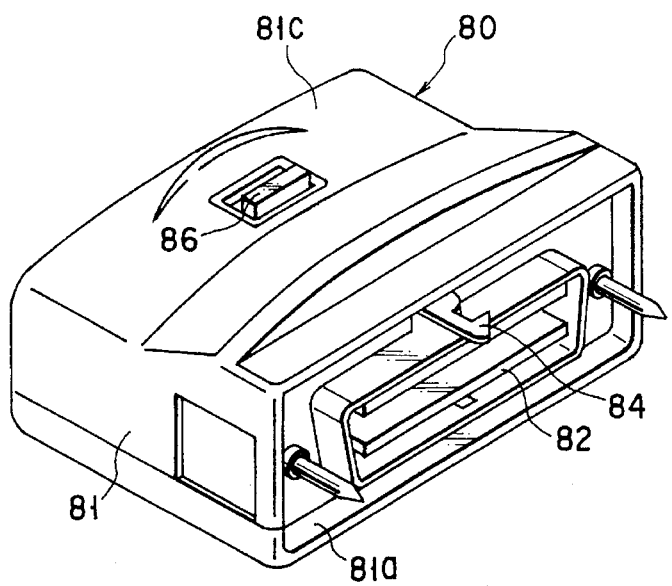

As shown in FIG. 20, the computer 1 includes an RGB adaptor 80. The RGB adaptor 80 is used to connect an external CRT display, and has an adaptor body 81. The adaptor body 81 has front and rear surfaces 81a and 81b, which oppose each other, and an upper surface 81c extending between the two surfaces 81a and 81b. An interface connector 82 is arranged on the front surface 81a. The interface connector 82 is detachably connected to the first expansion connector 63. An RGB connector 83 for the connection of the external CRT display is arranged on the rear surface 81b. A lock pawl 84 is arranged on the front surface 81a. When the interface connector 82 is connected to the first expansion connector 63, the lock pawl 84 is detachably locked in a lock hole 85 in the connector panel 64. With this locking, the RGB adaptor 80 is held on the computer 1. The lock pawl 84 is released from the lock hole 85 by sliding a release lever 86 of the upper surface 81c of the adaptor body 81 backward. With this operation, the RGB adaptor 80 can be removed from the computer 1.

As shown in FIGS. 7 and 14, a power supply connector 88 is arranged on the rear wall 4c of the bottom case 4. The power supply connector 88 is mounted on the upper surface of the first circuit board 24. The plug of an AC adaptor connected to a commercial power supply is inserted in the power supply connector 88.

As shown in FIG. 16, a pair of left and right engaging holes 90a and 90b are formed in the rear end portion of the bottom wall 4a. The engaging holes 90a and 90b are located immediately before the second connector extraction port 68 and have an elongated shape extending in the back-and-forth direction of the second connector extraction port 68. When viewed from the rear side of the bottom case 4, the engaging holes 90a and 90b are distributed/arranged on the left and right sides of the first expansion connector 63.

Figure 48:
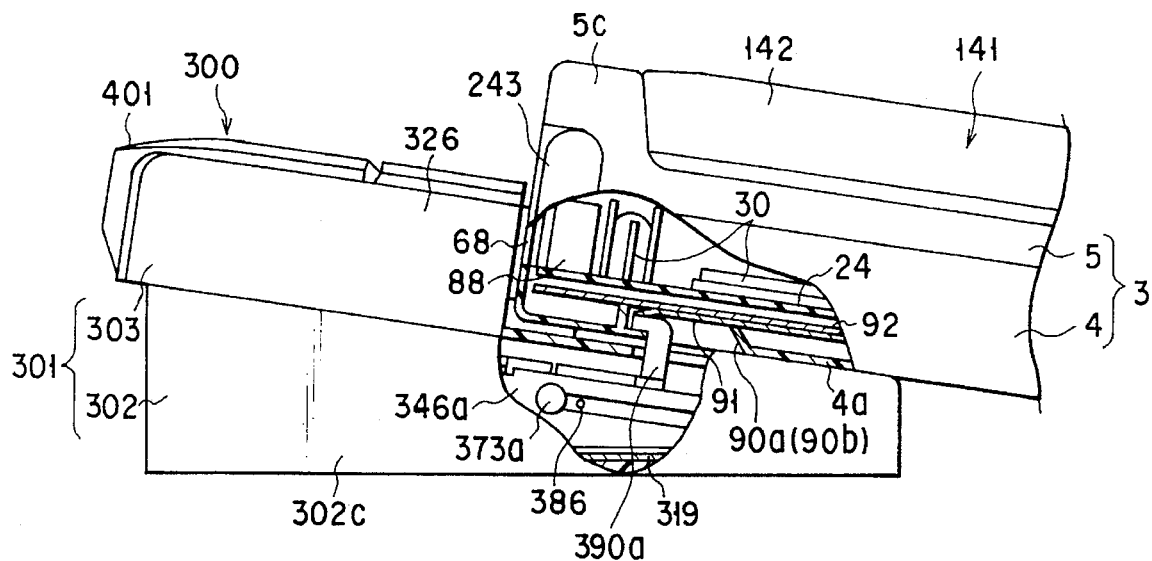

As shown in FIG. 48, the engaging holes 90a and 90b are located below the first circuit board 24. Metal terminal pieces 91 are respectively arranged in the opening ends, of the engaging holes 90a and 90b, which extend into the bottom case 4. Each terminal piece 91 is fixed to the lower surface of a terminal support portion 92 continuous with the connector panel 64 by means of spot welding or the like. With this structure, the terminal pieces 91 are electrically connected to the connector panel 64.

A battery pack 100 is detachably mounted in the battery receptacle 13 of the bottom case 4. The battery pack 100 serves as a driving power supply when the computer 1 is used in a place where no commercial power supply is available. The battery pack 100 is relatively heavy. As shown in FIG. 6, the battery pack 100 has a case 101 housing a nickel-cadmium battery. The case 101 has a rectangular box-like shape almost identical to the shape of the battery receptacle 13. For this reason, while the battery pack 100 is mounted in the battery receptacle 13, an entire outer surface 101a of the case 101 is continuous with the bottom wall 4a, front wall 4b, and right side wall 4e of the bottom case 4. The battery receptacle 13 is continuously open to the three walls 4a, 4b, and 4e of the bottom case 4 in this manner. With this structure, the height of the case 3 can be decreased by a size corresponding to the thickness of the bottom wall 4a, as compared with a case wherein the battery receptacle 13 is surrounded by the three walls 4a, 4b, and 4e. In addition, since the battery pack 100 is exposed outside the bottom case 4, the space occupied by the battery receptacle 13 in the case 3 can be reduced. Therefore, a low-profile case 3 can be realized without sacrificing any mount space in the case 3.

As shown in FIGS. 24A and 24B, the case 101 of the battery pack 100 has a distal end surface 101c opposing the end wall 13b of the battery receptacle 13. A plurality of signal and power supply terminals 104 are arranged on the distal end surface 101c. When the battery pack 100 is mounted in the battery receptacle 13, the terminals 104 are brought into contact with the contact terminals 35 of the power supply connector 36. With this contact, the battery pack 100 is electrically connected to the computer 1.

As shown in FIG. 6, the case 101 of the battery pack 100 has an upper surface 101b opposing the ceiling wall 13c of the battery receptacle 13. A pair of guide projection portions 102a and 102b extend from two side portions of the upper surface 101b. The guide projection portions 102a and 102b extend along the front and rear edge portions of the upper surface 101b. Each of the guide projection portions 102a and 102b has three first engaging portions 103. These first engaging portions 103 are arranged at intervals in the longitudinal direction of the case 101 and are open toward the distal end surface 101c of the case 101.

The ceiling wall 13c of the battery receptacle 13 has a pair of guide recess portions 105a and 105b in which the guide projection portions 102a and 102b are fitted. The guide recess portions 105a and 105b extend along the longitudinal direction of the battery receptacle 13. Each of the guide recess portions 105a and 105b has three second engaging portions 106. The second engaging portions 106 are arranged at intervals in the longitudinal direction of the guide recess portions 105a and 105b. Gaps 113 are formed between the second engaging portions 106 and the bottom surfaces of the guide recess portions 105a and 105b. The first engaging portions 103 are detachably fitted in these gaps 113.

In mounting the battery pack 100 in the battery receptacle 13, first of all, the case 101 of the battery pack 100 is fitted in the battery receptacle 13. With this operation, the first engaging portions 103 are located between the second engaging portions 106, and the upper surface 101b of the case 101 is brought into contact with the ceiling wall 13c. In this state, the battery pack 100 is slid to bring the distal end surface 101c of the case 101 near the end wall 13b of the battery receptacle 13. As a result, the first engaging portions 103 are fitted in the gaps 113, and the first engaging portions 103 are engaged with the second engaging portions 106. With this engagement, the battery pack 100 is held in the battery receptacle 13.

As shown in FIG. 6, the case 3 has a lock means for locking the battery pack 100 in the battery receptacle 13. This lock means has a lock piece 107 capable of retracting from the upright wall 13a into the battery receptacle 13. The lock piece 107 is located at the opening end, of the battery receptacle 13, which faces the right side wall 4e of the bottom case 4. The lock piece 107 is always biased by a spring (not shown) to protrude into the battery receptacle 13. When the battery pack 100 is slid toward the end wall 13b, the lock piece 107 is engaged with a recess portion 108 of the case 101. With this engagement, sliding movement of the battery pack 100 is prevented, and the engagement between the first and second engaging portions 103 and 106 are maintained.

As shown in FIG. 16, the lock piece 107 has a release lever 109. The release lever 109 is exposed on the lower surface of the bottom wall 4a. The release lever 109 is supported on the bottom wall 4a to be slidable between a lock position where the lock piece 107 is caused to protrude into the battery receptacle 13 and a lock release position where the lock piece 107 is caused to retract from the battery receptacle 13 into the case 3. When the release lever 109 is slid to the lock release position, the lock piece 107 retracts from the battery receptacle 13, and the engagement between the lock piece 107 and the recess portion 108 is released. With this operation, the battery pack 100 can be removed from the battery receptacle 13.

A safety lever 110 is arranged on the bottom wall 4a of the bottom case 4. The safety lever 110 serves to hold the release lever 109 at the lock position so as to prevent removal of the battery pack 100.

As shown in FIGS. 7 and 24A, the battery receptacle 13 has a stopper 115. The stopper 115 prevents ejection of the battery pack 100 when the lock of the battery pack 100 is released. The stopper 115 includes a stopper body 116 consisting of a synthetic resin, and a spring 117 for pressing the stopper body 116. The stopper body 116 is arranged between the ceiling wall 13c and the upper wall 5a of the top cover 5. One end of the stopper body 116 is supported on the ceiling wall 13c via a pivot shaft 119 to be pivotal in the vertical direction. With this structure, the stopper body 116 is arranged in a horizontal posture along the upper wall 5a and the ceiling wall 13c.

The stopper body 116 has an engaging pawl 118 at an end portion on the side opposite to the pivotally supported end portion. The engaging pawl 118 is capable of retracting/ protruding from/into the battery receptacle 13 via a through hole 120 formed in the ceiling wall 13c. The through hole 120 is formed in the bottom surface of one guide recess portion 105a. With this structure, the stopper body 116 is vertically pivoted between the first position where the engaging pawl 118 is caused to protrude into the battery receptacle 13 and the second position where the engaging pawl 118 is caused to retract into the through hole 120.

As shown in FIG. 24A, the spring 117 is clamped between the stopper body 116 and the upper wall 5a of the top cover 5. For this reason, the spring 117 presses the stopper body 116 toward the first position. With this pressing operation, the engaging pawl 118 of the stopper body 116 is caused to protrude from the through hole 120 into the battery receptacle 13.

As shown in FIG. 6, an engaging projection portion 122 is formed on the upper surface 101b of the battery pack 100. The engaging projection portion 122 is continuous with the first guide projection portion 102a. When the battery pack 100 is mounted in the battery receptacle 13, the engaging projection portion 122 is inserted in the guide recess portion 105a and shifted/located to be closer to the power supply connector 36 than the through hole 120 in the guide recess portion 105a. As shown in FIG. 24A, when the battery pack 100 is completely mounted in the battery receptacle 13, the engaging projection portion 122 is shifted to be closer to the power supply connector 36 than the engaging pawl 118.

As described above, the contact terminals 35 of the power supply connector 36 are always biased in a direction to protrude into the battery receptacle 13. For this reason, when the release lever 109 is operated to release the lock of the battery pack 100, the battery pack 100 is pushed out by the contact terminals 35 in a direction to separate from the end wall 13b. With this operation, the first engaging portions 103 of the battery pack 100 may be removed from the second engaging portions 106 of the battery receptacle 13.

In the above arrangement, however, the engaging pawl 118 of the stopper body 116 is always caused to protrude from the ceiling wall 13c of the battery receptacle 13, and the engaging pawl 118 is caused to oppose the engaging projection portion 122 of the battery pack 100. For this reason, as shown in FIG. 24B, when the battery pack 100 is pushed out in a direction to separate from the contact terminals 35, the engaging projection portion 122 is hooked to the engaging pawl 118 before the first engaging portions 103 are disengaged from the second engaging portions 106. With this operation, the battery pack 100 is prevented from being pushed out, and the engagement between the first engaging portions 103 and the second engaging portions 106 is maintained, thereby preventing ejection of the battery pack 100 and accidental removal of the battery pack 100.

Figure 24C:
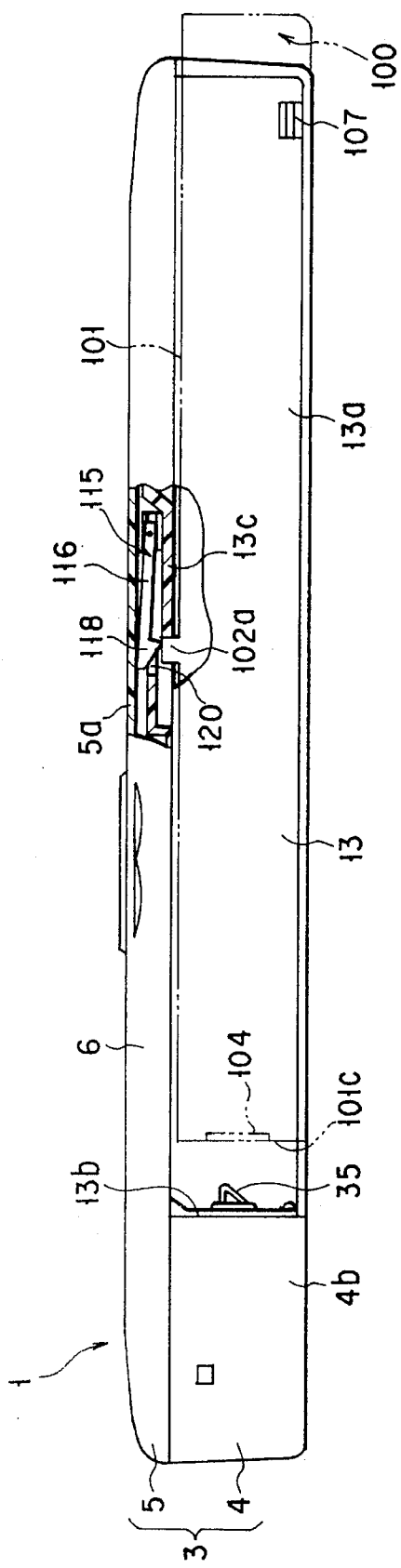
FIG. 24C is a partially sectional front view showing the computer in a state wherein the battery pack is removed from the battery receptacle.

When the battery pack 100 is to be removed from the battery receptacle 13, the lock of the battery pack 100 is released first. The operator then grips the battery pack 100 with his/her fingers and forcibly slides it in a direction to separate from the contact terminals 35. As a result, as shown in FIG. 24C, the engaging pawl 118 is slid on the guide projection portion 102a, and the stopper body 116 is pivoted upward against the biasing force of the spring 117. With this pivoting movement, the engagement between the engaging pawl 118 and the guide projection portion 102a is released. As a result, the battery pack 100 can be slid to the position where the engagement between the first engaging portions 103 and the second engaging portions 106 is released, and the battery pack 100 can be removed from the battery receptacle 13.

The stopper 115 is constituted by the stopper body 116 pivotally supported on the ceiling wall 13c and the spring 117 for pressing the stopper body 116. With this structure, if several springs 117 having different biasing forces are prepared, the hooking strength of the battery pack 100 with respect to the stopper body 116 can be arbitrarily changed by selecting a proper one of the springs 117. A hooking strength corresponding to the weight of the battery pack 100 can be obtained, unlike a case wherein the stopper 115 is integrally formed with the battery receptacle 13. If the stopper 115 is integrally formed with the battery receptacle 13, the structure of a mold for the top cover 5 must be changed to change the hooking strength of the battery pack 100. According to the above arrangement, however, such a change in hooking strength can be made by replacing only the spring 117.

In addition, even if the hooking strength of the battery pack 100 with respect to the stopper 115 decreases owing to fatigue of the spring 117 or the like, only the spring 117 needs to be replaced. For this reason, the function of preventing ejection of the battery pack 100 can be maintained for a long period of time.

Furthermore, the battery receptacle 13 is continuously open to not only the bottom wall 4a of the bottom case 4 but also the right side wall 4e of the bottom case 4, and the portion open to the right side wall 4e is located on the side opposite to the power supply connector 36. For this reason, when the battery pack 100 is mounted in the battery receptacle 13, an end portion, of the battery pack 100, located on the side opposite to the terminals 104 can always be caused to protrude to the right side of the bottom case 4, as shown is FIGS. 24B and 25. Consequently, there is no need to ensure a space for allowing the battery pack 100 to slide inside the battery receptacle 13, and the battery receptacle 13 can be formed to have almost the same size as that of the battery pack 100. Therefore, an unnecessary space can be removed from the battery receptacle 13, and a reduction in the size of the case 3 can be realized.

The first and second engaging portions 103 and 106 are arranged at a plurality of positions spaced apart from each other in the sliding direction of the battery pack 100. For this reason, the battery pack 100 is held in the battery receptacle 13 at the plurality of positions along the sliding direction. Therefore, the battery pack 100 can be firmly held in the battery receptacle 13, and backlash of the battery pack 100 in the battery receptacle 13 can be prevented.

While the battery pack 100 is mounted in the battery receptacle 13, the weight of the battery pack 100 is shared by the first and second engaging portions 103 and 106, and hence the load on each of the engaging portions 103 and 106 is reduced. Therefore, the first and second engaging portions 103 and 106 can be reduced in size.

As shown in FIG. 22, the battery receptacle 13 has a support leg 125. The support leg 125 supports the ceiling wall 13c when the battery pack 100 is removed from the battery receptacle 13. The support leg 125 has a plate-like leg body 126. The leg body 126 has a shaft portion (not shown) at one end. This shaft portion is pivotally coupled to the ceiling wall 13c. With this structure, the leg body 126 can be pivoted between a nonuse position where the leg body 126 is pivoted to be parallel to the ceiling wall 13c and a use position where the leg body 126 is caused to protrude downward from the ceiling wall 13c. The leg body 126 is located aside the right side wall 4e of the bottom case 4. While the leg body 126 is pivoted to the use position, a ground surface 126a of the lower end of the leg body 126 is located on the same plane as that of the bottom wall 4a of the bottom case 4.

A recess portion 127 is formed in the ceiling wall 3c. The recess portion 127 serves to house the leg body 126 when the leg body 126 is pivoted to the nonuse position. As shown in FIG. 23, while the leg body 126 is housed in the recess portion 127, the lower surface of the leg body 126 becomes continuous with the ceiling wall 13c on the same plane. The recess portion 127 has a size slightly larger than that of the leg body 126. While the leg body 126 is housed in the recess portion 127, a gap 128 is formed between the ground surface 126a of the leg body 126 and the recess portion 127. When the leg body 126 housed in the recess portion 127 is to be raised, the operator inserts his/her finger tip in this gap 128. The operator can raise the leg body 126 to the use position by hooking the finger tip on the ground surface 126a of the leg body 126. A lock piece 129 is formed on the bottom surface of the recess portion 127 which is continuous with the gap 128. When the leg body 126 is pivoted to the nonuse position, the lock piece 129 is detachably hooked on the leg body 126 to hold the leg body 126 at the nonuse position.

Figure 10:
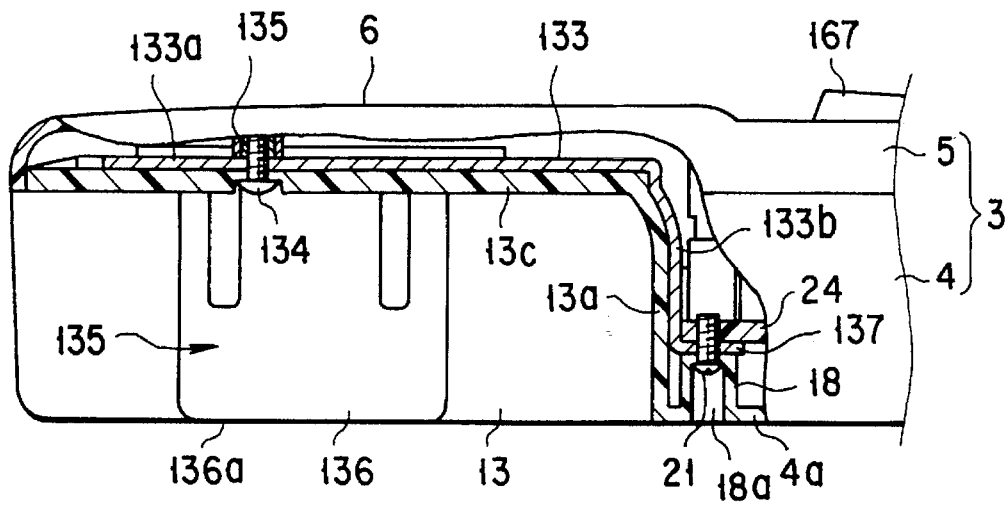

As shown in FIGS. 7 and 10, a reinforcing metal member 133 is attached to the bottom case 4. The reinforcing metal member 133 serves to reinforce the right opening end portion of the battery receptacle 13 when the battery pack 100 is removed from the battery receptacle 13. The reinforcing metal member 133 integrally has first and second reinforcing portions 133a and 133b. The first reinforcing portion 133a is stacked on the upper surface of the ceiling wall 13c. The second reinforcing portion 133b is stacked on the inner surface of the upright wall 13a. A screw 134 extends upward through the stacking portion between the first reinforcing portion 133a and the ceiling wall 13c. The leading end of the screw 134 is threadably engaged with a boss portion 135 on the lower surface of the hand rest portion 6. With this threadable engagement, the battery receptacle 13 is coupled to the hand rest portion 6. A support piece 137 is integrally formed with the lower end of the second reinforcing portion 133b. As shown in FIG. 10, the support piece 137 is interposed between the boss portion 18 and the first circuit board 24 and is fixed through the screw 21. With this structure, the first reinforcing portion 133a of the reinforcing metal member 133 is clamped between the ceiling wall 13c and the hand rest portion 6, thereby reinforcing the hand rest portion 6 as well as the battery receptacle 13.

As shown in FIG. 1, a display unit 141 is supported the display support portions 5b and 5c of the top cover 5. The display unit 141 includes a low-profile, box-like housing 142, and a liquid crystal display 143 housed in the housing 142. The housing 142 has a display window 144 for exposing the liquid crystal display 143. The housing 142 has a coupling portion 145 interposed between the display support portions 5b and 5c. The left and right end portions of the coupling portion 145 are coupled to the display support portions 5b and 5c via hinge mechanisms (not shown), respectively. With this structure, the display unit 141 can be pivoted about the coupling portions between the display unit 141 and the display support portions 5b and 5c in the range of about 180× between the first position where the display unit 141 covers the hand rest portion 6 and keyboard mount port 7 of the top cover 5, the second position where the display unit 141 is raised upright behind the keyboard mount port 7, and the third position where the display unit 141 is tilted behind the case 3. As shown in FIG. 16, while the display unit 141 is pivoted to the first position, the housing 142 of the display unit 141 becomes continuous with the front surface and left and right side surfaces of the case 3 on substantially the same plane. That is, the computer 1 is folded into a box-like shape to be easily carried.

Figure 26:
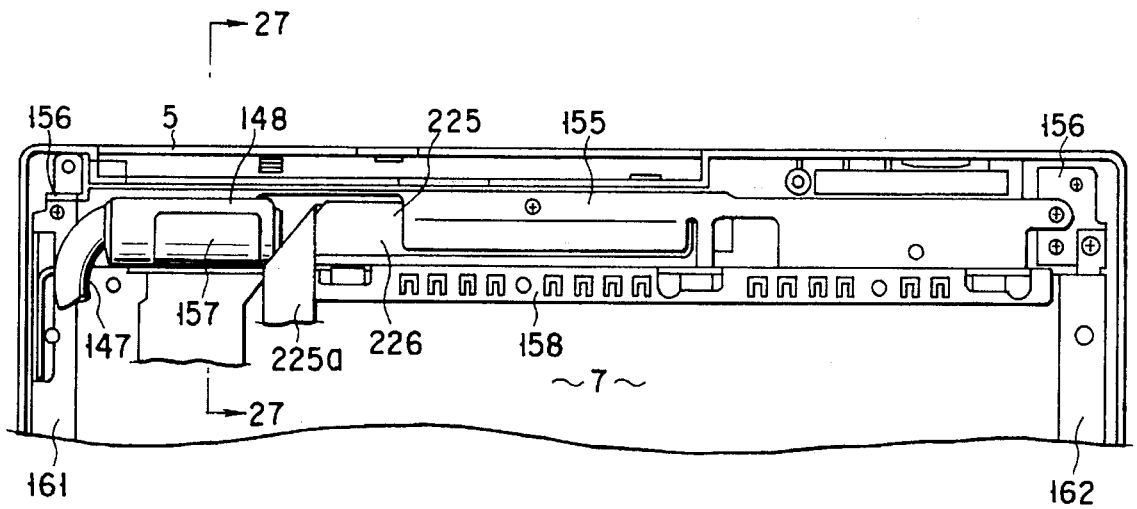

As shown in FIG. 26, a cable 147 connected to the liquid crystal display 143 is led into the top cover 5. The cable 147 laterally extends along the rear edge of the opening of the keyboard mount port 7 inside the top cover 5. A cylindrical core 148 for protecting the cable 147 is mounted around the cable 147. The distal end of the cable 147 is connected to a display connector 149 (FIG. 2) on the upper surface of the first circuit board 24.

Figure 27:
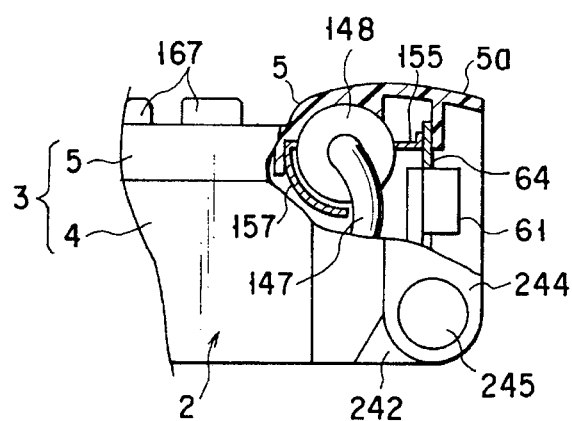

As shown in FIG. 26, a rear shield plate 155 made of a metal is mounted on the inner surface of the rear end portion of the top cover 5. The rear shield plate 155 laterally extends along the rear edge of the opening of the keyboard mount port 7. The left and right end portions of the rear shield plate 155 are screwed to metal brackets 156, respectively. The brackets 156 support the hinge mechanisms. The rear shield plate 155 is located above the connection port 61, the parallel port 62, and the first expansion connector 63. As shown in FIG. 27, the rear end of the rear shield plate 155 is in contact with the upper end of the connector panel 64. Therefore, the rear shield plate 155 integrally supports the connecting portions between the first circuit board 24, the connection port 61, the parallel port 62, and the first expansion connector 63 in cooperation with the connector panel 64, thereby preventing leakage of high-frequency noise from the case 3.

As shown in FIG. 26, the rear shield plate 155 integrally has a conductive piece 158 and a cable guide 157. The conductive piece 158 is exposed to the rear edge of the opening of the keyboard mount port 7. The cable guide 157 is located at a portion opposing the core 148 of the cable 147, and has a shape extending around a lower portion of the core 148. The cable guide 157, together with the upper wall 5a of the top cover 5, clamps and holds the core 148, and determines the insertion position of the cable 147.

Since the cable guide 157 for holding the core 148 is integrally formed with the rear shield plate 155 near the cable 147 in this manner, neither special holding member for holding the core 148 nor its mount structure are required. Therefore, the number of components can be reduced, and the inner structure of the case 3 can be simplified.

As shown in FIG. 26, a pair of keyboard support plates 161 and 162 made of a metal are screwed to the inner surface of the top cover 5. The keyboard support plates 161 and 162 are arranged along the left and right side edges of the opening of the keyboard mount port 7. The keyboard support plate 161 on the right side is integrally formed with the bracket 156 for one hinge mechanism. The keyboard support plate 162 on the left side is screwed to the bracket 156 for the other hinge mechanism. With this structure, the left and right keyboard support plates 161 and 162 are electrically connected to the rear shield plate 155 via the brackets 156. In addition, a conductive plate 164 (FIG. 2) is arranged on the upper surface of the left keyboard support plate 162. The conductive plate 164 has a plurality of conductive pieces 163a.

As shown in FIG. 2, a keyboard 165 as an information input means is detachably mounted in the keyboard mount port 7. The keyboard 165 has a keyboard panel 166 consisting of a synthetic resin. The keyboard panel 166 has a flat, rectangular, plate-like shape which can be fitted in the keyboard mount port 7. A large number of keys 167 and a joy stick 168 as a kind of pointing device are arranged on the upper surface of the keyboard panel 166. As shown in FIG. 4, the lower surface of the keyboard panel 166 is covered with a metal shield plate 170. The shield plate 170 prevents leakage of noises caused by a key operation, and also has a function of reinforcing the keyboard panel 166.

As shown in FIG. 4, the keyboard panel 166 has a front edge portion located on the front side of the keys 167, and a rear edge portion located on the rear side of the keys 167. A plurality of engaging pieces 171 as the first engaging portions extend from the rear edge portion of the keyboard panel 166. The engaging pieces 171 are arranged at intervals in the lateral direction of the keyboard panel 166. When the keyboard 165 is mounted in the keyboard mount port 7, the engaging pieces 171 are detachably engaged with the notches 8a.

A plurality of mount pieces 172 as the first mount portions extend from the front edge portion of the keyboard panel 166. The mount pieces 172 are arranged at intervals in the lateral direction of the keyboard panel 166. When the keyboard 165 is mounted in the keyboard mount port 7, the mount pieces 172 are fitted in the mount recess portions 10 of the keyboard support portion 9.

As shown in FIG. 11, a plurality of tongue pieces 173 are integrally formed with the front edge of the shield plate 170. The tongue pieces 173 are stacked on the lower surfaces of the mount pieces 172. The tongue pieces 173 are in contact with the bottom surfaces of the mount recess portions 10 and the nuts 11 and 20.

The keyboard 165 having the above arrangement is mounted in the keyboard mount port 7 according to the following procedure.

As shown in FIG. 4, the keyboard 165 is obliquely inserted downward into the keyboard mount port 7 above the case 3 with the rear edge portion of the keyboard panel 166 being the leading end. With this insertion, the engaging pieces 171 are engaged with the notches 8a first, and the rear edge portion of the keyboard panel 166 is hooked on the upper surfaces of the support pieces 8b.

Subsequently, the keyboard 165 is pivoted downward about the hooking portions between the rear edge portion of the keyboard panel 166 and the support pieces 8b to fit the keyboard panel 166 in the keyboard mount port 7. With this fitting operation, the mount pieces 172 of the keyboard panel 166 are inserted into the mount recess portions 10. As a result, the tongue pieces 173 are brought into contact with the nuts 11 and 20, and the front edge portion of the lower surface of the shield plate 170 is supported by the support pieces 12.

At the left and right side portions of the keyboard 165, the shield plate 170 is brought into contact with the keyboard support plates 161 and 162 and a conductive plate 163, and the keyboard panel 166 is supported via the keyboard support plates 161 and 162. Similarly, at the rear end portion of the keyboard 165, the shield plate 170 is brought into contact with the conductive piece 158 and the support pieces 8b. As a result, the keyboard 165 is supported inside the keyboard mount port 7 by the front, rear, left, and right side portions of the keyboard panel 166, thereby preventing inclination and backlash of the keyboard 165 in the keyboard mount port 7.

When the keyboard 165 is completely mounted in the keyboard mount port 7 in this manner, screws 174 are caused to extend through the plurality of mount pieces 172, and the leading ends of the screws 174 are threadably engaged with the nuts 11 and 20. With this threadable engagement, the shield plate 170 is held in contact with the keyboard support plates 161 and 162, the conductive plate 163, and the conductive piece 158, thus completing the mounting of the keyboard 165 on the top cover 5. When the mounting of the keyboard 165 is completed, the shield plate 170 on the rear surface of the keyboard panel 166 covers the first circuit board 24 and the hard disk drive 44 in the bottom case 4 from above.

According to this mount structure for the keyboard 165, since the front and rear edge portions of the keyboard panel 166 are engaged with the keyboard mount port 7, the mounting position of the keyboard 165 with respect to the keyboard mount port 7 is determined with high precision. Furthermore, since only the mount pieces 172 of the front edge portion of the keyboard panel 166 are screwed to the top cover 5, the number of portions screwed can be decreased as compared with a case wherein a plurality of portions on the entire periphery of the keyboard panel 166 are screwed. Therefore, the keyboard 165 can be easily mounted.

When the keyboard 165 is screwed to the keyboard mount port 7, the shield plate 170 is pressed against the keyboard support plates 161 and 162, the conductive plate 163, and the conductive piece 158 of the rear shield plate 155. For this reason, the shield plate 170, the rear shield plate 155, and the connector panel 64, which continuously cover the first circuit board 24 from above to the back, are electrically connected to each other. With this structure, high-frequency noise generated from the first circuit board 24 during an operation of the computer 1 can be confined within the case 3, thereby reliably preventing electromagnetic interference accompanying leakage of high-frequency noise.

In addition, according to the above arrangement, the tongue pieces 173 stacked on the lower surfaces of the mount pieces 172 of the keyboard panel 166 are integrally formed with the front edge portion of the shield plate 170, when the mount pieces 172 are screwed to the mount recess portions 10 of the keyboard support portion 9, the tongue pieces 173 are brought into contact with the nuts 11 and 20. Since these nuts 11 and 20 are electrically connected to the ground wiring pattern 24a on the first circuit board 24, the keyboard 165 is grounded via the mount portion for the keyboard mount port 7. Special lead lines and connectors for grounding the keyboard 165 can be omitted. Furthermore, a grounding operation is completed at the same time when the keyboard 165 is fixed. Therefore, the number of steps can be reduced, and the computer 1 can be easily assembled.

Figure 28:
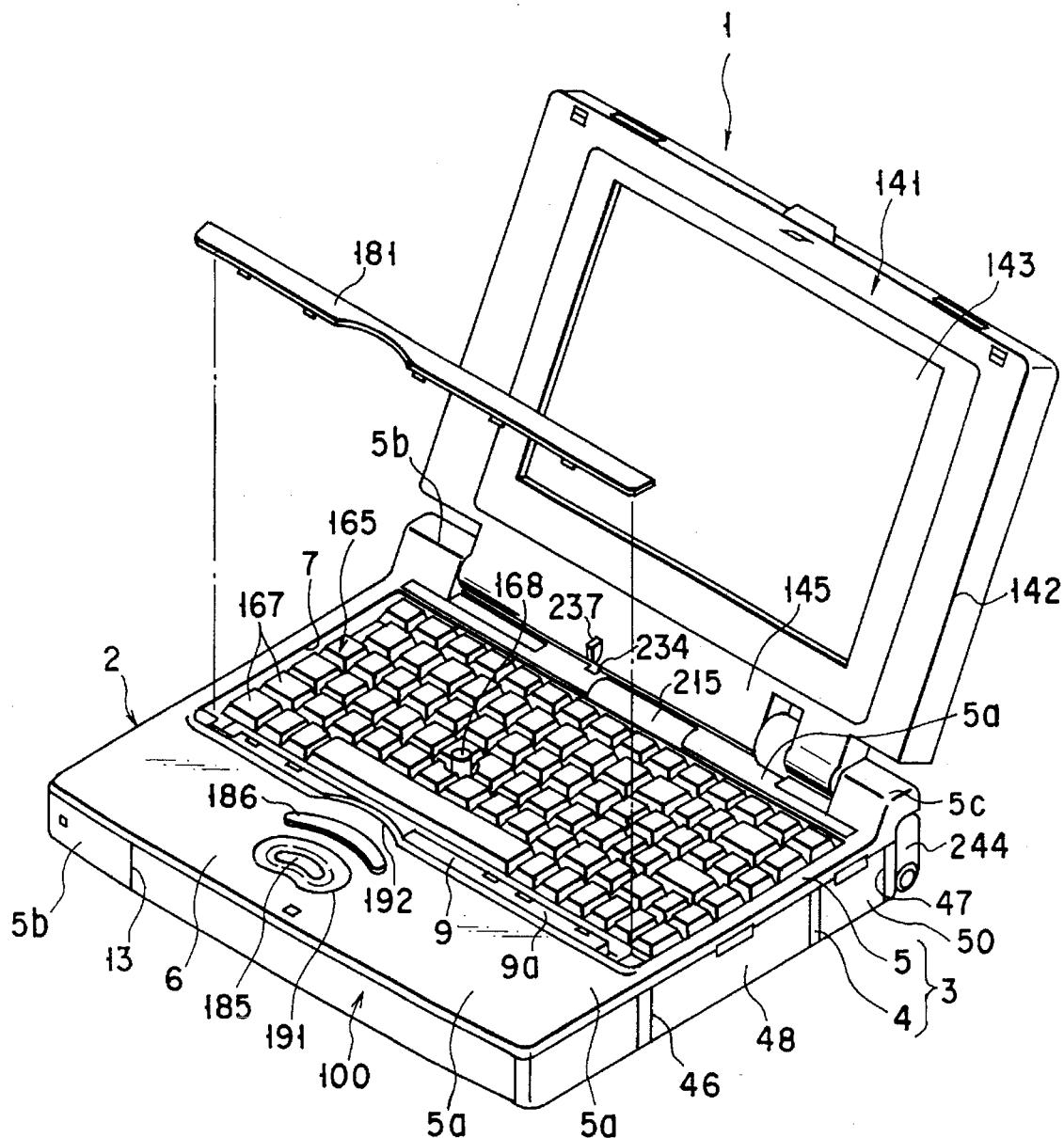

As shown in FIG. 28, a cover 181 is detachably engaged with the top cover 5. The cover 181 laterally extends along the keyboard mount port 7 and covers the upper surface 9a of the keyboard support portion 9 from above. The cover 181 is located between the hand rest portion 6 of the top cover 5 and the keys 167 in the front row of the keyboard 165. The upper surface of the cover 181 is continuous with the upper surface of the hand rest portion 6 on the same plane.

With this cover 181, the screws 174 for fixing the keyboard 165 and the fitting portion between the keyboard panel 166 and the keyboard support portion 9 can be covered. Therefore, a sense of unity between the top cover 5 and the keyboard 165 can be obtained, and the outer appearance of the computer 1 improves.

Figure 29:
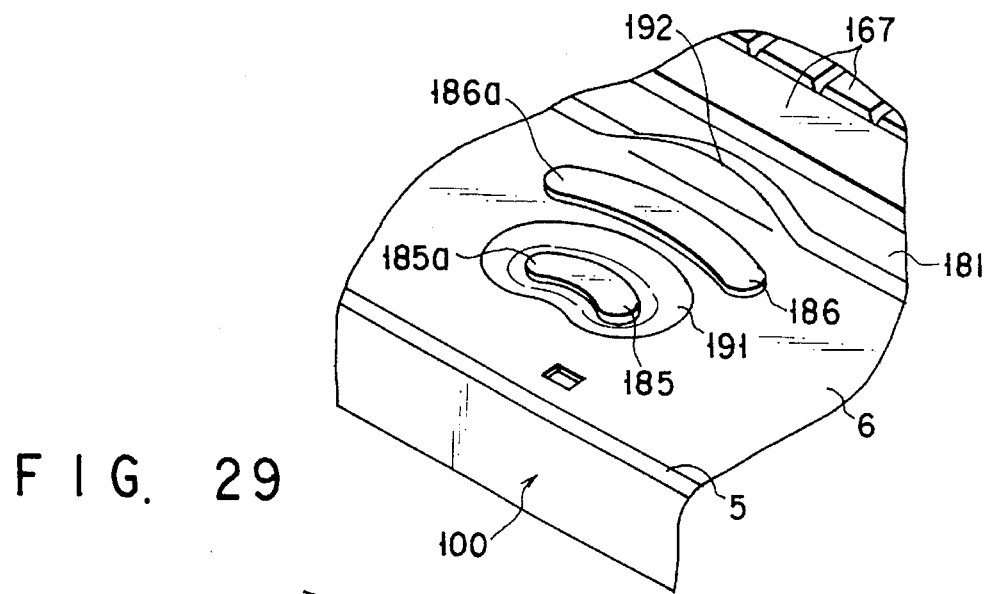
Figure 30:
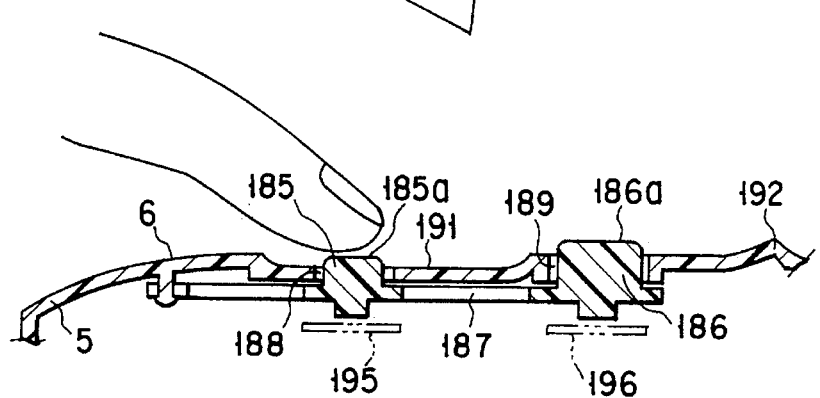

As shown in FIGS. 28 to 30, a pair of operation buttons 185 and 186 are arranged in a row on the central portion of the hand rest portion 6. The operation buttons 185 and 186 arranged in the back-and-forth direction serve to cancel and execute commands displayed on the liquid crystal display 143, and respectively have press portions 185a and 186a which are pressed by a finger tip of the operator. The press portions 185a and 186a are coupled to each other via a coupling portion 187. The press portions 185a and 186a and the coupling portion 187 are integrally formed by using a synthetic resin material. The front end portion of the coupling portion 187 is fixed to the lower surface of the hand rest portion 6 by means of caulking or the like. The coupling portion 187 is elastically deformed in the vertical direction with this front end portion serving as a fulcrum. In addition, the hand rest portion 6 includes a pair of through holes 188 and 189. The press portions 185a and 186a are exposed on the upper surface of the hand rest portion 6 via the through holes 188 and 189. With this structure, when the press portions 185a and 186a are depressed by a finger tip of the operator, the coupling portion 187 is elastically deformed downward, and the press portions 185a and 186a are pushed downward.

As shown in FIG. 30, the press portion 185a of one operation button 185 located on the operator side is smaller in height than the press portion 186a of the other operation button 186. For this reason, the press portion 185a of one operation button 185 is located at a lower level than that of the press portion 186a of the other operation button 186.

The upper surface of the hand rest portion 6 is recessed around one operation button 185. This recess portion serves as a first finger-held portion 191 on which a finger tip of the operator is held. The first finger-held portion 191 has a gradual curvature and is continuous with the upper surface of the hand rest portion 6. A portion, of the upper surface of the hand rest portion 6, located between the other operation button 186 and the keys 167 in the front row of the keyboard 165 protrudes upward. This protruding portion serves as a second finger-held portion 192 on which a finger tip of the operator is held. The second finger-held portion 192 has a gradual curvature and is continuous with the upper surface of the hand rest portion 6. With this structure, the finger tip can be easily moved back and forth, and left and right.

The operation buttons 185 and 186 are designed such that the press portions 185a and 186a exposed on the upper surface of the hand rest portion 6 are set at different levels. If, therefore, the operator recognizes the functions of the operation buttons 185 and 186 in advance, he/she can cancel or execute a command in a blind-touch manner while watching the liquid crystal display 143 without checking the positions of the operation buttons 185 and 186. In addition, since the first and second finger-held portions 191 and 192 constituted by the recess and projection portions are formed around the operation buttons 185 and 186, the positions of the operation buttons 185 and 186 can be easily checked by only moving the finger tip. For this reason, the operator need not check the positions of the operation buttons 185 and 186 by shifting his/her gaze during an input operation, thus achieving good operability.

The operation buttons 185 and 186 are located above the ceiling wall 13c of the battery receptacle 13. As shown in FIG. 7, a pair of switches 195 and 196 are arranged on the upper surface of the ceiling wall 13c. The switches 195 and 196 are turned on and off by the operation buttons 185 and 186. The switches 195 and 196 are supported on a flexible wiring board 197. The wiring board 197 is stacked on the upper surface of the ceiling wall 13c. The wiring board 197 integrally has a connection piece 198 extending toward the third circuit board 26. A wiring pattern (not shown) continuous with the switches 195 and 196, including the connection piece 198, is printed on the wiring board 197. The connection piece 198 of the wiring board 197 is introduced downward along the upright wall 13a of the battery receptacle 13. The distal end of the connection piece 198 is detachably connected to the connector 199 of the third circuit board 26 from above. With this structure, the connection piece 198 does not protrude upward from the first circuit board 24 too much.

As shown in FIG. 7, a battery receiving portion 200 is formed on the upper surface of the ceiling wall 13c. The battery receiving portion 200 is adjacent to the wiring board 197. An RTC (real time clock) battery 201 is supported on the battery receiving portion 200. The RTC battery 201 includes a cable 202 having a connector 203. The cable 202 extends along the upper surface of the ceiling wall 13c. The connector 203 on the distal end of the cable 202 is detachably connected to the first circuit board 24 from above.

A sub-battery 206 for setting a resume function is detachably housed in the bottom case 4. The sub-battery 206 is located between the upright wall 13a of the battery receptacle 13 and the first circuit board 24. A connector 208 is connected to the sub-battery 206 via a cable 207. The connector 208 is detachably connected to the extended portion 28 of the second circuit board 25 from above. The connecting portion between the first circuit board 24 and the connector 203 of the RTC battery 201 and the connecting portion between the second circuit board 25 and the connector 208 of the sub-battery 206 are located near the upright wall 13a of the battery receptacle 13, thereby minimizing the protrusion of the connecting portions below the keyboard 165. With this structure, the connectors, the wiring members, and the like do not protrude too much between the keyboard 165 and the first circuit board 24. Therefore, most of the space on the first circuit board 24 can be used as a mount space for the circuit parts 30.

In addition, the connection piece 198 of the wiring board 197, the cable 202 of the RTC battery 201, and the cable 207 of the sub-battery 206 are connected to the first to third circuit boards 24 to 26 at positions near the upright wall 13a, and these members can be connected all together above the bottom case 4. Therefore, in performing a connecting operation, the bottom case 4 need not be turned over, and the connecting operation can be easily performed in the bottom case 4.

Figure 31:
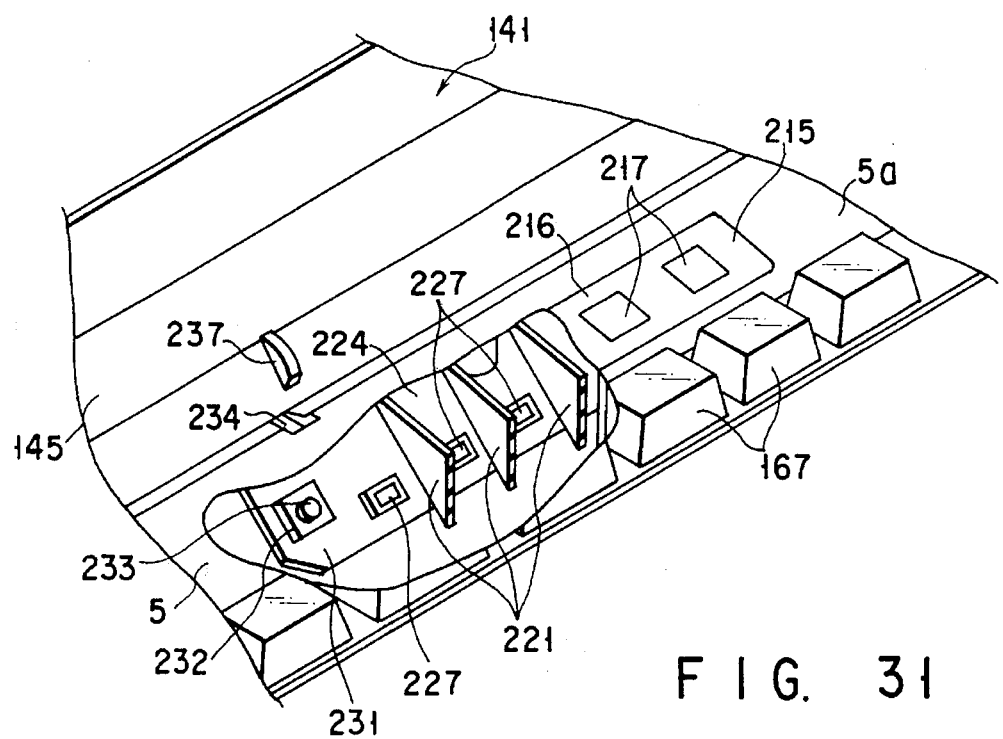

As shown in FIG. 1, an icon 215 is arranged on the rear half portion of the upper wall 5a of the top cover 5. When the display unit 141 is pivoted to the second position, the icon 215 is exposed between the display unit 141 and the keyboard 165. The icon 215 is located at a middle portion in the lateral direction of the upper wall 5a to allow the operator to easily see it. As shown in FIGS. 31 and 32, the icon 215 has a translucent, rectangular icon panel 216. The icon panel 216 is fixed to the upper wall 5a of the top cover 5 by means of an adhesive or the like. A plurality of display portions 217 for displaying the contents of the operation state and function of the computer 1 in graphic patterns are drawn on the icon panel 216. These display portions 217 are arranged in a row at intervals in the lateral direction of the top cover 5.

As shown in FIG. 32, an opening portion 218 is formed in the upper wall 5a of the top cover 5. The opening portion 218 is arranged to oppose the display portions 217 of the icon panel 216. The opening portion 218 extends along the direction in which the plurality of display portions 217 are arranged. A light-shielding wall 220 extending downward is formed on the front edge of the opening portion 218. A plurality of partition walls 221 are integrally formed on the inner surface of the upper wall 5a to be located between the display portions 217. The front ends of the partition walls 221 are continuous with the light-shielding wall 220. With this structure, the adjacent display portions 217 are partitioned from each other by the light-shielding wall 220 and the partition walls 221.

As shown in FIG. 32, a diode board 224 is housed the top cover 5. The diode board 224 is arranged between the upper wall 5a of the top cover 5 and the rear shield plate 155 and opposes the opening portion 218. The diode board 224 is screwed to the top cover 5, together with the rear shield plate 155, and the upper surface of the diode board 224 is in contact with the light-shielding wall 220 and the partition walls 221. As shown in FIG. 34, the diode board 224 includes a flexible wiring board 225 and a reinforcing plate 226 bonded to the lower surface of the wiring board 225. The wiring board 225 has a portion 225a extended from a side of the reinforcing plate 226. The portion 225a is connected to the first circuit board 24.

As shown in FIG. 34, a plurality of light-emitting diodes 227 are arranged on the upper surface of the wiring board 225. The light-emitting diodes 227 are arranged at intervals in the lateral direction of the top cover 5. The light-emitting diodes 227 serve as light sources for the icon 215 and are arranged at positions opposite to the display portions 217, respectively. With this structure, when the light-emitting diodes 227 emit light, the corresponding display portions 217 are turned on to display the contents of the operation state and function of the computer 1.

As shown in FIG. 34, the wiring board 225 has a reinforcing portion 229. The reinforcing portion 229 is located around the light-emitting diodes 227. The reinforcing portion 229 is made of, e.g., a reflective aluminum deposition film. Portions of the reinforcing portion 229 oppose the display portions 217 via the opening portion 218. With this structure, of light emitted from each light-emitting diode 227, light leaking inside the top cover 5 is reflected by the reinforcing portion 229 to propagate toward a corresponding display portion 217, thus increasing the amount of light propagating to the display portion 217. Consequently, the brightness of each display portion 217 increases, and the visibility of each display portion 217 improves.

In this embodiment, as shown in FIG. 33, a diffusion sheet 230 is bonded to the surface of the icon panel 216 which opposes the light-emitting diodes 227. The diffusion sheet 230 serves to diffuse light emitted from each light-emitting diode 227, which has high directivity, over a wide range. Owing to the presence of the diffusion sheet 230, each display portion 217 does not output light locally but outputs light uniformly throughout the display portion 217.

According to this arrangement of the icon 215, since the plurality of display portions 217 are drawn on one icon panel 216, the display portions 217 can be arranged on the upper wall 5a of the top cover 5 at once by only bonding the icon panel 216 to the upper wall 5a. Therefore, the icon 215 can be easily mounted as compared with a case wherein the plurality of display portions 217 are arranged one by one on the top cover 5.

In addition, the top cover 5 has the partition walls 221 interposed between the plurality of display portions 217. The adjacent display portions 217 are partitioned from each other by these partition walls 221. With this structure, light beams from the light-emitting diodes 227 corresponding to the adjacent display portions 217 are not mixed with each other. Therefore, the display portions 217 in the ON and OFF states can be clearly discriminated from each other to improve the visibility of the icon 215.

As shown in FIG. 34, the diode board 224 has a portion 231 extended from a side of the light-emitting diode 227. A normally-closed power switch 232 for turning off the computer 1 is mounted on the extended portion 231. The power switch 232 is connected to the first circuit board 24 via a wiring pattern (not shown) printed on the diode board 224. When the display unit 141 is pivoted to the first position, the power switch 232 is turned off by the display unit 141. The power switch 232 has a retractable operation element 233.

Figure 35:
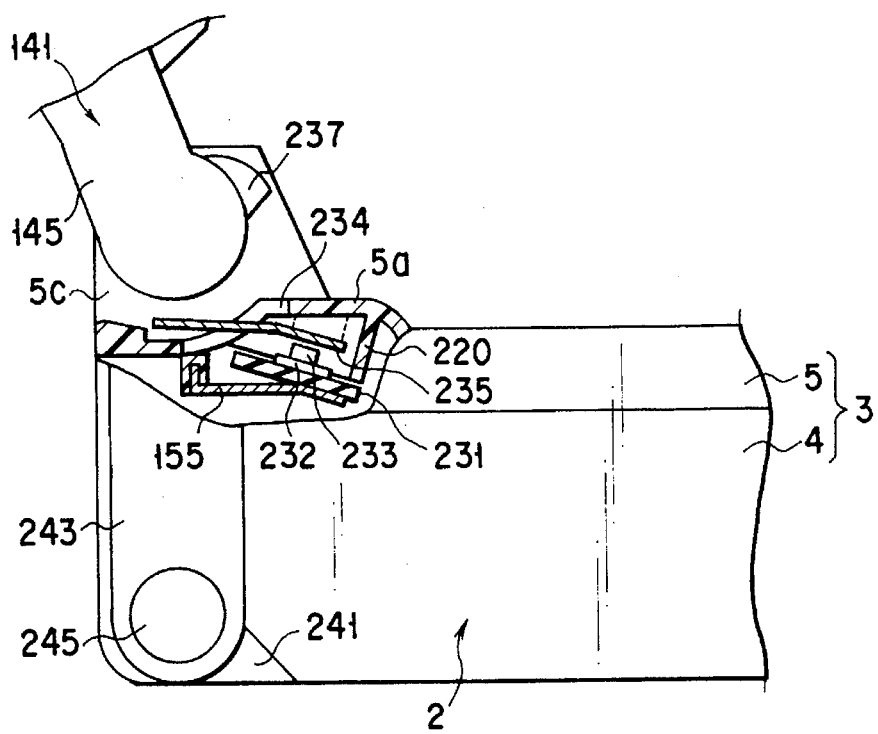
Figure 36:
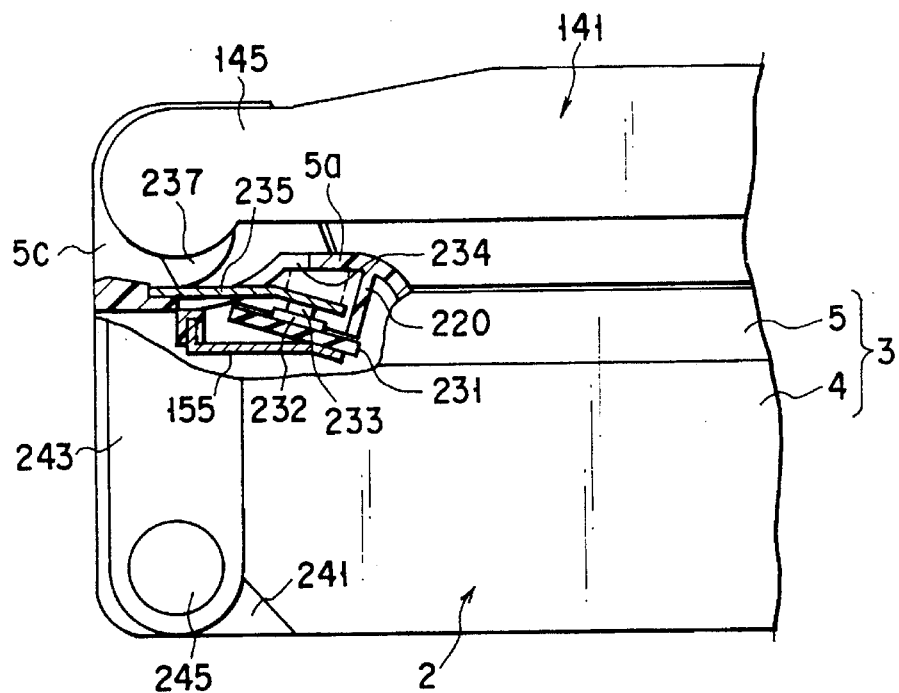

As shown in FIGS. 35 and 36, the upper wall 5a of the top cover 5 has a through hole 234. The through hole 234 is formed to oppose the power switch 232. A metal press piece 235 which can be elastically deformed is arranged in the through hole 234. One end of the press piece 235 is screwed to the inner surface of the upper wall 5a. The other end of the press piece 235, which is a free end, opposes the operation element 233.

As shown in FIG. 35, the coupling portion 145 of the display unit 141 has a cam-like projection portion 237. The projection portion 237 opposes the through hole 234. As shown in FIG. 36, when the display unit 141 is pivoted to the first position, the projection portion 237 presses the press piece 235 downward. With this pressing operation, the press piece 235 is elastically deformed to press the operation element 233, thereby turning off the power switch 232.

According to this arrangement, when the display unit 141 is pivoted to the first position, the power switch 232 is turned off. Therefore, an operation error by an operator who forgets to turn off the power supply to the computer 1 can be reliably prevented. Furthermore, since the power switch 232 is mounted on the portion 231 of the diode board 224, the power switch 232 can be connected to the first circuit board 24 by using the wiring pattern printed on the diode board 224. Consequently, special cables, connectors, and the like to be connected to the power switch 232 can be omitted.

As shown in FIG. 16, the bottom case 4 has a pair of leg mount portions 241 and 242. These leg mount portions 241 and 242 are located at left and right corner portions defined by the rear wall 4c and left and right side walls 4d and 4e of the bottom case 4. The leg mount portions 241 and 242 are constituted by recesses which are continuously open to the rear, side, and lower sides of the bottom case 4. Legs 243 and 244 are mounted on the leg mount portions 241 and 242, respectively. The legs 243 and 244 are used to cause the computer 1 to tilt up such that the operator side of the computer 1 is lower in level than the other side. One end of each of the legs 243 and 244 is pivotally supported on a corresponding one of the leg mount portions 241 and 242 via a pivot shaft 245. With this structure, the legs 243 and 244 are pivotal between a use position where the legs are pivoted downward from the leg mount portions 241 and 242 to protrude downward from the bottom wall 4a of the bottom case 4 and a nonuse position where the legs are pivoted into the leg mount portions 241 and 242. When the legs 243 and 244 are pivoted to the nonuse position, the legs 243 and 244 become continuous with the rear and side walls 4c, 4d, and 4e of the bottom case 4 on the same plane.

In assembling the computer 1 having the above arrangement, first of all, the first to third circuit boards 24 to 26 and the hard disk drive 44 are screwed to the bottom case 4, and the display unit 141 is mounted via hinge mechanisms. The wiring board 197 having the switches 195 and 196 is then stacked on the upper surface of the ceiling wall 13c of the battery receptacle 13, and the connection piece 198 is connected to the connector 199 of the third circuit board 26. The RTC battery 201 is attached to the battery receiving portion 200, and the connector 203 connected to the RTC battery 201 is connected to the first circuit board 24. Similarly, the sub-battery 206 is housed in the bottom case 4, and the connector 208 connected to the sub-battery 206 is connected to the extended portion 28 of the second circuit board 25.

Subsequently, the top cover 5 is fitted on the bottom case 4, and the top cover 5 is screwed thereto. In this case, the display unit 141 is pivoted to the third position in advance so as not to interfere with the fitting of the top cover 5. With this pivoting operation, the display unit 141 tilts greatly behind the case 3, and hence the area around the keyboard mount port 7 of the top cover 5 is widely open. That is, most of the first circuit board 24 in the bottom case 4 is exposed via the keyboard mount port 7. Therefore, the operator inserts his/her finger tips into the keyboard mount port 7 to connect the cable 147 extending from the display unit 141 and the portion 225a of the diode board 224 to the first circuit board 24.

The keyboard 165 is fitted in the keyboard mount port 7 from above and screwed to the keyboard support portion 9. Finally, the cover 181 is mounted on the keyboard support portion 9. When the screwing portions between the top cover 5 and the keyboard panel 166 are covered with the cover 181, a series of steps in assembling the computer 1 are completed.

The computer 1 having such an arrangement may be used in such a manner that the battery pack 100 is removed from the battery receptacle 13, and the plug of an AC adaptor is inserted in the power supply connector 88. The battery receptacle 13 laterally extends at the front portion of the bottom case 4, and is continuously open between the front and right side walls 4b and 4e of the bottom case 4. That is, the battery receptacle 13 has a large size. For this reason, if the battery pack 100 is removed from the battery receptacle 13, the computer 1 may tilt to the operator side, i.e., the posture of the computer becomes unstable, when the operator performs an input operation through the keyboard 165. Especially, since the portion above the battery receptacle 13 is the hand rest portion 6 on which the operator places his/her hand in operating the keyboard 165, the computer 1 easily is tilted to the operator side during an operation of the keyboard 165.

According to the computer 1 having the above arrangement, however, the battery receptacle 13 has the support leg 125, and the support leg 125 is pivoted toward the use position when the keyboard 165 is to be operated with the battery pack 100 being removed from the battery receptacle 13. With this pivoting operation, the ground surface 126a of the leg body 126 is located on the same plane as that of the bottom wall 4a of the bottom case 4 so that the ceiling wall 13c of the battery receptacle 13 can be supported by this support leg 125. Therefore, when the operator depresses the keys 167 of the keyboard 165, the computer 1 is neither tilted nor causes backlash. That is, the computer 1 can be kept in a stable posture, and operability in an input operation improves. In addition, since the computer 1 has the hand rest portion 6 on the operator side of the keyboard 165, the operator can perform an input operation while he/she places his/her hands on the hand rest portion 6. For this reason, the operator can easily perform an input operation without taking an unnatural posture, i.e., without raising his/her wrists.

When the computer 1 having the above arrangement is to be connected to a plurality of peripheral devices, an external expansion unit 300 like the one shown in FIGS. 37 to 50 is used. The external expansion unit 300 is connected to the rear portion of the computer 1, and has a housing 301 like the one shown in FIG. 39. The housing 301 includes a lower housing 302 and an upper housing 303 fitted on the lower housing 302. These lower and upper housings 302 and 303 are made of a synthetic resin material such as ABS resin.

Figure 40:
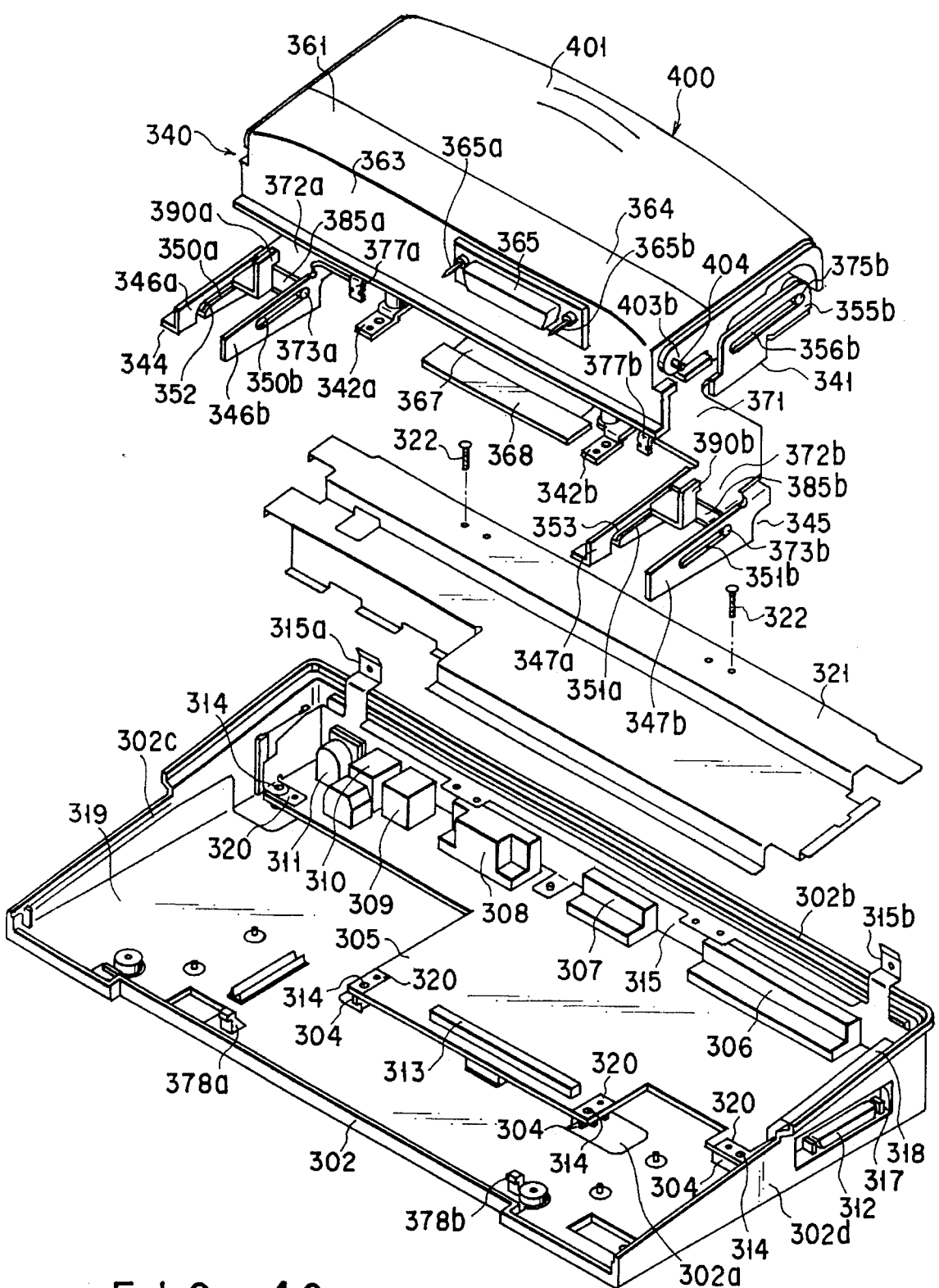

As shown in FIG. 40, the lower housing 302 includes a rectangular, flat bottom wall 302a, and walls continuous with the bottom wall 302a, i.e., a rear wall 302b and left and right side walls 302c and 302d. A plurality of boss portions 304 are arranged on the upper surface of the bottom wall 302a. A circuit board 305 is fixed to the boss portions 304 via screws 314. The circuit board 305 is located on the rear half portion of the lower housing 302. The rear edge and left and right side edges of the circuit board 305 are adjacent to the rear and side walls 302b, 302c, and 302d of the lower housing 302.

For example, a parallel port 306, a connection port 307, an RGB connector 308, expansion connectors 309 and 310, and a power supply connector 311 are laterally arranged on the rear end portion of the circuit board 305. The parallel port 306 allows connection of, e.g., a printer. The connection port 307 allows connection of an external device having an interface connector complying with the RS232C standard. The RGB connector 308 allows connection of an external CRT display. The expansion connectors 309 and 310 allow connection of a mouse and an external keyboard. The plug of an AC adaptor is inserted into a power supply connector 311. An FDD connector 312 for connection of an external floppy disk drive is arranged on the right end portion of the circuit board 305. A relay connector 313 is mounted on the front end portion of the circuit board 305. The relay connector 313 is electrically connected to the connection port 307 and the connectors 309 to 312 via a wiring pattern (not shown) printed on the circuit board 305.

Figure 37:
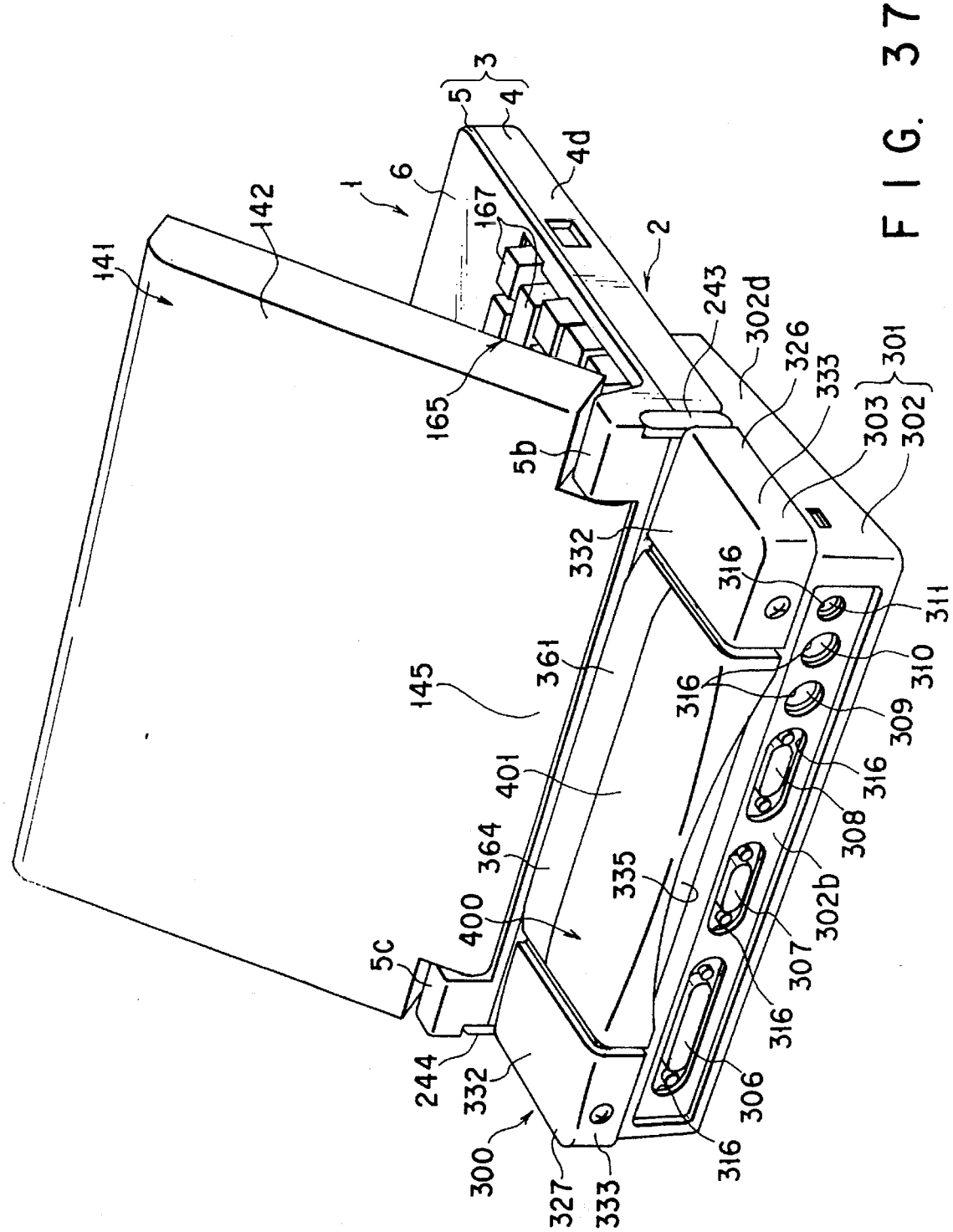

As shown in FIG. 40, a first connector panel 315 made of a metal is mounted on the rear end portion of the circuit board 305. The first connector panel 315 is screwed to the boss portions 304 on the bottom wall 302*a* together with the circuit board 305. The first connector panel 315 is arranged in a vertical posture with respect to the circuit board 305. The first connector panel 315 covers the connecting portions between the circuit board 305, the connection port 307, and the connectors 308 to 311 from the back. The first connector panel 315 has a pair of support pieces 315*a* and 315*b*. The support pieces 315*a* and 315*b* extend upward from the left and right end portions of the first connector panel 315. As shown in FIG. 37, a plurality of extraction ports 316 are formed in the rear wall 302*b* of the lower housing 302. The connection port 307 and the connectors 308 to 311 are exposed behind the housing 301 via the extraction ports 316.

As shown in FIG. 40, a second connector panel 318 made of a metal is mounted on the right end portion of the circuit board 305. The second connector panel 318 is screwed to the boss portions 304 on the bottom wall 302*a* together with the circuit board 305. The second connector panel 318 is arranged in a vertical posture with respect to the circuit board 305, and covers the connecting portion between the circuit board 305 and the relay connector 313 from a side. A single extraction port 317 is formed in the right side wall 302*d* of the lower housing 302. The FDD connector 312 is exposed on a side of the housing 301 via the extraction port 317.

The bottom wall 302*a* of the lower housing 302 is covered with a first shield plate 319 made of a metal. The first shield plate 319 is screwed to the boss portions 304 together with the circuit board 305. The circuit board 305 has conductive portions 320 at its portions in contact with the boss portions 304. The conductive portions 320 are connected to a ground wiring pattern (not shown) printed on the circuit board 305. With this structure, while the circuit board 305 is screwed to the boss portions 304, the circuit board 305, the shield plate 319, and the first and second connector panels 315 and 318 are electrically connected to each other.

Figure 41:
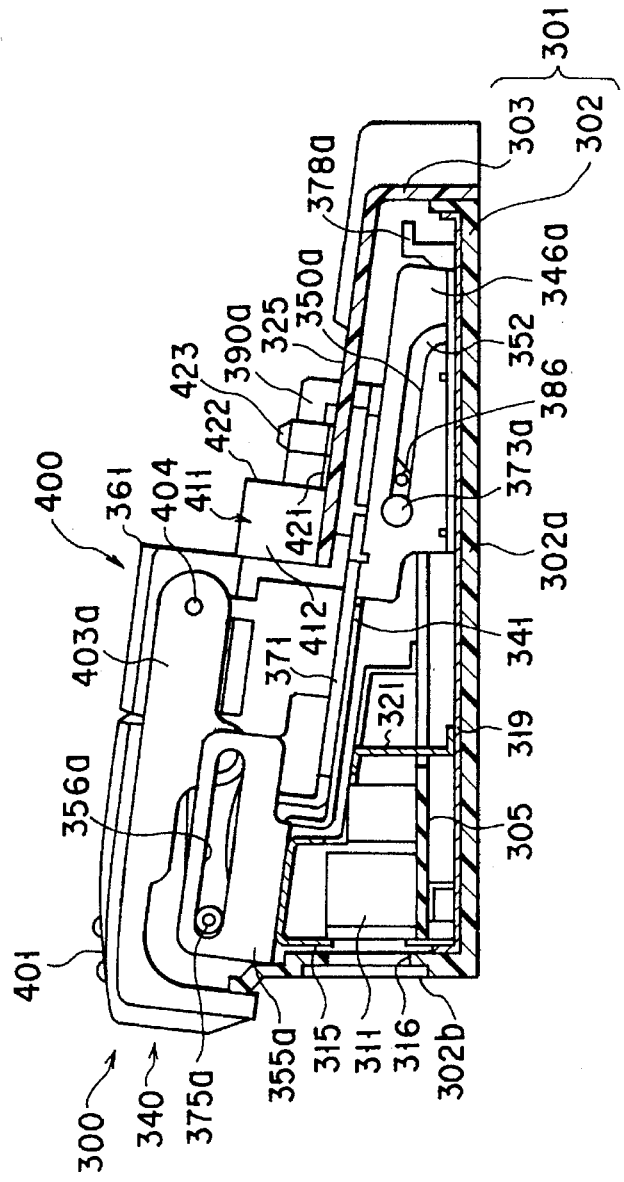
Figure 42:
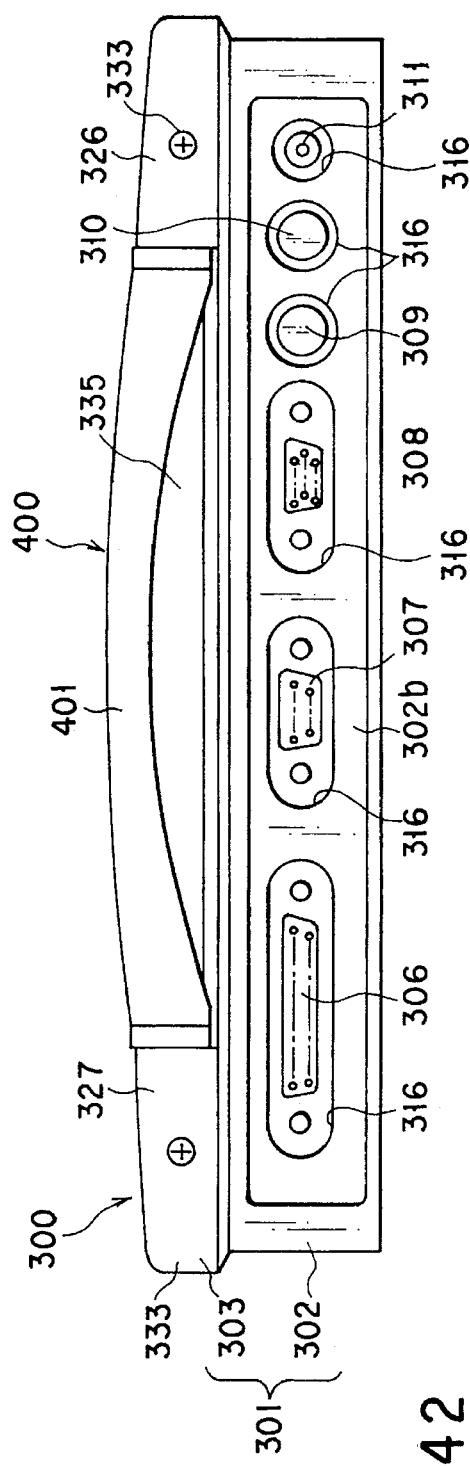

A second shield plate 321 made of a metal is mounted on the upper surface of the circuit board 305. The second shield plate 321 covers the connection port 307, the connectors 308 to 311, and the FDD connector 312 from above. The second shield plate 321 is fixed to the upper end portion of the first connector panel 315 via screws 322. The peripheral portion of the second shield plate 321 is in contact with and electrically connected to the first connector panel 315, the second connector 318, and the first shield plate 319. With this structure, as shown in FIG. 41, the second shield plate 321, together with the first shield plate 319 and the first and second connector panels 315 and 318, surrounds the connection port 307 and the connectors 308 to 312, thereby preventing leakage of high-frequency noise from the connection port 307 and the connectors 308 to 312.

Figure 38:
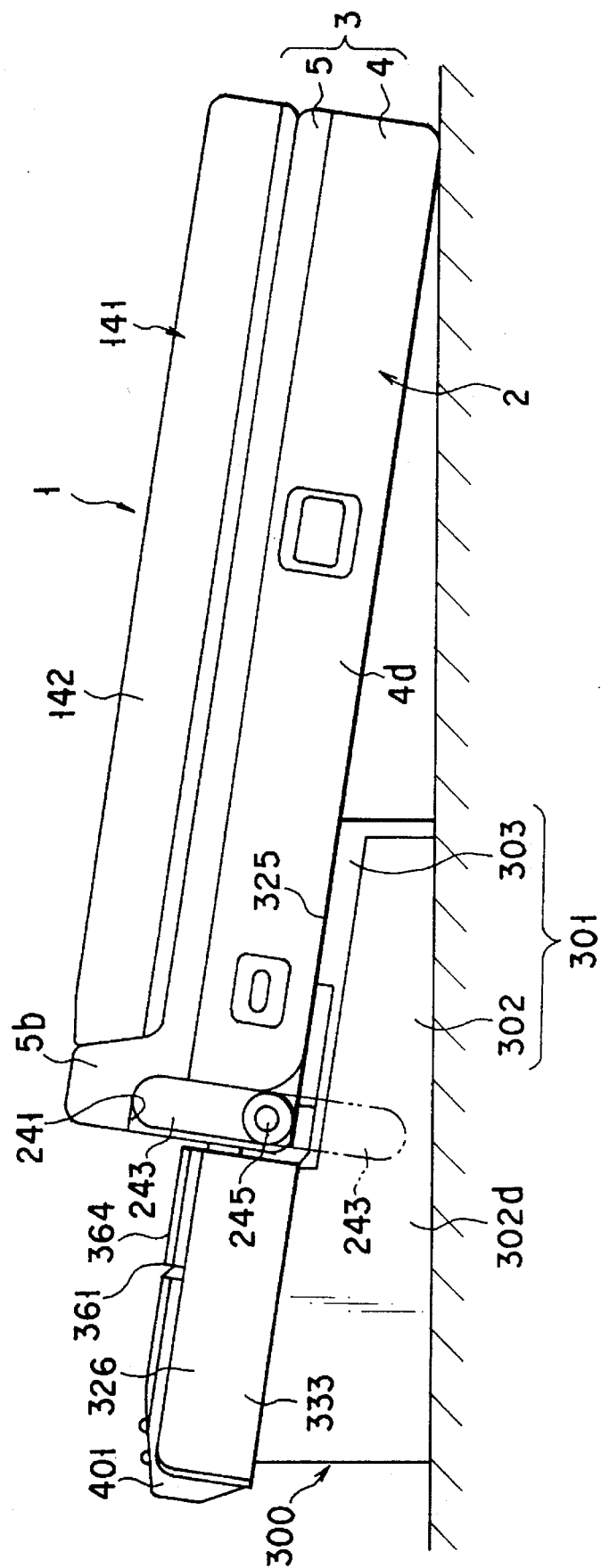
Figure 39:
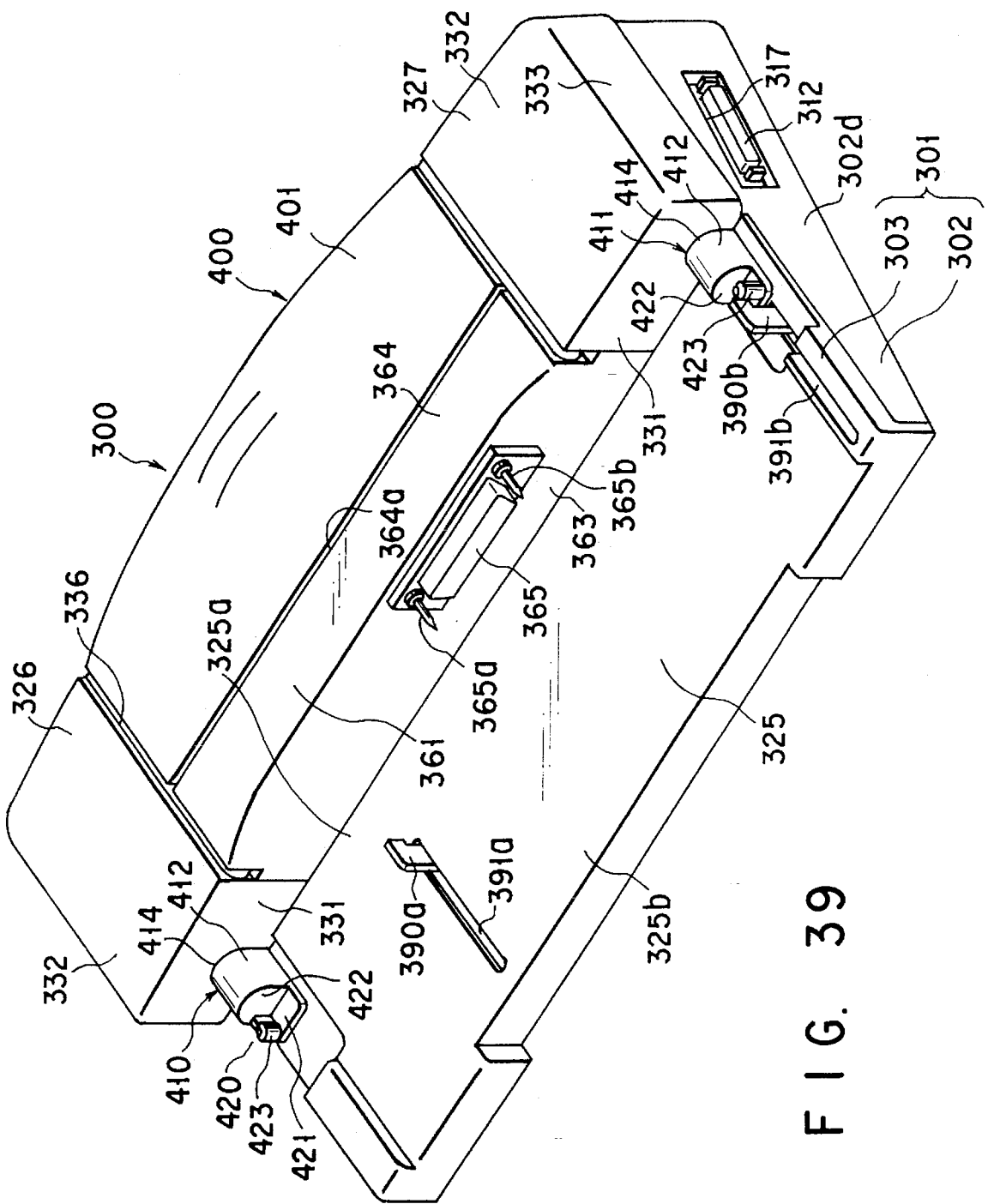

As shown in FIG. 39, the upper housing 303 has a first surface 325 on which the computer 1 is mounted, and a pair of left and right stopper portions 326 and 327 continuous with the rear end of the first surface 325. The first surface 325 is continuously open to the front side and left and right sides of the upper housing 303, and has a size substantially corresponding to the rear half portion of the bottom wall 4*a* of the computer 1. With this structure, as shown in FIG. 38, while the computer 1 is mounted on the first surface 325, the front half portion of the computer 1 protrudes from the front end of the upper housing 303 toward the operator side.

The first surface 325 has a rear edge portion 325*a* continuous with the stopper portions 326 and 327, and a front edge portion 325*b* located on the operator side. In this embodiment, as shown in FIG. 38, the first surface 325 is inclined downward from the rear edge portion 325*a* to the front edge portion 325*b*. The lateral width of the first surface 325 is set to be slightly smaller than the interval between the left and right legs 243 and 244 of the computer 1. In addition, the distance from the first surface 325 to the bottom wall 302*a* of the lower housing 302 is set to be larger than the height of the legs 243 and 244 when the legs are pivoted to the use position. For this reason, as shown in FIG. 38, even if the computer 1 is mounted on the first surface 325 with the legs 243 and 244 protruding, the legs 243 and 244 are located outside the left and right sides of the first surface 325. Therefore, the legs 243 and 244 neither interfere with the first surface 325 nor come into contact with a desk surface or the like on which the external expansion unit 300 is placed.

Since the stopper portions 326 and 327 have the same structure, one stopper portion 326 will be described as the representative. As shown in FIGS. 37 and 39, the stopper portion 326 has a substantially vertical stopper surface 331 continuous with the first surface 325, a flat upper surface 332 continuous with the upper end of the stopper surface 331, and a circumferential surface 333 continuous with the upper surface 332 and the stopper surface 331. The circumferential surface 333 is continuous with the rear wall 302*b* and the side walls 320*c* and 302*d* of the lower housing 302. The rear end portions of the stopper portions 326 and 327 are integrally coupled to each other via a coupling wall 335. The coupling wall 335 is continuous with the rear wall 302*b*. The upper housing 303 has an opening portion 336 defined by the rear edge portion 325*a* of the first surface 325, the left and right stopper portions 326 and 327, and the coupling wall 335. The opening portion 336 is located above the second shield plate 321. The upper housing 303 is coupled to the lower housing 302 by screwing the circumferential surface 333 to the support pieces 315*a* and 315*b* and also screwing the two side portions of the front end of the first surface 325 to the bottom wall 302*a*.

Figure 47:
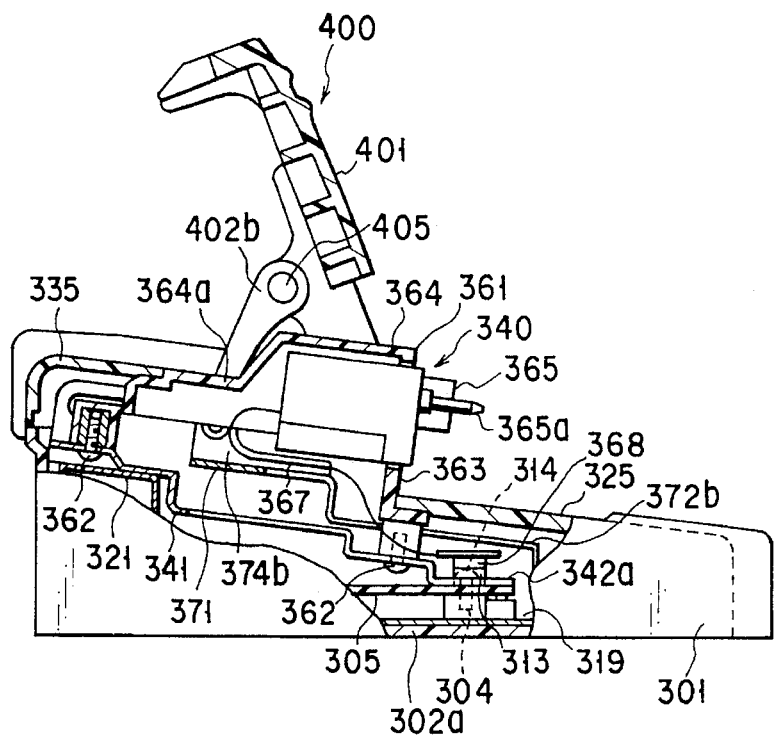

As shown in FIGS. 40 and 47, a connector unit 340 is housed in the housing 301. The connector unit 340 has a metal frame 341. The frame 341 is stacked on the upper surface of the second shield plate 321. The rear end portion of the frame 341 is fixed to the upper end portion of the first connector panel 315 via the screws 322. A pair of left and right support pieces 342*a* and 342*b* are integrally formed on the front end portion of the frame 341. The support pieces 342*a* and 342*b* are fixed to the upper surface of the front end portion of the circuit board 305 via the screws 314. The support pieces 342*a* and 342*b* are in contact with the conductive portions 320 of the circuit board 305. With this structure, the frame 341 is electrically connected to the circuit board 305 and the second shield plate 321.

Figure 44:
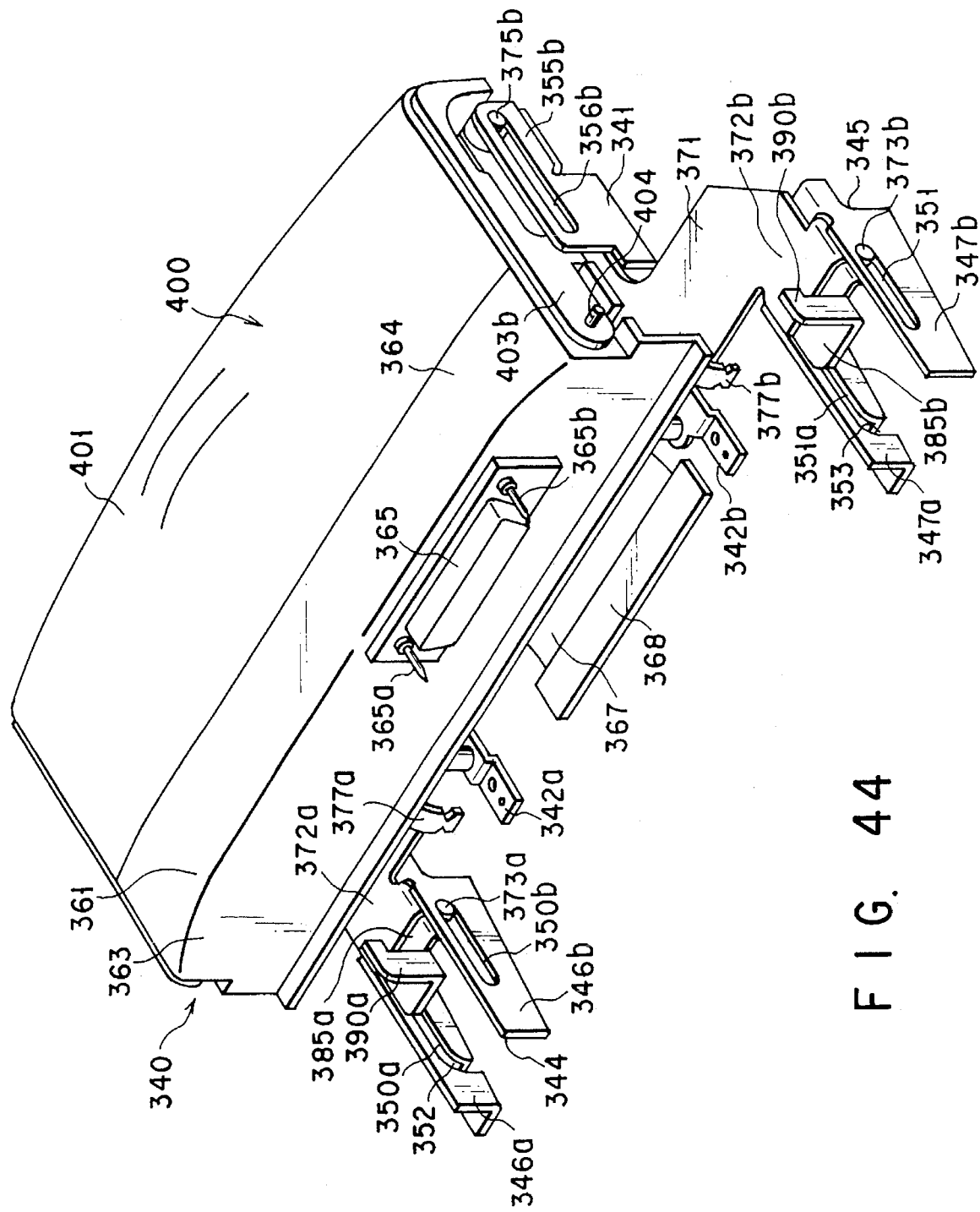
Figure 45:
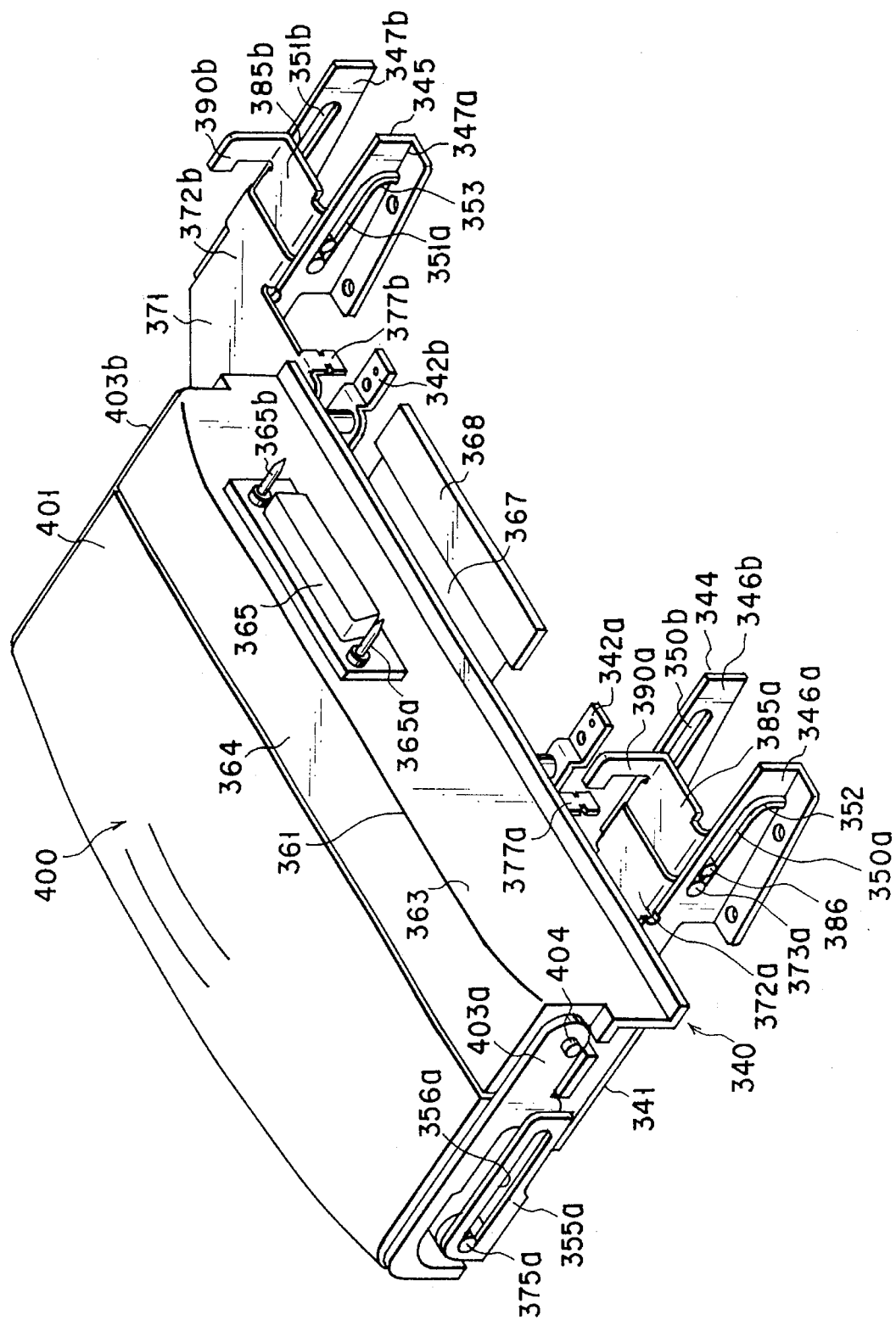

As shown in FIGS. 44 and 45, the frame 341 has a pair of guide portions 344 and 345. The guide portions 344 and 345 are arranged at the front end of the frame 341 to be spaced apart from each other in the lateral direction. The guide portions 344 and 345 are located below the first surface 325. The guide portions 344 and 345 respectively have pairs of guide rails 346*a*, 346*b*, and 347*a* and 347*b*. The guide rails 346*a*, 346*b*, 347*a*, and 347*b* extend in the back-and-forth direction below the first surface 325. The guide rails 346*a*, 346b, 347a, and 347b are supported on the bottom wall 302a of the lower housing 302.

The guide rails 346a, 346b, 347a, and 347b respectively have guide holes 350a, 350b, 351a, and 351b extending in the back-and-forth direction. As is apparent from FIG. 41, the guide holes 350a, 350b, 351a, and 351b are inclined toward the operator side to be parallel to the first surface 325. The guide holes 350a and 351a of the guide portions 344 and 345 respectively have arcuated portions 352 and 353 at their front end portions. Each of the arcuated portions 352 and 353 is curved downward in the form of an arc.

The frame 341 has a pair of guide walls 355a and 355b extending in the back-and-forth direction. The guide walls 355a and 355b are located on the left and right side portions of the rear end of the frame 341. The guide walls 355a and 355b respectively have slide holes 356a and 356b extending in the back-and-forth direction. As is apparent from FIG. 41, these slide holes 356a and 356b are inclined toward the operator side to conform to the inclination of the first surface 325.

As shown in FIG. 47, a connector cover 361 made of a synthetic resin is fixed to the frame 341 via screws 362. As shown in FIG. 39, the connector cover 361 is inserted in the opening portion 336 of the upper housing 303. The connector cover 361 has a substantially vertical second surface 363 continuous with the rear edge portion 325a of the first surface 325, and an upper surface 364 continuous with the upper end of the second surface 363. The second surface 363 is continuous with the stopper surfaces 331 of the stopper portions 326 and 327 on the same plane. As shown in FIG. 47, a recess portion 364a continuous with the coupling wall 335 is formed on the rear portion of the upper surface 364.

A second expansion connector 365 is arranged on the second surface 363. The first expansion connector 63 of the computer 1 is detachably connected to the second expansion connector 365. The second expansion connector 365 has a pair of positioning pins 365a and 365b. The positioning pins 365a and 365b are located on the left and right sides of the second expansion connector 365. The positioning pins 365a and 365b are removably inserted into the positioning holes 63a and 63b of the first expansion connector 63. With this insertion, the first expansion connector 63 and the second expansion connector 365 are positioned. The second expansion connector 365 is supported on the connector cover 361. Most of the second expansion connector 365 except for a portion exposed to the second surface 363 is covered with the connector cover 361.

As shown in FIG. 47, a flexible wiring board 367 is connected to the second expansion connector 365. The wiring board 367 is reversed in a U shape inside the connector cover 361 and introduced below the first surface 325. A second relay connector 368 is connected to the distal end of the wiring board 367. The second relay connector 368 is connected to the first relay connector 313 of the circuit board 305. With this structure, the second expansion connector 365 is connected to the connection port 307 and the connectors 308 to 312 via the wiring board 367 and the circuit board 305. With this connection, signals input to the second expansion connector 365 are distributed to the connection port 307 and the connectors 308 to 312.

As shown in FIGS. 40 and 41, a metal slide plate 371 is mounted on the upper surface of the frame 341 to be slidable in the back-and-forth direction. The slide plate 371 has a pair of slide guides 372a and 372b. The slide guides 372a and 372b are located on the front left and right end portions of the slide plate 371. The slide guides 372a and 372b are interposed between the guide rails 346a, 346b, 347a, and 347b of the guide portions 344 and 345. Guide pins 373a and 373b are mounted on the front end portions of the slide guides 372a and 372b, respectively. The two end portions of each of the guide pins 373a and 373b are slidably fitted in a corresponding one of the pairs of guide holes 350a, 350b, 351a, and 351b.

Figure 50:
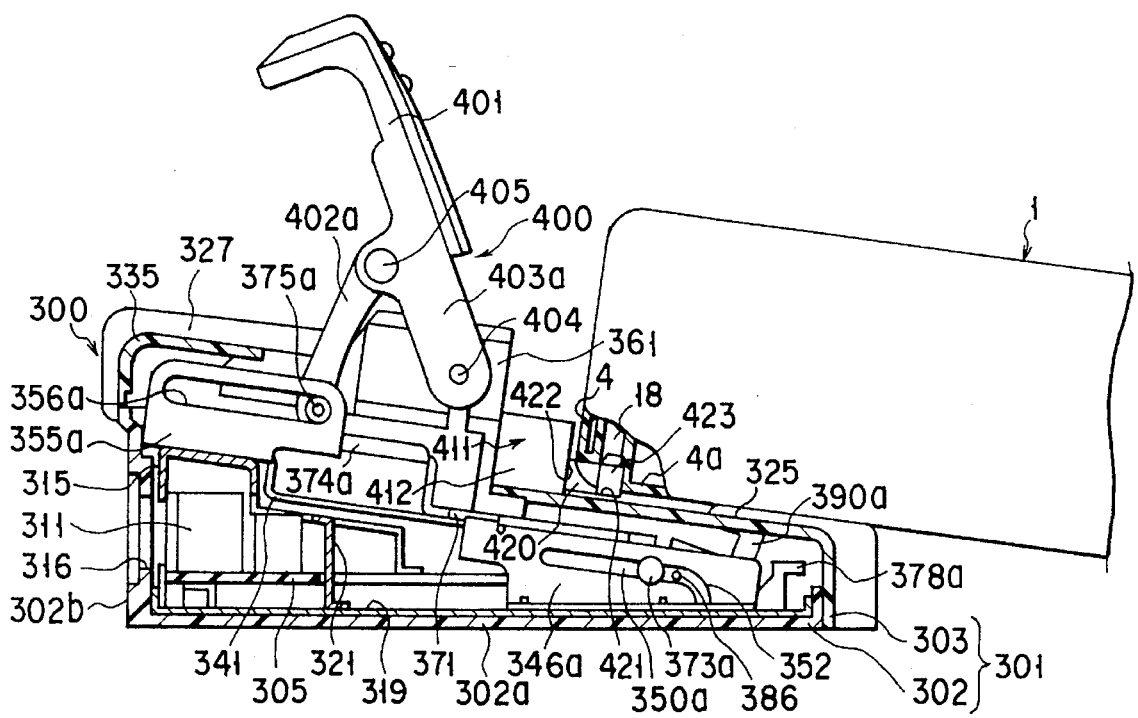

As shown in FIGS. 47 and 50, the slide plate 371 has a pair of support walls 374a and 374b. The support walls 374a and 374b are located on the left and right side portions of the rear end of the slide plate 371. The support walls 374a and 374b are arranged to oppose the guide walls 355a and 355b of the frame 341. Guide pins 375a and 375b are supported on the support walls 374a and 374b. The guide pins 375a and 375b are slidably fitted in the slide holes 356a and 356b. With this structure, the slide plate 371 is supported on the frame 341 to be guided by the fitting portions between the guide pins 373a and 373b and the guide holes 350a, 350b, 351a, and 351b, and between guide pins 375a and 375b and the slide holes 356a and 356b so as to be slidable in the back-and-forth direction.

Figure 43:
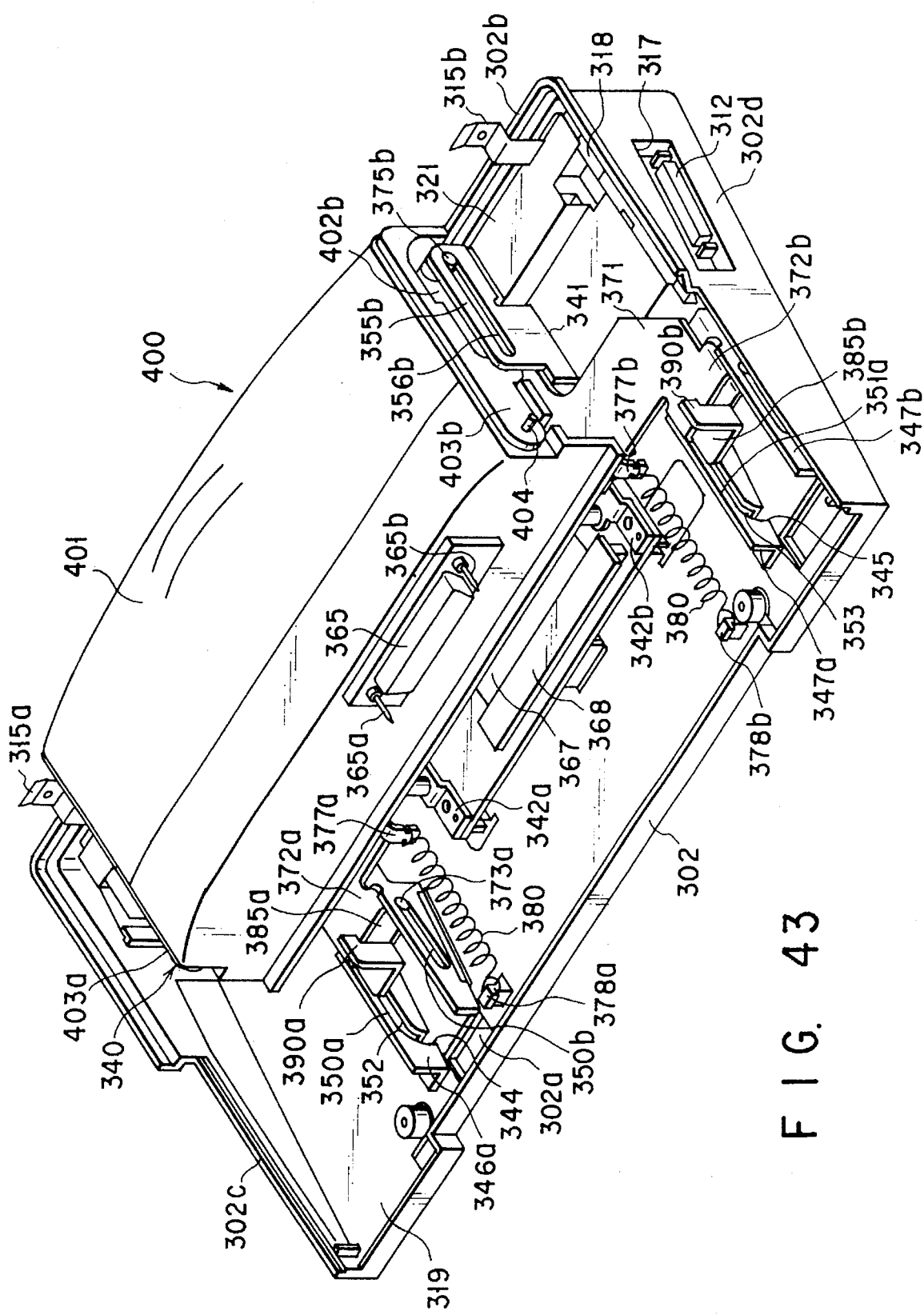

As shown in FIG. 44, the frame 341 has a pair of engaging pieces 377a and 377b. The engaging pieces 377a and 377b are bent downward at the left and right side portions of the frame 341. In addition, as shown in FIG. 43, a pair of spring hooks 378a and 378b are arranged on the bottom wall 302a of the lower housing 302. The spring hooks 378a and 378b are located in front of the engaging pieces 377a and 377b. Toggle springs 380 are set between the engaging pieces 377a and 377b and the spring hooks 378a and 378b, respectively. Each toggle spring 380 is constituted by a tension coil spring and always pulls the slide plate 371 toward the front side of the lower housing 302.

Figure 46:
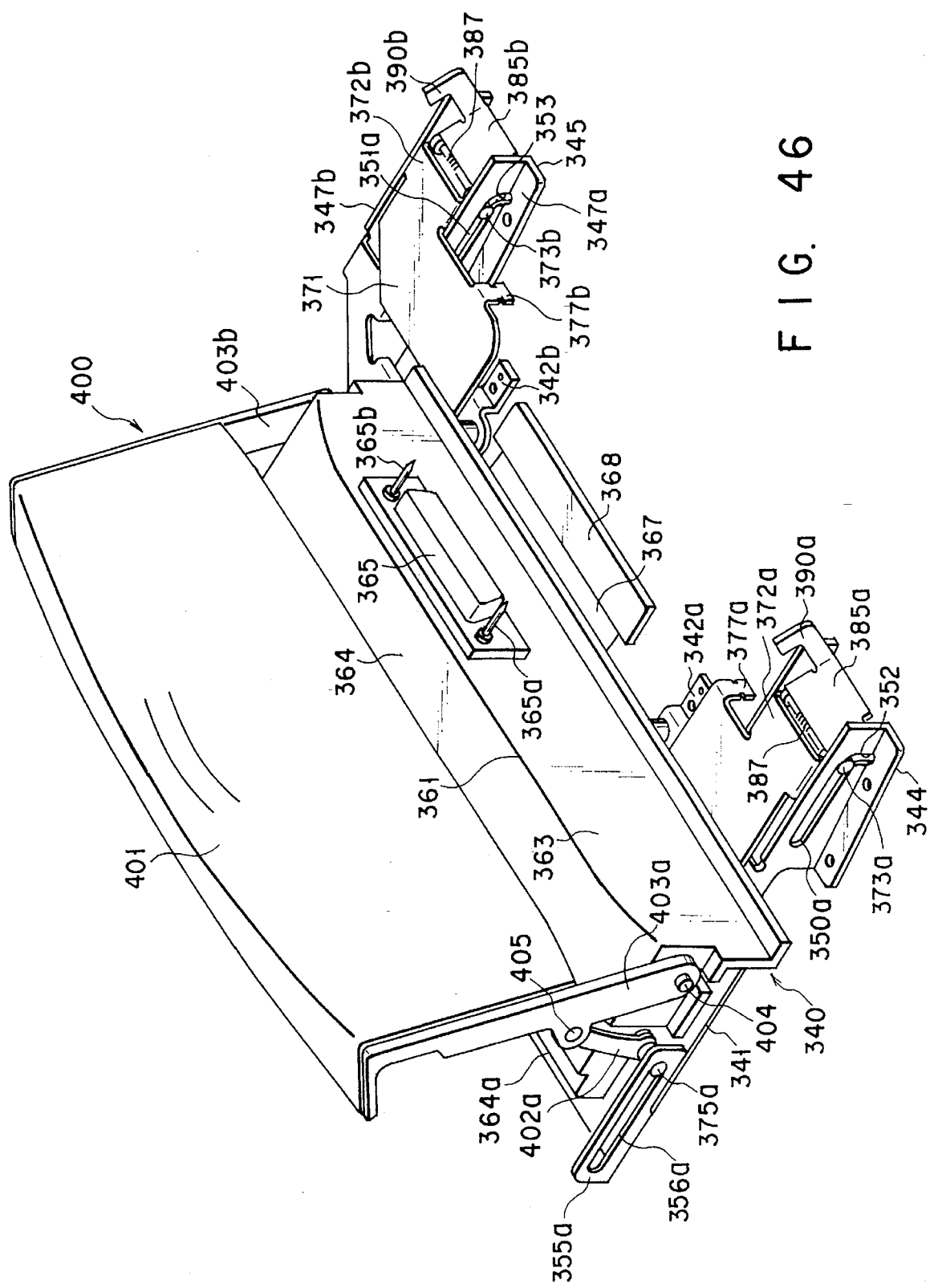

As shown in FIGS. 43 to 46, pawl metal members 385a and 385b as engaging means are arranged between the guide rails 346a, 346b, 347a, and 347b. One end of each of the pawl metal members 385a and 385b is pivotally supported on a corresponding one of the guide pins 373a and 373b so that the pawl metal members 385a and 385b are slid forward and backward together with the slide plate 371. As shown in FIG. 50, the pawl metal members 385a and 385b have fitting pins 386, respectively. The fitting pins 386 are slidably fitted in the guide holes 350a and 351a having the arcuated portions 352 and 353 in front of the guide pins 373a and 373b. As shown in FIG. 46, torsion coil springs 387 are respectively mounted around the guide pins 373a and 373b. The torsion coil springs 387 bias the pawl metal members 385a and 385b to pivot them upward about the guide pins 373a and 373b. With this biasing operation, the fitting pins 386 are slidably pressed against the edge portions of the openings of the guide holes 350a and 351a. With this structure, when the pawl metal members 385a and 385b are slid forward via the slide plate 371, the fitting pins 386 reaches the arcuated portions 352 and 353 of the guide holes 350a and 351a. At this time, the pawl metal members 385a and 385b are pivoted downward about the guide pins 373a and 373b.

The pawl metal members 385a and 385b integrally have engaging pawls 390a and 390b extending toward the first surface 325. As shown in FIG. 39, the first surface 325 has a pair of slits 391a and 391b. The slits 391a and 391b extend in the back-and-forth direction along the moving direction of the pawl metal members 385a and 385b. The slits 391a and 391b oppose the engaging pawls 390a and 390b. When the fitting pins 386 of the pawl metal members 385a and 385b are guided to the arcuated portions 352 and 353 of the guide holes 350a and 351a, the engaging pawls 390a and 390b retract from the first surface 325. In addition, when the fitting pins 386 are slid to positions outside the arcuated portions 352 and 353, the engaging pawls 390a and 390b protrude from the first surface 325 via the slits 391a and 391b.

With this structure, the engaging pawls 390a and 390b can be moved back and forth between the first position where the pawls retract from the first surface 325 into the housing 301 and the second position where the pawls protrude from the first surface 325 to be located near the second surface 363. The stroke of each of the engaging pawls 390a and 390b is larger than the fitting lengths between the first expansion connector 63 and the second expansion connector 365.

When the computer 1 is mounted at a predetermined position on the first surface 325, the slits 391a and 391b oppose the engaging holes 90a and 90b of the bottom case 4. Therefore, when the engaging pawls 390a and 390b are moved to the second position while the computer 1 is mounted on the first surface 325, the engaging pawls 390a and 390b are hooked on the engaging holes 90a and 90b, and the distal ends of the engaging pawls 390a and 390b are brought into contact with the terminal pieces 91 in the engaging holes 90a and 90b.

As shown in FIGS. 45 to 47, the connector unit 340 has an operation mechanism 400. The operation mechanism 400 serves to move the engaging pawls 390a and 390b to the first and second positions. The operation mechanism 400 includes an operation lever 401 and a pair of toggle links 402a and 402b for pivotally linking the operation lever 401 to the slide plate 371. The operation lever 401 has arm portions 403a and 403b. The arm portions 403a and 403b are located on the left and right end portions of the operation lever 401. The distal ends of the arm portions 403a and 403b are coupled to the connector cover 361 via pivot shafts 404 such that the arm portions 403a and 403b are pivotal in the vertical direction.

One end of each of the toggle links 402a and 402b is pivotally coupled to the intermediate portion of a corresponding one of the arm portions 403a and 403b via a pivot shaft 405. The other end of each of the toggle links 402a and 402b is pivotally coupled to a corresponding one of the guide pins 375a and 375b. As shown in FIG. 50, the coupling portions between the operation lever 401 and the toggle links 402a and 402b are located behind the coupling portion between the operation lever 401 and the connector cover 361, and the pivot range of the operation lever 401 is determined by the toggle links 402a and 402b. That is, as shown in FIG. 50, when the operation lever 401 is pivoted upward, the coupling portions between the operation lever 401 and the toggle links 402a and 402b are moved upward and also pulled forward. For this reason, the raising angle of the toggle links 402a and 402b increases, and the guide pins 375a and 375b are slid forward. This upward pivoting movement of the operation lever 401 is stopped when the guide pins 375a and 375b reach the front ends of the slide holes 356a and 356b. At this time, the raising angle of the operation lever 401 is maximized.

As shown in FIG. 41, when the operation lever 401 is pivoted downward, the coupling portions between the operation lever 401 and the toggle links 402a and 402b are moved downward and also pushed backward. For this reason, the toggle links 402a and 402b are tilted to almost a near-horizontal position to be parallel to the slide plate 371, and the guide pins 375a and 375b are slid backward. The downward pivoting movement of the operation lever 401 is stopped when the guide pins 375a and 375b reach the rear ends of the slide holes 356a and 356b. At this time, the raising angle of the operation lever 401 is minimized. That is, the operation lever 401 is supported on the connector unit 340 to be pivotal between a release position where the lever is pivoted above the connector cover 361 and a coupling position where the lever is inclined to be almost horizontal so as to be continuous with the upper surface 364 of the connector cover 361.

While the operation lever 401 is pivoted to the release position, the guide pins 375a and 375b are located at the front ends of the slide holes 356a and 56b, and the slide plate 371 continuous with the guide pins 375a and 375b is slid forward. As a result, the fitting pins 386 of the pawl metal members 385a and 85b are guided by the arcuated portions 352 and 353 of the guide holes 350a and 351a, and the pawl metal members 385a and 385b are pivoted downward. Therefore, the engaging pawls 390a and 390b are moved to the first position to retract from the first surface 325 into the housing 301.

While the operation lever 401 is pivoted to the coupling position, the guide pins 375a and 375b are located at the rear ends of the slide holes 356a and 356b, and the slide plate 371 continuous with the guide pins 375a and 375b is slid backward. As a result, the fitting pins 386 of the pawl metal members 385a and 385b are separated from the arcuated portions 352 and 353, and the pawl metal members 385a and 385b are pivoted upward. Therefore, the engaging pawls 390a and 390b are moved to the second position to protrude from the first surface 325.

As described above, the slide plate 371 is part of the operation mechanism 400. In this embodiment, the biasing force of the toggle springs 380 which cause the slide plate 371 to slide forward is set to be smaller than the fitting force between the first expansion connector 63 and the second expansion connector 365.

Figure 49:
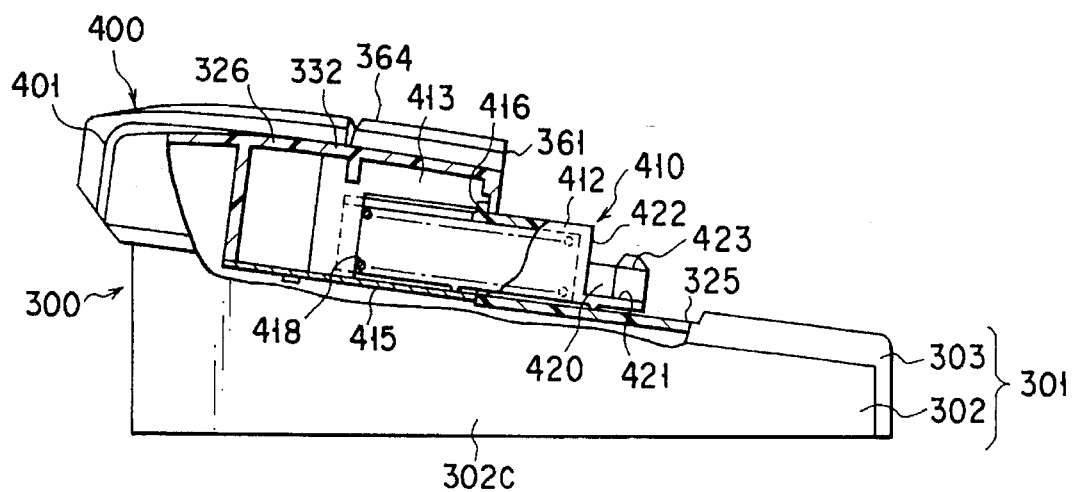

As shown in FIGS. 39 and 49, the external expansion unit 300 includes a pair of guide members 410 and 411. The guide members 410 and 411 determine the mounting position of the computer 1 with respect to the first surface 325, and are located at the left and right sides of the second surface 363. The guide members 410 and 411 are supported on the stopper portions 326 and 327 of the upper housing 303. Since the guide members 410 and 411 have the same structure, one guide member 410 will be described as the representative.

As shown in FIG. 49, the guide member 410 has a hollow, cylindrical main body 412 consisting of a synthetic resin. The stopper portion 326 has a guide receptacle 413 formed therein to house the main body 412. The guide receptacle 413 has a through hole 414 formed in the stopper surface 331. The guide receptacle 413 communicates with the first surface 325 via the through hole 414. The main body 412 extends through the through hole 414. A support plate 415 for receiving the main body 412 is arranged in the guide receptacle 413. The support plate 415 is continuous with the first surface 325 via the through hole 414 on the same plane. With this structure, the main body 412 extends through the through hole 414 and extends between the support plate 415 and the first surface 325.

A stopper portion 416 is formed around the circumferential surface of an intermediate portion of the main body 412. The stopper portion 416 is hooked on the edge portion of the opening of the through hole 414 from the inside of the guide receptacle 413. While the stopper portion 416 is hooked on the edge portion of the opening of the through hole 414, the front half portion of the main body 412 protrudes upward from the first surface 325. With this structure, the guide member 410 is supported on the stopper portion 326 to be slidable between the first guide position where the front half portion of the main body 412 protrudes upward from the first surface 325 and the second guide position where most of the main body 412 retracts into the through hole 414. The guide member 410 is always biased by a spring 418 toward the first guide position. With this biasing operation, the stopper portion 416 is hooked on the edge portion of the opening of the through hole 414, and the guide member 410 is held at the first guide position.

The guide member 410 has an engaging portion 420 detachably hooked on the computer 1. The engaging portion 420 is located on the front end portion of the main body 412. The engaging portion 420 includes a first engaging surface 421 for receiving the bottom wall 4a of the bottom case 4, and a second engaging surface 422 for receiving the rear wall 4c of the bottom case 4. An engaging projection portion 423 extends from the first engaging surface 421. When the computer 1 is mounted on the first surface 325, the engaging projection portion 423 is detachably fitted in a corresponding one of the opening portions 18a formed in the two side portions of the rear end of the bottom wall 4a. With this fitting operation, the computer 1 is positioned with respect to the first surface 325, and the engaging pawls 390a and 390b are positioned with respect to the engaging holes 90a and 90b.

The procedure for connecting the computer 1 to the external expansion unit 300 having the above arrangement will be described next.

Prior to connection of the computer 1, the operation lever 401 of the external expansion unit 300 is kept pivoted to the release position. With this pivoting operation, since the pawl metal members 385a and 385b are slid forward via the slide plate 371, the pawl metal members 385a and 385b are pivoted downward, and the engaging pawls 390a and 390b are pivoted to the first position. As a result, the engaging pawls 390a and 390b are kept housed in the housing 301 without protruding upward from the first surface 325. Therefore, when the computer 1 is mounted on the first surface 325, the engaging pawls 390a and 390b are not hooked on the computer 1.

Next the rear end portion of the computer 1 is mounted on the first surface 325. Since the guide members 410 and 411 are arranged at the left and right end portions of the first surface 325, the bottom wall 4a of the bottom case 4 is stacked on the first engaging surfaces 421 of the guide members 410 and 411, and the rear wall 4c of the bottom case 4 is brought into contact with the second engaging surfaces 422. With this operation, the first surface 325 and the computer 1 are roughly positioned.

The computer 1 is laterally moved along the second engaging surfaces 422 to fit the engaging projection portions 423 on the first engaging surfaces 421 in the opening portions 18a of the bottom wall 4a. With this fitting operation, the computer 1 is positioned with respect to the first surface 325, and the engaging pawls 390a and 390b are positioned with respect to the engaging holes 90a and 90b. In this case, since the engaging pawls 390a and 390b are housed in the housing 301, the engaging pawls 390a and 390b do not interfere with the bottom wall 4a of the computer 1. Therefore, the computer 1 can be easily positioned.

When the position of the computer 1 on the first surface 325 is determined, the operation lever 401 is pivoted downward to the coupling position. With this pivoting operation, the pawl metal members 385a and 385b are slid backward via the slide plate 371. While the pawl metal members 385a and 385b are pivoted upward, they are moved backward to the second position. As a result, the engaging pawls 390a and 390b protrude upward from the first surface 325 to be hooked on the engaging holes 90a and 90b of the bottom wall 4a of the computer 1, and move on the first surface 325 toward the second surface 363 in this state. With this movement, the computer 1 is pulled to the second surface 363 via the engaging pawls 390a and 390b.

In this case, since the left and right guide members 410 and 411 hooked on the bottom wall 4a of the computer 1 are slidable back and forth, these members 410 and 411 do not interfere with the pulling operation for the computer 1. In addition, the guide members 410 and 411 are hooked on the left and right end portions of the bottom wall 4a, and the engaging pawls 390a and 390b are engaged with left and right portions of the bottom wall 4a. Therefore, when the computer 1 is to be pulled, the computer 1 is not tilted laterally, and the second surface 363 can be kept parallel to the rear surface 4c of the computer 1.

As the computer 1 is pulled toward the second surface 363, the positioning pins 365a and 365b of the second expansion connector 365 are fitted in the positioning holes 63a and 63b of the first expansion connector 63 before the engaging pawls 390a and 390b reach the second position. With this fitting operation, the first expansion connector 63 and the second expansion connector 365 are finally positioned. When the computer 1 is completely pulled, fitting between the first expansion connector 63 and the second expansion connector 365 is completed, and the computer 1 is electrically connected to the external expansion unit 300. As a result, the connection port 307 and the connectors 308 to 312 are additionally mounted on the computer 1 to allow a plurality of peripheral devices such as a mouse and an external keyboard as well as a printer and an external CRT display to be connected to the computer 1 at once.

In removing the external expansion unit 300 from the computer 1, the operation lever 401 is pivoted upward to the release position. With this pivoting operation, the engaging pawls 390a and 390b are disengaged from the engaging holes 90a and 90b and retract below the first surface 325. As a result, the pulled state of the computer 1 is canceled. When the engaging pawls 390a and 390b are to be retracted into the slits 391a and 391b, the end portions of the engaging pawls 390a and 390b are brought into contact with the front ends of the engaging holes 90a and 90b to press the computer 1 in a direction away from the second surface 363. With this pressing operation, the computer 1 is pushed out, and the fitted state of the first expansion connector 63 and the second expansion connector 365 is canceled.

In this case, the slide plate 371 and the pawl metal members 385a and 385b are always pulled by toggle springs 380 in a direction to disengage the engaging pawls 390a and 390b from the engaging holes 90a and 90b. For this reason, in the process of pivoting the operation lever 401 to the release position, if the operator releases the operation lever 401, the computer 1 may be pushed out from the first surface 325 at once.

In the above arrangement, however, since the biasing force of the toggle springs 380 is set to be smaller than the fitting force between the first and second expansion connectors 63 and 365, the fitting force surpasses the force for pushing out the computer 1. For this reason, the pivoting movement of the operation lever 401 is stopped temporarily before the operation lever 401 is restored to the release position, and the computer 1 and the external expansion unit 300 are kept connected to each other via the first and second expansion connectors 63 and 365. Therefore, the connection between the first and second expansion connectors 63 and 365 is not canceled at once, and removal of the computer 1 from the first surface 325 can be prevented.

According to the external expansion unit 300 described above, the engaging pawls 390a and 390b for pulling the computer 1 onto the second surface 363 are hooked on the bottom wall 4a of the computer 1 to hold the bottom wall 4a against the first surface 325. For this reason, even if the front end portion of the computer 1 is raised while the computer 1 is connected to the external expansion unit 300 and used, the computer 1 does not float from the first surface 325 but can be firmly held on the first surface 325. Therefore, no excessive bending and twisting forces are applied to the connecting portion between the first and second connectors 63 and 365, and damage to the first and second expansion connectors 63 and 365 can be prevented.

In addition, the first and second expansion connectors 63 and 365 are not accidentally removed. This prevents erasure of important data and operation errors in the computer 1. Therefore, the reliability in connection between the computer 1 and the external expansion unit 300 improves.

Furthermore, since the first surface 325 of the external expansion unit 300 has a size enough to allow only the rear portion of the computer 1 to be mounted, the engaging pawls 390a and 390b are hooked on the bottom wall 4a of the computer 1 at positions near the connecting portion between the first and second expansion connectors 63 and 365. For this reason, even when the front portion of the computer 1 is raised, the rear wall 4c of the computer 1 is kept parallel to the second surface 363 of the external expansion unit 300. Therefore, no bending and twisting forces are easily applied to the connecting portion between the first and second expansion connectors 63 and 365, and damage to the first and second expansion connectors 63 and 365 can be prevented more effectively.

According to the above arrangement, while the engaging pawls 390a and 390b are engaged with the engaging holes 90a and 90b of the computer 1, the engaging pawls 390a and 390b are in contact with the ground terminal pieces 91 in the engaging holes 90a and 90b. Therefore, the computer 1 and the engaging pawls 390a and 390b are kept in a conductive state. Since the engaging pawls 390a and 390b are in contact with the first shield plate 319 in the housing 301 via the metal frame 341, the ground terminal pieces 91 can be grounded to the external expansion unit 300 side by using the engaging holes 90a and 90b. Therefore, when the computer 1 is to be connected to the external expansion unit 300 and used, no special lead lines and connectors for grounding the computer 1 are required.

The first surface 325 of the external expansion unit 300 is inclined downward from the second surface 363 to the operator side. For this reason, when the computer 1 is connected to the external expansion unit 300, the computer 1 is automatically caused to tilt up such that the operator side of the computer 1 is lower in level than the other side. Therefore, the operability of the keyboard 165 improves, and the computer 1 can be easy to handle.

Since the computer 1 has the FDD connector 43 on the right side wall 4e, the FDD connector 43 can be used independently even while the external expansion unit 300 is connected to the computer 1. In addition, since the external expansion unit 300 has the special FDD connector 312, external floppy disk device can be respectively connected to the FDD connectors 43 and 312. Therefore, two external floppy disk devices can be connected to the computer 1 at once, and floppy disks need to be exchanged to exchange data. The computer 1 can be easy to handle.

According to the above arrangement, when peripheral devices such as an external keyboard and a printer are to be disconnected from the computer 1, the operation lever 401 may be pivoted to the release position to cancel the connection between the first expansion connector 63 and the second expansion connector 365. That is, a plurality of peripheral devices need not be disconnected from the computer 1 one by one, and this disconnecting operation can be quickly performed within a short period of time. Therefore, this arrangement is suitable for a computer attaching great importance to portability, like the portable computer 1.

Furthermore, while the operation lever 401 of the external expansion unit 300 is pivoted to the coupling position, the coupling points between the toggle links 402a and 402b and the operation lever 401 and the coupling points between the toggle links 402a and 402b and the slide plate 371 are located in a line extending along the back-and-forth direction. For this reason, the engaging pawls 390a and 390b cannot be slid back and forth unless the operation lever 401 is operated. Even if the computer 1 connected to the external expansion unit 300 is pulled in a direction away from the second surface 363, the connection between the computer 1 and the first and second expansion connectors 63 and 365 cannot be canceled. When the computer 1 is to be disconnected from the external expansion unit 300, intentional operations like pivoting of the operation lever 401 from the coupling position to the release position are always required. This prevents troubles caused by accidental cancellation of connection.

In the first embodiment, the external expansion unit serves as an attachment for connecting peripheral devices to the computer. However, the present invention is not limited to this. For example, a floppy disk device or a CD-ROM may be housed in the housing of an external expansion unit so that the external expansion unit itself may be used as a peripheral device.

Figure 52:
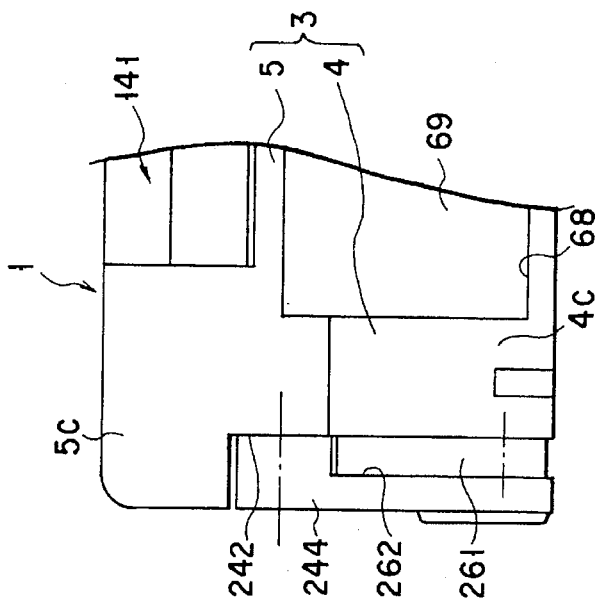
Figure 51:
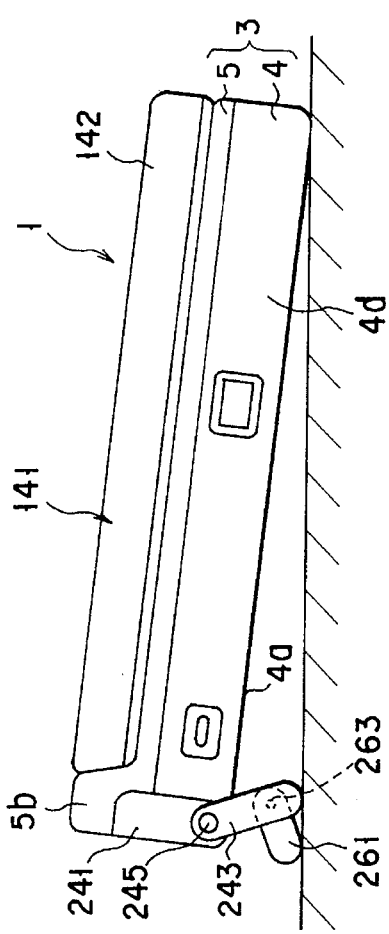

The computer 1 of the present invention is not limited to the first embodiment. FIGS. 51 and 52 show the second embodiment of the present invention.

The second embodiment is mainly different from the first embodiment in the arrangement of legs 243 and 244 for causing a computer 1 to tilt up. More specifically, the legs 243 and 244 respectively have recess portions 262 (only one of theme is shown). The recess portions 262 are located at the opposing surfaces of the leg mount portions 241 and 242. Auxiliary legs 261 are respectively arranged in recess portions 262. One end of each of the auxiliary legs 261 is pivotally supported on an end portion of a corresponding one of the legs 243 and 244 via a pivot shaft 263. With this arrangement, the auxiliary legs 261 can be pivoted between a nonuse position where the auxiliary legs 261 are stacked on the legs 243 and 244 housed in the recess portions 262 and a protruding position where the auxiliary legs 261 protrude backward from the legs 243 and 244 when the legs 243 and 244 are pulled to the use position.

In this arrangement, when a display unit 141 is pivoted to the second or third position while a battery pack 100 is removed from a battery receptacle 13, the weight balance between the front and rear portions of the computer 1 is lost, and the computer 1 may fall backward.

In this embodiment, however, the legs 243 and 244 located on the rear end of a case 3 have the auxiliary legs 261 protruding backward from the legs 243 and 244. If, therefore, the auxiliary legs 261 are pivoted to the protruding position, backward falling of the computer 1 can be prevented by the auxiliary legs 261. For this reason, even if the battery pack 100 is removed from the battery receptacle 13 or the display unit 141 is heavy, the computer 1 can be held in a stable posture.

FIGS. 53 to 56 show a computer 1 according to the third embodiment of the present invention.

The third embodiment is mainly different from the first embodiment in the arrangement for preventing ejection of a battery pack 100. Note that the same reference numerals in the third embodiment denote the same parts as in the first embodiment, and a description thereof will be omitted.

Figure 53:
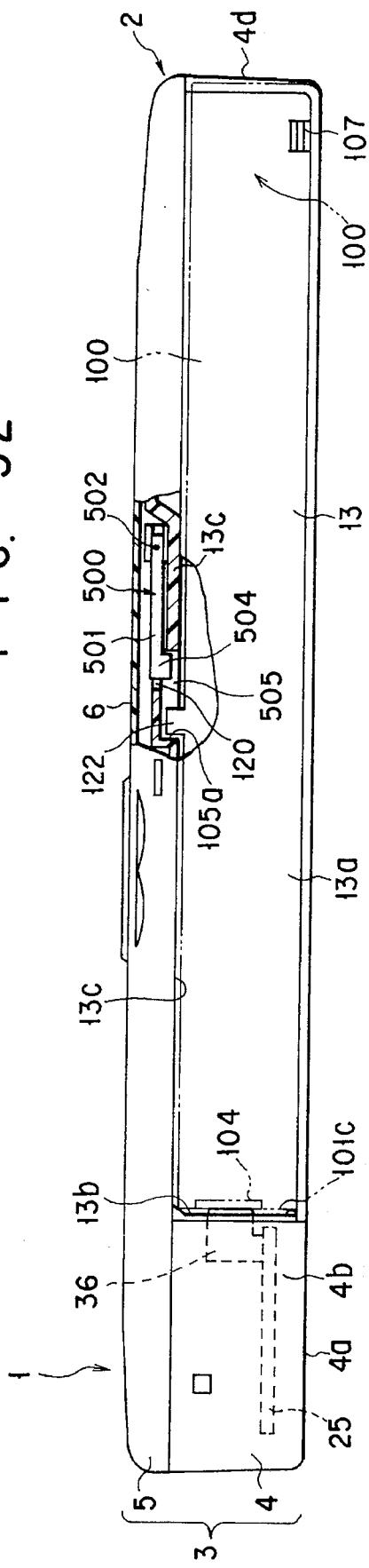

As shown in FIG. 53, a stopper 500 for preventing ejection of the battery pack 100 has an arm portion 501 consisting of a synthetic resin. As shown in FIG. 53, the arm portion 501 is arranged between a ceiling wall 13c and an upper wall 5a of a top cover 5. One end of the arm portion 501 is supported on the ceiling wall 13c via a pivot shaft 502 to be pivotal in the vertical direction. For this reason, the arm portion 501 is arranged in a horizontal posture along the ceiling wall 13c and the upper wall 5a.

Figure 54A:
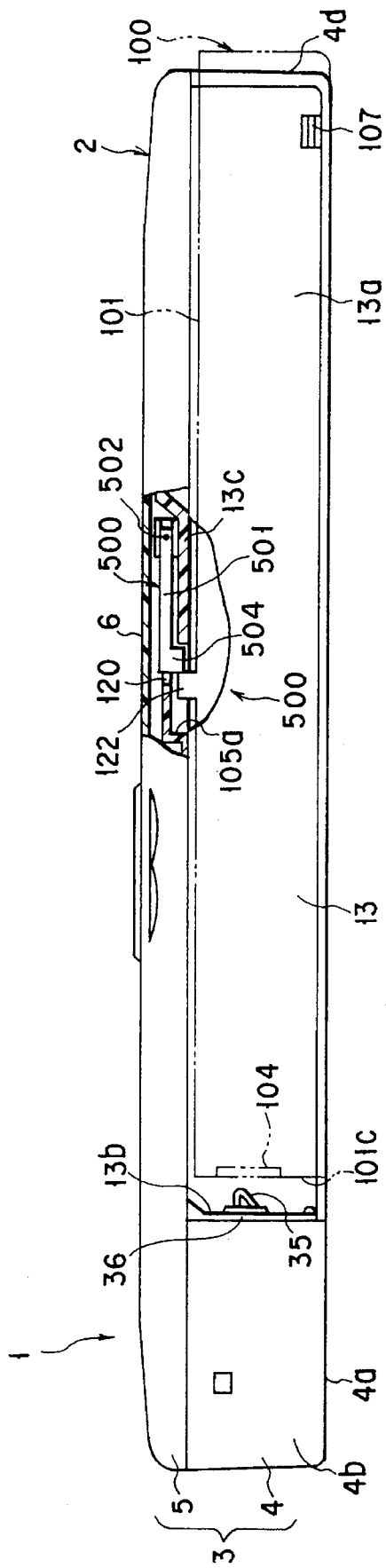
FIG. 54A is a partially sectional front view showing the computer in a state wherein the battery pack is removed from the battery receptacle and slid in a sliding direction.

The arm portion 501 has an engaging pawl 504 at an end portion on the side opposite to the pivot shaft 502. The engaging pawl 504 is retractable and protrudes to an upper portion of the battery receptacle 13 via a through hole 120. With this structure, the stopper 500 is pivoted vertically between the first position where the engaging pawl 504 protrudes into the battery receptacle 13 and the second position where the engaging pawl 504 is retracted into the through hole 120. The stopper 500 is automatically pivoted owing to its own weight when the posture of the case 3 is changed. For this reason, as shown in FIG. 54A, while the computer 1 is placed on a desk surface with the upper wall 5a of the top cover 5 facing up, the stopper 500 is pivoted downward to the battery receptacle 13, and the engaging pawl 504 protrudes into the battery receptacle 13. As shown in FIG. 53, while the battery pack 100 is completely mounted in the battery receptacle 13, an engaging projection portion 122 of the battery pack 100 is shifted to be closer to the power supply connector 36 side than the engaging pawl 504 of the stopper 500. A gap 505 extending along the sliding direction of the battery pack 100 is formed between the engaging pawl 504 and the engaging projection portion 122.

When the lock of the battery pack 100 by means of a lock piece 107 is released, and the battery pack 100 is slid in a direction away from the power supply connector 36, the engaging projection portion 122 is locked to the engaging pawl 504 to restrain further sliding movement of the battery pack 100, as shown in FIG. 54A. At this time, first engaging portions 103 of the battery pack 100 are inserted in gaps 113 between second engaging portions 106 and the ceiling wall 13c, and the engagement between the first and second engaging portions 103 and 106 is maintained. Therefore, the engaging projection portion 122 is hooked on the engaging pawl 504 before the engagement between the first and second engaging portions 103 and 106 is released.

The procedure for removing the battery pack 100 from the battery receptacle 13 in the computer 1 having the above arrangement will be described below.

First of all, a display unit 141 is pivoted to the first position to fold the computer 1 into a box-like shape. When a release lever 109 of a lock means is slid to the lock release position in this state, the lock piece 107 is released from a recess portion 108 of the battery pack 100, and the lock of the battery pack 100 with respect to the battery receptacle 13 is released. With this lock release operation, the battery pack 100 can be slid in a direction away from the power supply connector 36.

In this case, as shown in FIGS. 53 and 54A, since the computer 1 is normally placed on the desk with the upper wall 5a of the top cover 5 facing up, the arm portion 501 of the stopper 500 is located above the battery pack 100. Therefore, owing to its own weight, the arm portion 501 is pivoted downward to the battery pack 100 and is held at the first position. While the arm portion 501 is held at the first position, the engaging pawl 504 of the arm portion 501 protrudes to the upper portion of the battery receptacle 13 via the through hole 120.

Figure 54B:
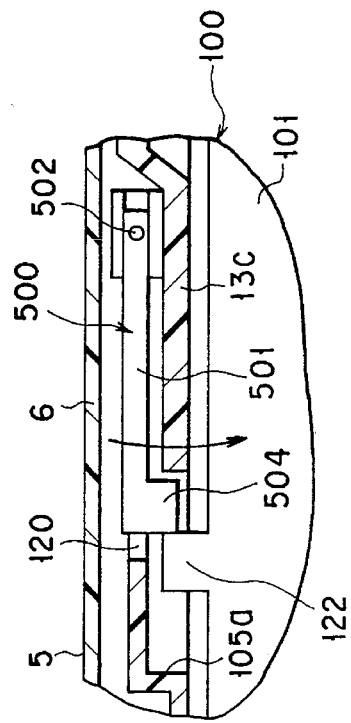
FIG. 54B is an enlarged sectional view showing the positional relationship between a stopper and the battery pack.

Assume that the battery pack 100 is slid in a direction away from the power supply connector 36 in this state. In this case, as shown in FIG. 54B, when the battery pack 100 is shifted by a distance corresponding to the gap 505, the engaging projection portion 122 of the battery pack 100 is hooked on the engaging pawl 504 of the stopper 500, thereby restraining further sliding movement of the battery pack 100. At this time, the engagement between the first engaging portions 103 of the battery pack 100 and the second engaging portions 106 is maintained. For this reason, the battery pack 100 is kept held in the battery receptacle 13. Therefore, while the top cover 5 faces up, the battery pack 100 cannot be removed from the battery receptacle 13 because of the presence of the stopper 500.

Figure 55A:
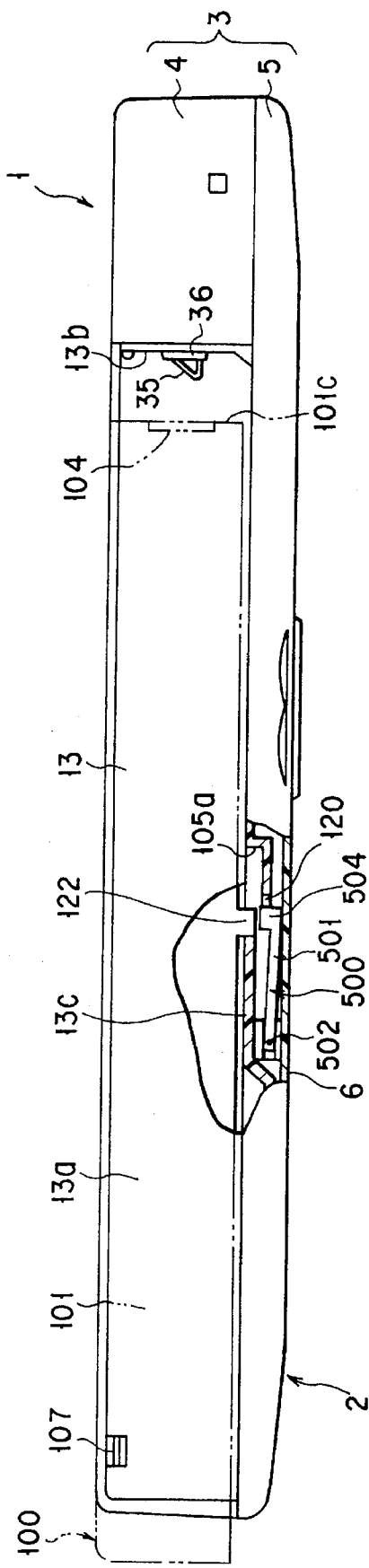
FIG. 55A is a partially sectional front view showing the computer in a state wherein the computer is turned over and the lock of the battery pack by means of the stopper is released.
Figure 56:
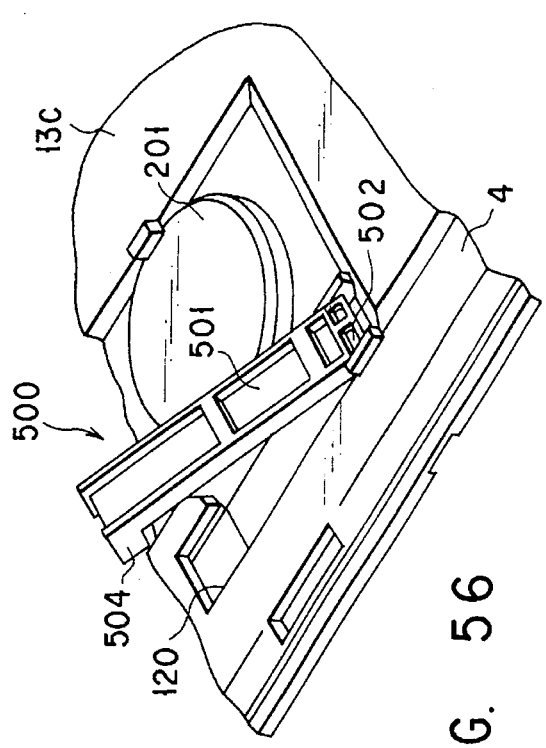
Figure 55B:
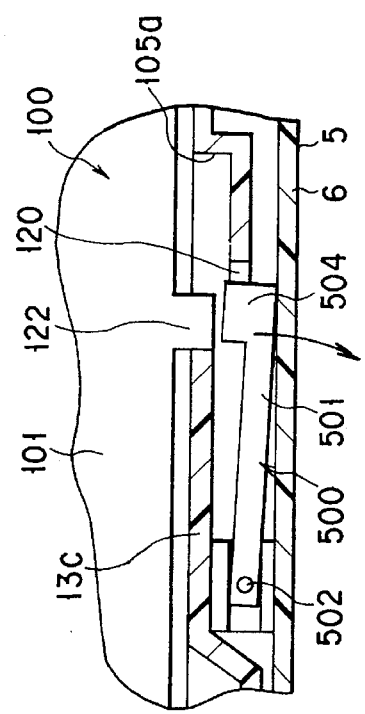
FIG. 55B is an enlarged sectional view showing the position relationship between the stopper and the battery pack.

When the battery pack 100 is to be removed from the battery receptacle 13, the computer 1 is turned over first, as shown in FIG. 55A. As a result, the bottom wall 4a of the bottom case 4 faces up, and the stopper 500 is located below the battery pack 100. The arm portion 501 of the stopper 500 is then pivoted downward owing its own weight, and the stopper 500 is pivoted to the second position away from the battery receptacle 13. With this pivoting movement, the engaging pawl 504 retracts from the battery receptacle 13 into the through hole 120, thereby releasing the engagement between the engaging pawl 504 and the engaging projection portion 122. Therefore, sliding movement of the battery pack 100 is not restrained by the stopper 500, and the battery pack 100 can be freely slid to a position where the engagement between the first engaging portions 103 and the second engaging portions 106 can be released.

When the battery pack 100 is to be mounted in the battery receptacle 13, the computer 1 is turned over to cause the bottom wall 4a of the bottom case 4 to face up, thereby opening the battery receptacle 13 upward, as shown in FIG. 55A. When the computer 1 is turned over, the stopper 500 is pivoted/displaced downward and retracts from the ceiling wall 13c of the battery receptacle 13 into the through hole 120. In this state, the battery pack 100 is placed downward in the battery receptacle 13 above the bottom case 4, and the first engaging portions 103 are located between the second engaging portions 106. Thereafter, the battery pack 100 is slid toward the power supply connector 36. With this sliding movement, the first engaging portions 103 are inserted into the gaps 113 between the second engaging portions 106 and the ceiling wall 13c, and the first and second engaging portions 103 and 106 are engaged with each other. With this engagement, the battery pack 100 is held in the battery receptacle 13.

When terminals 104 of the battery pack 100 are brought into contact with contact terminals 35 of the power supply connector 36 upon sliding movement of the battery pack 100, the lock piece 107 is engaged with the recess portion 108 of the battery pack 100. With this engagement, the engagement between the first and second engaging portions 103 and 106 is maintained, and the battery pack 100 is held/locked in the battery receptacle 13.

According to the third embodiment having the above arrangement, even if the lock of the battery pack 100 by the lock means is released, sliding movement of the battery pack 100 in the direction in which the battery pack 100 is removed is restrained unless the computer 1 is turned over to cause the bottom wall 4a of the bottom case 4 to face up. For this reason, whenever the battery pack 100 is removed from the battery receptacle 13, the battery receptacle 13 is open upward, and the battery pack 100 is supported by the ceiling wall 13c from below. Therefore, accidental removal of the battery pack 100 can be prevented, and damage to the battery pack 100 upon this removal can be prevented. In addition, the battery pack 100 can be easily handled when it is mounted/removed.

Furthermore, the stopper 500 for preventing removable of the battery pack 100 is designed such that the arm portion 501 is pivotally supported on the ceiling wall 13c and arranged in a horizontal posture to extend along the ceiling wall 13c. Therefore, a wide space for housing the arm portion 501 need not be ensured between the upper wall 5a of the top cover 5 and the ceiling wall 13c, and a reduction in the height of the case 3 can be realized, as compared with a case wherein the arm portion 501 is arranged in a vertical posture to be linearly slid in the vertical direction.

In the computer 1 having the above arrangement, since the contact terminals 35 of the power supply connector 36 are always biased in the direction to protrude toward the battery receptacle 13, when the lock of the battery pack 100 is released, the battery pack 100 receives a force in the direction to be pushed out from the battery receptacle 13 owing to the elastic forces of the contact terminals 35. In the above arrangement, however, the engaging pawl 504 of the stopper 500 protrudes into the battery receptacle 13 as long as the top cover 5 of the computer 1 faces up, as shown in FIG. 53. For this reason, when the battery pack 100 is pushed out by the contact terminals 35 in the above manner, the engaging projection portion 122 of the battery pack 100 is hooked on the engaging pawl 504 before the engagement between the first and second engaging portions 103 and 106 is released. Therefore, movement of the battery pack 100 in the direction to restrain removal of the battery pack 100. This reliably prevents ejection of the battery pack 100 upon a lock release operation and the resultant accidental removal of the battery pack 100.

Figure 25:
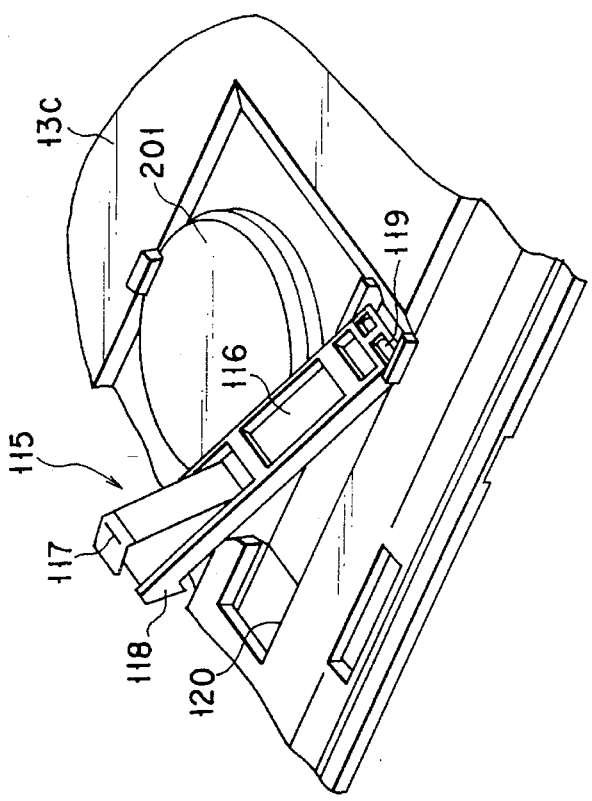

In addition, the battery receptacle 13 is continuously open to not only the bottom wall 4a of the bottom case 4 but also the right side wall 4e of the bottom case 4, and the portion open to the right side wall 4e is located on the side opposite to the power supply connector 36. For this reason, when the battery pack 100 is placed in the battery receptacle 13, an end portion, of the battery pack 100, located on the side opposite to the terminals 104 can be caused to protrude outward from the right side wall 4e of the bottom case 4, as shown in FIGS. 24B and 25. For this reason, no space for allowing the battery pack 100 to slide is required inside the battery receptacle 13 so that the battery receptacle 13 can be formed to have substantially the same size as that of the battery pack 100. Therefore, an unnecessary space can be removed from the battery receptacle 13 to realize a reduction in the size of the case 3.

Furthermore, the first and second engaging portions 103 and 106 are arranged at a plurality of positions spaced from each other in the sliding direction of the battery pack 100. With this arrangement, the battery pack 100 is held in the battery receptacle 13 at the plurality of positions along the sliding direction. Therefore, the battery pack 100 can be firmly held in the battery receptacle 13 to prevent backlash of the battery pack 100 in the battery receptacle 13.

Moreover, while the battery pack 100 is mounted in the battery receptacle 13, the weight of the battery pack 100 is distributed to the first and second engaging portions 103 and 106. Therefore, the load to each of the engaging portions 103 and 106 is reduced, and the size of each of the first and second engaging portions 103 and 106 can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic system comprising:

an electronic apparatus body having a bottom surface and a rear surface continuous with the bottom surface, and having a first connector arranged on the rear surface;

an external expansion unit having a first surface opposing the bottom surface of said electronic apparatus body, and a second surface opposing the rear surface of said electronic apparatus body, said electronic apparatus body being detachably coupled to said external expansion unit, said external expansion unit having a second connector on the second surface, and said second connector being detachably connected to said first connector;

engaging means arranged on the first surface of said external expansion unit, said engaging means being movable between a first position where said engaging means is separated from the bottom surface of said electronic apparatus body and a second position where said engaging means is engaged with the bottom surface of said electronic apparatus body to pull said electronic apparatus body toward the second surface; and an operation mechanism for selectively moving said engaging means to the first and second positions, said operation mechanism connecting said first connector to said second connector upon moving said engaging means to the second position.

2. A system according to claim 1, wherein said engaging means retracts from the first surface into said external expansion unit when said engaging means is moved to the first position.

3. A system according to claim 1, wherein said engaging means presses the bottom surface of said electronic apparatus body in a direction away from the second surface during movement from the second position to the first position.

4. A system according to claim 1, wherein said external expansion unit has a plurality of connectors and ports for connection of peripheral devices for expanding a function of said electronic apparatus body, said connectors and ports being electrically connected to said second connector.

5. A system according to claim 1, wherein said electronic apparatus body has a side surface continuous with the rear surface, the side surface having another expansion connector arranged thereon.

6. A system according to claim 1, wherein said engaging means has first and second engaging pawls, said first and second engaging pawls being arranged on left and right sides of said second connector on the first surface.

7. A system according to claim 6, wherein the bottom surface of said electronic apparatus body has first and second engaging holes with which said first and second engaging pawls can be engaged.

8. A system according to claim 7, wherein said electronic apparatus body has ground terminal pieces exposed to the first and second engaging holes, and said first and second engaging pawls have conductivity and are brought into contact with said terminal pieces when said first and second pawls are engaged with the first and second engaging holes.

9. A system according to claim 1, wherein the bottom surface of said electronic apparatus body has front and rear half portions, and the first surface of said external expansion unit has a size corresponding to the rear half portion of the bottom surface.

10. A system according to claim 1, wherein said electronic apparatus body has an upper surface substantially parallel to the bottom surface, and input means for inputting information is arranged on the upper surface.

11. A system according to claim 10, wherein the first surface of said external expansion unit has a rear edge portion continuous with the second surface, and a front edge portion located closer to an operator than the rear edge portion, the first surface being inclined downward from the rear edge portion to the front edge portion.

12. A system according to claim 10, wherein said electronic apparatus body has a pair of legs which cause said electronic apparatus body to tilt up such that an operator side of said electronic apparatus body is lower in level than the other side, said legs being arranged to be spaced apart from each other in a lateral direction of said electronic apparatus body, and the first surface of said external expansion unit is open to left and right sides of said external expansion unit, the first surface having a width in the lateral direction which is set to be smaller than a distance between said legs.

13. A system according to claim 12, wherein said external expansion unit has a bottom surface located below the first surface, and a distance from the bottom surface to the first surface is set to be larger than a height of said legs when said electronic apparatus body is caused to tilt up.

14. A system according to claim 1, wherein said external expansion unit has a housing for housing said operation mechanism, said housing having a lower housing for supporting said engaging means and said second connector, and an upper housing fitted on said lower housing and having the first surface formed thereon.

15. A system according to claim 1, further comprising a guide member detachably engaged with said electronic apparatus body, for positioning said electronic apparatus body and the first surface, said guide member being mounted on said external expansion unit to be slidable between a first guide position where said guide member is located on the first surface and a second guide position closer to the second surface than the first guide position, and said guide member being always biased by a spring toward the first guide position.

16. A system according to claim 15, wherein said guide member has a first guide surface for receiving the bottom surface of said electronic apparatus body, and a second guide surface for receiving the rear surface of said electronic apparatus body, and engaging projection detachably engaged with the bottom surface of said electronic apparatus body is arranged on the first guide surface.

17. A system according to claim 16, wherein the bottom surface of said electronic apparatus body has opening portion with which said engaging projection is detachably engaged.

18. A system according to claim 17, wherein said electronic apparatus body includes a bottom case having the bottom surface, and a top cover fitted on said bottom case, said bottom case and said top cover being coupled to each other via a screw, the bottom surface of said bottom case having a through hole allowing the screw to be inserted, and the through hole open to the bottom surface having opening end also serving as the opening portion.

19. A system according to claim 6, wherein said operation mechanism comprises a slide plate for sliding said first and second engaging pawls in a direction away from the second surface, an operation lever supported on said external expansion unit to be pivotal in a vertical direction, a toggle link for converting pivoting movement of said operation lever into linear movement and transferring the movement to said slide plate, and toggle springs for biasing said first and second engaging pawls toward the first position via said slide plate, so that said toggle link is pivoted to a posture substantially parallel to said slide plate against a biasing force of said toggle springs, when said first and second engaging pawls are moved to the second position, and a coupling portion between said toggle link and said slide plate and a coupling portion between said toggle link and said operation lever are arranged in a line along a sliding direction of said slide plate when said toggle link is pivoted.

20. A system according to claim 19, wherein the biasing force of said toggle springs is set to be smaller than a fitting force between said first and second connectors.

21. A system according to claim 19, wherein said operation lever is supported on said external expansion unit to be pivotal between a release position where said first and second engaging pawls are moved to the first position and a coupling position where said first and second engaging pawls are moved to the second position, and said operation lever has an outer surface which becomes continuous with said external expansion unit on the same level when said lever is pivoted to the coupling position.

22. An external expansion unit for expanding a function of an electronic apparatus having a body having a rear surface on which there is a first connector and a bottom surface, comprising:

a body having a mounting portion on which the electronic apparatus body is mounted, the mounting portion having a first surface opposing the bottom surface of the electronic apparatus body and a second surface opposing the rear surface of the electronic apparatus body, said second surface having a second connector for detachably connecting to said first connector;

engaging means arranged on the first surface and movable between a first position where said engaging means is separated from the bottom surface of said electronic apparatus body and a second position where said engaging means is engaged with the bottom surface of said electronic apparatus body to move said electronic apparatus body toward the second surface;

an operation mechanism for selectively moving said engaging means to the first and second positions, said operation mechanism connecting said first connector to said second connector when said engaging means moves to the second position; and a positioning member arranged on said mounting portion, for positioning said electronic apparatus body and said mounting portion upon connecting said first connector to said second connector, and being movable between a third position projecting to said mounting portion and a fourth position retracting from said mounting portion.

23. An external expansion unit according to claim 22, wherein said body has a plurality of connectors and ports for connection of peripheral devices for expanding a function of said electronic apparatus body, said connectors and ports being electrically connected to said second connector.

24. An external expansion unit according to claim 22, wherein said positioning member has a first guide surface for receiving the bottom surface of said electronic apparatus body, and a second guide surface for receiving the rear surface of said electronic apparatus body, and an engaging projection detachably engaged with the bottom surface of said electronic apparatus body is arranged on the first guide surface.

25. An external expansion unit according to claim 22, wherein said positioning member is always biased by a spring toward the third position.

26. An external expansion unit according to claim 22, wherein said second connector has a center line extending in the depth direction of said first surface,
said engaging means having first and second engaging members arranged to oppose each other across the center line in the width direction of said first surface, the distance from said first engaging member to said center line and the distance from said second engaging member to said center line being set approximately the same.

27. An external expansion unit for expanding a function of an electronic apparatus having a body having a rear surface on which there is a first connector and a bottom surface, comprising:
a body having a mounting portion on which said electronic apparatus body is mounted, said mounting portion having a first surface opposing the bottom surface of said electronic apparatus body and a second surface opposing the rear surface of said electronic apparatus body, said second surface having a second connector for detachably connecting to said first connector, said second connector having a center line extending in the depth direction of said first surface;
a pair of engaging members arranged on said mounting portion and movable between a first position where said engaging members are separated from the bottom surface of said electronic apparatus body and a second position where said engaging members are engaged with the bottom surface of said electronic apparatus body to move said electronic apparatus body toward the second surface, said engaging members being arranged to oppose each other across said center line in the width direction of said mounting portion, the distance between one engaging member and said center line and the distance from the other engaging member and said center line being set approximately the same; and
an operation mechanism for selectively moving said engaging members to said first and second positions, said operation mechanism connecting said first connector to said second connector upon moving said engaging members to the second position.

28. An external expansion unit according to claim 27, further comprising:
first and second guide members, detachably engaged with the bottom surface of said electronic apparatus body and being arranged on said first surface, for positioning said electronic apparatus body and said mounting portion upon connecting said first connector to said second connector, said first and second guide members being movable between first guide position projecting to said mounting portion and second guide position retracting from said mounting portion in the depth direction of said mounting portion, said first and second guide members being biased toward said first guide position via a spring.

29. An external expansion unit according to claim 28, wherein said engaging members retract from the first surface into said body when said engaging members are moved to the first position.

30. An external expansion unit according to claim 27, wherein said first and second guide members have a first guide surface for receiving the bottom surface of said electronic apparatus body, a second guide surface for receiving the rear surface of said electronic apparatus body and an engaging projection detachably engaged with the bottom surface of said electronic apparatus body.

31. An external expansion unit for expanding a function of an electronic apparatus having a body having a rear surface on which there is a first connector and a bottom surface, comprising:
a body having a mounting portion where said electronic apparatus body is mounted, said mounting portion having a first surface opposing the bottom surface of said electronic apparatus body and a second surface opposing the rear surface of said electronic apparatus body, said second surface having a second connector for detachably connecting to said first connector;
a pair of engaging members, arranged at said mounting portion, movable between first position separated from the bottom surface of said electronic apparatus and second position where said electronic apparatus body is moved toward the second surface of said body and said first connector is connected to said second connector; and
an operation lever for selectively and simultaneously moving said engaging members to first and second positions.

32. An external expansion unit according to claim 31, further comprising:
a toggle device for amplifying the operating force of said operation lever and transferring the force to said engaging members.

33. An external expansion unit according to claim 32, wherein said operation lever is rotatably supported to said body, said toggle device having a slide plate coupled to said engaging members, a toggle link for converting rotating movement of said operation lever into linear movement and transferring the movement to said slide plate and toggle springs for biasing said engaging members toward said first position via said slide plate.

* * * * *